(12) United States Patent
Matsuura et al.

(10) Patent No.: US 6,686,940 B2
(45) Date of Patent: Feb. 3, 2004

(54) REVERSIBLE IMAGE DISPLAY MEDIUM

(75) Inventors: Masahiko Matsuura, Suita (JP); Hiroshi Mizuno, Ikoma (JP); Akihito Ikegawa, Sakai (JP); Masaharu Kanazawa, Suta (JP); Keyaki Yogome, Kyoto (JP); Takaji Kurita, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/987,575

(22) Filed: Nov. 15, 2001

(65) Prior Publication Data

US 2002/0097198 A1 Jul. 25, 2002

(30) Foreign Application Priority Data

| Nov. 16, 2000 | (JP) | ........................................ | 2000-350210 |
| Nov. 16, 2000 | (JP) | ........................................ | 2000-350223 |
| Dec. 5, 2000 | (JP) | ........................................ | 2000-370479 |
| Dec. 5, 2000 | (JP) | ........................................ | 2000-370703 |
| Dec. 7, 2000 | (JP) | ........................................ | 2000-372483 |

(51) Int. Cl.[7] .................. G02B 1/17; G03G 15/00
(52) U.S. Cl. ................. 347/112; 345/107; 359/296
(58) Field of Search .......................... 347/112, 153; 345/107; 359/296

(56) References Cited

U.S. PATENT DOCUMENTS 3,875,576 A * 4/1975 Haas et al. .................. 347/112
4,126,854 A    11/1978 Sheridon
4,143,103 A    3/1979  Sheridon
6,407,763 B1 * 6/2002 Yamaguchi et al. ......... 347/112
6,515,790 B2 * 2/2003 Miyamoto et al. .......... 359/296

OTHER PUBLICATIONS

Gugrae–Jo, et al, "New Toner Display Device: Image Display Using Conductive Toner And Charge Transport Layer" Japan Hardcopy '99, The Annual Conference Of The Imaging Society Of Japan, Jul. 21, 1999, 249–252.

* cited by examiner

Primary Examiner—Joan Pendegrass
(74) Attorney, Agent, or Firm—McDermott, Will & Emery

(57) ABSTRACT

A reversible image display medium accommodates a dry developer in each cell formed between two substrates. The developer contains at least two kinds of frictionally chargeable dry developing particles having different chargeable polarities and different optical reflection densities. An image display can be achieved by forming an electrostatic latent image on one of the substrates to drive the developing particles in an electric field based on the electrostatic latent image. The developing particles are set to an average charge quantity of 1.0 $\mu C/g$ to 10 $\mu C/g$ to achieve good image display. Optionally at least one kind of the developing particles are magnetic developing particles having a coercive force of 50 oersteds to 250 oersteds, and optionally having an optical reflection density of 1.0 or more. An amount of small-size developing particles and/or an addition of a third component may be adjusted and volume average particle size ratio of developing particles may be controlled.

18 Claims, 16 Drawing Sheets

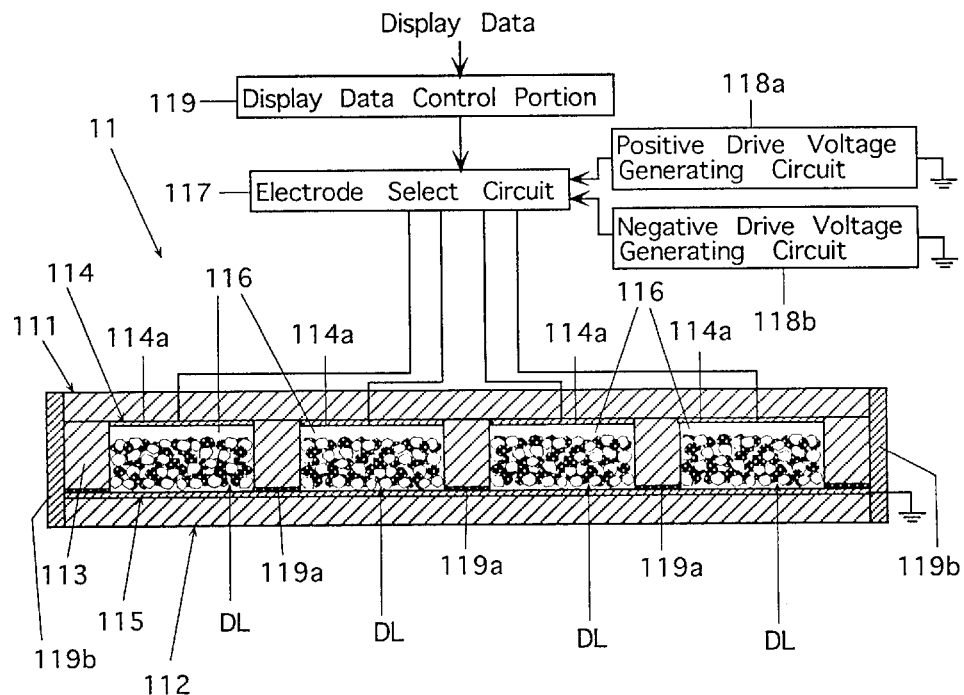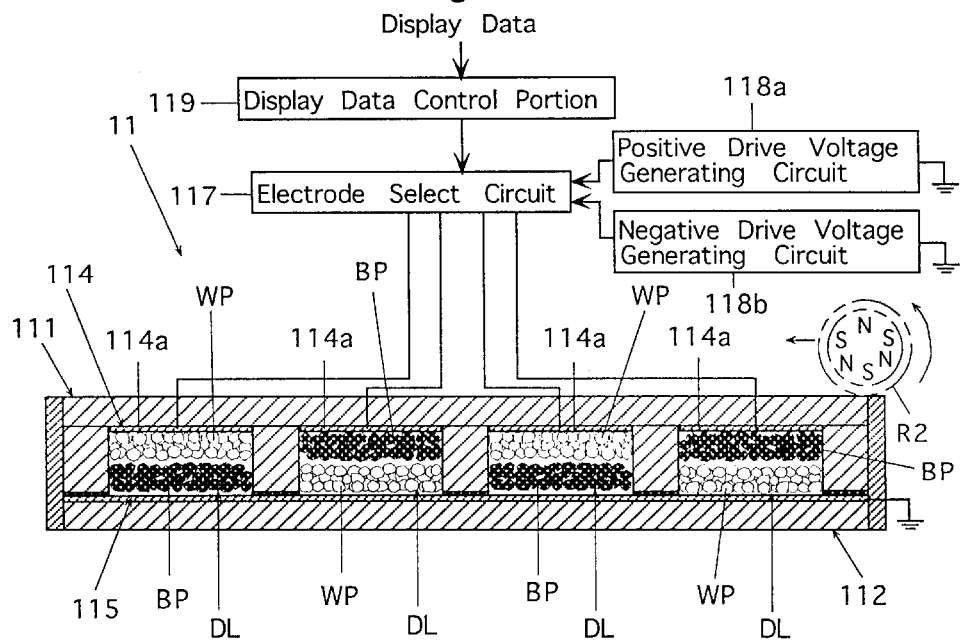

REVERSIBLE IMAGE DISPLAY MEDIUM

CROSS-REFERENCE TO RELATED APPLICATION

This application is based on Japanese Patent applications No.2000-350210 filed in Japan on Nov. 16, 2000, No.2000-350223 filed in Japan on Nov. 16, 2000, No.2000-370479 filed in Japan on Dec. 5, 2000, No. 2000-370703 filed in Japan on Dec. 5, 2000 and No.2000-372483 filed in Japan on Dec. 7, 2000, the entire contents of which are hereby incorporated by reference.

BACKGROUND OF THE INVENTION

1. Field of the Invention

The present invention relates to an image display medium, and particularly relates to a reversible image display medium, in which image displaying and image erasing operations can be repeated.

2. Description of the Background Art

At present, image display is performed, e.g., in the following manners. A person uses a pencil, a pen, paints or the like, and manually writes or draws characters, pictures or the like on an image display medium such as paper sheet. Also, a computer, a word processor or the like is used to display text, graphics or the like on a display such as a CRT display, or output them on a medium such as a paper sheet via a printer for display.

A copying machine or the like may be used for producing duplication, on a medium of paper or the like, of the texts, pictures, graphics or the like, which are produced on the medium of paper or the like by a person or by a printer. A facsimile machine may be used for sending such contents (texts, pictures, graphics and others) prepared in the above manner for producing duplication on another medium of paper or the like.

The above image display, which is performed to display the texts, pictures or the like on the image display medium of paper or the like by a pencil, pen or the like, or by an image forming apparatus such as a printer, a copying machine or a facsimile machine operating in a electrophotographic method, an ink-jet method, a heat transfer method or the like, can achieve clear image display in a high resolution, and thus can achieve easy-on-the-eyes display.

However, it is impossible to repeat display and erasure of the images on the image display medium of paper or the like. In the case where the paper is used for writing characters or the like by a pencil, the characters can be erased by an eraser to a certain extent. However, it is difficult to erase completely the characters or the like written in an ordinary density, although it may be possible when written in a light density. The medium of paper or the like can not be reused except for the case of using the rear surface of the medium, which is not yet used for the image display.

Accordingly, the medium of paper or the like bearing images will be abandoned or burnt when it is not longer required. This results in consumption of a large mount of resources. The printer, copying machine or the like also consume consumable products or materials such as toner or ink. For obtaining the new display medium of paper or the like as well as toner, ink or the like, energies and resources are required for producing them. This is contrary to the current demand for reduction in environmental loads.

In contrast to the above, the image display by a display such as a CRT display can repeat the image display and the image erasure. However, the resolution, clarity and precision of images are restricted, as compared with the images displayed by the printer or the like on the paper medium or the like. Thus the image display by a display is improper especially when used for displaying the text documents mainly composed of letters because of low resolution. If it is used for displaying sentences which continue in less than the frame-size volume, it will do. However, if the sentences continue in twice or more times the frame-size volume, they may be difficult to read and to understand. Due to the relatively low resolution and the light emission from the display, operations for a long time are likely to be hard to eyes.

Electrophoretic display (EPD) and Twist ball-type display (TBD) have been proposed as an image display method allowing repetition of the image display and image erasure. Further displaying method was recently proposed, which is disclosed in "Japan Hardcopy '99, the book of the thesis, pp. 249–252".

In the electrophoretic display method, two substrates including at least one transparent substrate are opposed together with a spacer therebetween to form a closed space therebetween, and the space is filled with a display liquid formed of a dispersion medium and electrophoretic particles, which are dispersed in the dispersion medium and are different in color from the medium. The image display is performed by an application of an electrostatic field and in a color of the particles or a color of the dispersion medium.

The display liquid is usually formed of isoparaffin-contained dispersion medium, particles of titanium dioxide or the like, dyes applying contrast in color to the particles, and an additive such as a surface active-agent, or a charge applying agent.

In the electrophoretic display, the display is performed by utilizing contrast between particles of a high refractive index (e.g., titanium dioxide particles) and colored insulating liquid, and therefore the particles can not hide the colored liquid to a high extent, resulting in a low contrast.

Furthermore, there is a limitation on the kind of dye which is dissolved in a high concentration in a nonpolar solvent of high resistance which allows the electrophoresis of particles. A dye showing a white color is not found. Nor known is a black dye having a high extinction coefficient. Therefore the background portion becomes colored so that it is difficult to achieve a good contrast by a white background. When white particles for formation of images are placed into a colored liquid, the colored liquid may be moved between the substrate and the layer of white particles which are moved to the image observation side substrate, or the colored liquid may come into between the white particles, thereby lowering the contrast. The electrophoretic particles can scarcely uniformly adhere to the image observation side substrate, and thus the resolution is low.

Further, settling and condensation of particles are liable to occur due to a very large difference in specific gravity between the particles and the dispersion medium in the display liquid. This is liable to lower the display contrast. Further, it is difficult to display the images with high stability for a long time, and remaining of last images is liable to occur. Further, the degree of charging of the particles in the liquid significantly changes with time, which also impairs the stability of the image display.

In the twist ball-type display method, images can be displayed in specified colors using an image display medium containing numerous microcapsules enclosing not only an insulating liquid but also fine spheric particle so processed that a half of their surface and the other surface portion show colors or an optical density which differs from each other. Images are displayed in predetermined colors by rotating the fine spheric particles in the microcapsules due to an electric field strength or magnetic strength.

However, according to the twist ball-type display, images are displayed using fine spherical particles in the insulating liquid within the microcapsules. This makes it difficult to attain good contrast. Further, the resolution is low since spaces are formed between the microcapsules. In the manufacture of microcapsules, difficulty is entailed in reducing the size of microcapsules to increase the resolution.

The "Japan Hardcopy '99, the book of the thesis, pp. 249–252" discloses an image displaying method wherein a closed space is formed by placing two substrates as opposed to each other and as spaced from each other, i.e. the two substrates being a laminate of electrodes and a charge transporting layer, the space being used to enclose the electrically conductive toner and insulating particles which are different in color from the toner, an electrostatic field being applied to inject charges into the electrically conductive toner so that the toner is moved by a Coulomb force applied thereto to display images.

However, the foregoing image displaying method utilizing the charge injection phenomenon poses problems. When the electrically conductive toner carrying the injected charges is moved, insulating particles (e.g. white particles mixed together to form the color of background) interfere with the movement of the toner particles, making their movement so difficult that some of them may stop their movement. This results in failure to obtain satisfactory image density and good contrast and in reduction of image display rate. To overcome these problems, a high voltage drive is necessitated. The resolution is determined by the electrodes and is so limited. Furthermore, it is essential to use electrodes, charge-injection layer and electrically conductive toner, which results in limited manufacture.

SUMMARY OF THE INVENTION

Accordingly, an object of the invention is to provide a reversible image display medium, which allows repeating of image display and image erasure, and thereby can reduce consumption of image display mediums of paper or the like relating to the conventional image display and consumable materials such as developers and ink so that a current demand for reduction in environmental loads can be satisfied.

Another object of the invention is to provide a reversible image display medium, which allows image display in good contrast and high quality.

Still another object of the invention is to provide a reversible image display medium, which allows image display in high resolution and high quality, and more specifically, in high resolution as compared with the electrophoretic display and the twist ball-type display, and also in higher resolution when image display is performed based on an electrostatic latent image without employing opposite electrodes.

Yet another object of the invention is to provide a reversible image display medium, which allows stable image display of high quality for a long time.

Further another object of the invention is to provide a reversible image display medium, which can suppress remaining of last image(s), and therefore can exhibit good reversibility so that an image of good quality can be displayed.

Further another object of the invention is to provide a reversible image display medium, which can reduce a drive voltage required for image display.

A further object of the invention is to provide a reversible image display medium, which allows quick image display.

The present invention relates to a reversible image display medium, which basically has the following structure.

The reversible image display medium comprises:
- two substrates opposed to each other with a predetermined gap therebetween;
- one or more developer accommodating cells formed between the two substrates, and each having a periphery surrounded by a partition wall; and
- a dry developer contained in each of the cell(s), the dry developer containing at least two kinds of frictionally chargeable dry developing particles having different chargeable polarities and different optical reflection densities.

The invention provides reversible image display mediums having such basic structure and the following features.

(1) First Reversible Image Display Medium

This reversible image display medium is such that the dry developer has an average charge quantity of 1.0 $\mu$C/g to 10 $\mu$C/g as determined by an electric field separation measuring method.

(2) Second Reversible Image Display Medium

This reversible image display medium is such that at least one kind of the developing particles among the two kinds of the frictionally chargeable dry developing particles having different chargeable polarities and different optical reflection densities are magnetic developing particles having a coercive force of 50 oersteds to 250 oersteds.

The term "coercive force" refers to a strength of residual magnetic field of the magnetic developing particles.

(3) Third Reversible Image Display Medium

This reversible image display medium is such that at least one kind of the developing particles among the two kinds of the frictionally chargeable dry developing particles having different chargeable polarities and different optical reflection densities are magnetic developing particles having an optical reflection density of 1.0 or more.

(4) Fourth Reversible Image Display Medium

This reversible image display medium is such that when at least the two kinds of the frictionally chargeable dry developing particles having different chargeable polarities and different optical reflection densities are represented by a and b, the reversible image display medium satisfies conditions represented by formula 1 and formula 2 given below concerning the cell:

$$PD \geq [1/\rho_a + (1-T_c)/(T_c \times \rho_b)] \times M_a/(D \times f) \qquad \text{Formula 1}$$

$$PD \geq \{1/\rho_b + T_c/[(1-T_c) \times \rho_a]\} \times M_b/(D \times f) \qquad \text{Formula 2}$$

wherein:
- D means a cell gap (height or thickness of a space defining the cell between the pair of substrates),
- $\rho_a$ is a true specific gravity of the particle a, and $\rho_b$ is a true specific gravity of the particle b;
- $M_a$ is an amount of the particles a adhering to the substrate per unit area of the substrate, more specifically, a required weight of the particles a adhering to the substrate per unit area of the substrate on image observation side when a solid image display having a contemplated image density is performed by using the particles a;

$M_b$ is an amount of the particles b adhering to the substrate per unit area of the substrate, more specifically, a required weight of the particles b adhering to the substrate per unit area of the substrate on the image observation side when a solid image display having a contemplated image density is performed by using the particles b;

$T_c$ is a mixing ratio by weight of the particles a to all particles in the cell;

PD is a ratio of the volume of all particles (volume of all particles in the cell) to a cell volume (volume of the cell space);

f is (the cell volume)/(display area×D) (the display area is an effective region area $S_{dsp}$ for image display in a portion forming the cell in the substrate on the image observation side).

(5) Fifth Reversible Image Display Medium

This reversible image display medium is such that at least one kind of the developing particles among the two kinds of the frictionally chargeable dry developing particles having different chargeable polarities and different optical reflection densities are non-magnetic developing particles, and an amount of the non-magnetic developing particles of 3 µm or less in particle size in volume particle size distribution of the non-magnetic developing particles is 0.5 wt % or less.

(6) Sixth Reversible Image Display Medium

This reversible image display medium is such that at least one kind of the developing particles among the two kinds of the frictionally chargeable dry developing particles having different chargeable polarities and different optical reflection densities are magnetic developing particles, and an amount of the magnetic developing particles of 4 µm or less in particle size in volume particle size distribution of the magnetic developing particles is 1 wt % or less.

(7) Seventh Reversible Image Display Medium

This reversible image display medium is such that a third component (e.g., fluidization agent or a component predominantly containing a fluidization agent) is added to at least one kind (e.g. non-magnetic developing particles) among the two kinds of the frictionally chargeable dry developing particles having different chargeable polarities and different optical reflection. In each of the third component-added developing particles, an proportion of the third component to the developing particles of 5 µm or less in particle size in volume particle size distribution of the developing particles is different from an proportion of the third component to the developing particles of more than 5 µm in particle size in the volume particle size distribution such that an adhesion of the particles can be reduced to a larger extent than when employing the same proportion of the third component to the developing particles of 5 µm or less in particle size as the proportion of the third component to the developing particles of more than 5 µm in particle size.

(8) Eighth Reversible Image Display Medium

This reversible image display medium is such that third components (e.g., fluidization agent or a component predominantly containing a fluidization agent) are added to at least one kind (e.g. non-magnetic developing particles) among the two kinds of the frictionally chargeable dry developing particles having different chargeable polarities and different optical reflection densities. In each of the third component-added developing particles, the third component to be added to the developing particles of 5 µm or less in particle size in volume particle size distribution of the developing particles is different from the third component to be added to the developing particles of more than 5 µm in particle size such that an adhesion of the particles can be reduced to a larger extent than when using the same third component to be added to the developing particles of 5 µm or less in particle size as the third component to be added to the developing particles of more than 5 µm in particle size.

(9) Ninth Reversible Image Display Medium

This reversible image display medium is such that when the two kinds of the frictionally chargeable dry developing particles having different chargeable polarities and different optical reflection densities are represented by a and b (volume average particle size of the particles a≧volume average particle size of the particles b), and a ratio of volume average particle size in the developing particles a and b (=volume average particle size of the developing particles a/volume average particle size of developing particles b) is in a range of 1 to 10.

(10) Tenth Reversible Image Display Medium

This reversible image display medium is such that at least one kind of the developing particles among the two kinds of the frictionally chargeable dry developing particles having different chargeable polarities and different optical reflection densities are magnetic developing particles, and a ratio of volume average particle size in the two kinds of dry developing particles (=volume average particle size of the magnetic developing particles/volume average particle size of the other developing particles) is in a range of 0.5 to 10.

If no problem arises, a combination of at least two features of the foregoing reversible image display mediums can be employed.

The foregoing and other objects, features, aspects and advantages of the present invention will become more apparent from the following detailed description and the accompanying drawings.

BRIEF DESCRIPTION OF THE DRAWINGS

FIG. 1 is a sectional view showing an example of the reversible image display medium having opposite electrodes before image display.

FIG. 2 is a sectional view of the medium shown in FIG. 1 on which images are displayed.

FIG. 7(A) is a sectional view of the reversible image display medium before image display.

FIG. 7(B) is a sectional view of an example of the medium in image display.

FIG. 8(A) is a sectional view of the reversible image display medium before image display.

FIG. 8(B) is a sectional view of an example of the medium in image display.

FIG. 17 is a view showing the volume of the developer accommodating cell, an effective image display area and the like.

DESCRIPTION OF THE PREFERRED EMBODIMENTS

Figure 3:
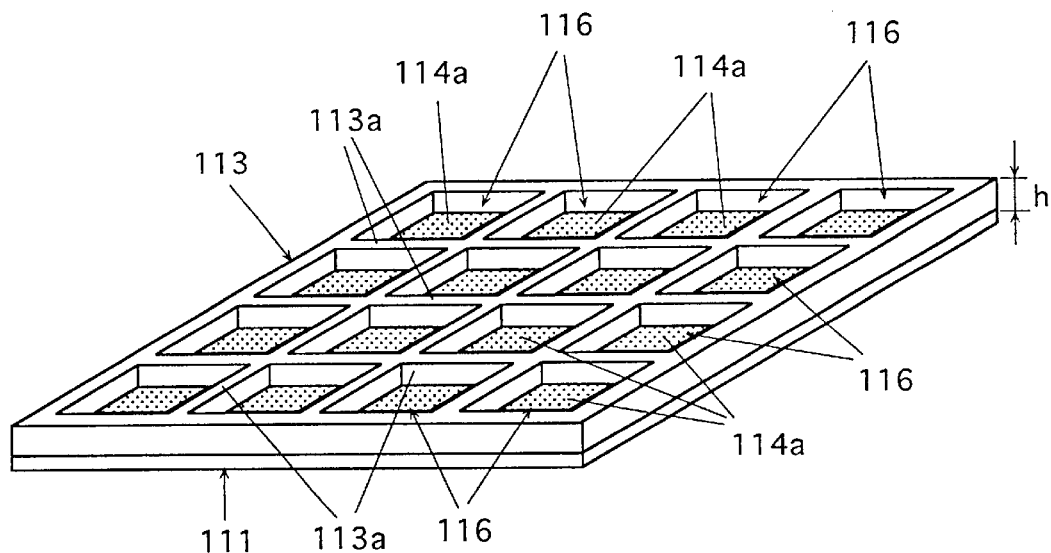
FIG. 3 is a perspective view showing a first substrate and a grid-like partition member formed thereon in the medium shown in FIG. 1.

A reversible (in other words, reusable) image display medium according to a preferred embodiment of the invention basically has the following structure.

The reversible image display medium includes two substrates opposed to each other with a predetermined gap therebetween; one or more developer accommodating cells formed between the two substrates, and each having a periphery surrounded by a partition wall; and a dry developer contained in each of the cell(s). The dry developer contains at least two kinds of frictionally chargeable dry developing particles having different chargeable polarities and different optical reflection densities.

According to the reversible image display medium, a predetermined electrostatic field corresponding to an image to be displayed is formed and is applied to the frictionally charged developing particles in the image display medium. Thereby, a Coulomb force acting between the electrostatic field and the charged developing particles can move the developing particles to display the image in predetermined contrast.

After displaying the image, a different electrostatic field, an alternating electric field, an oscillating magnetic field (when magnetic developing particles are employed) or the like may be formed so that the image can be erased. Also, the image can be rewritten by forming a different electrostatic field. Accordingly, it is not necessary to abandon the image display medium, on which the image is already displayed. The developing particles are contained in the cell, and therefore external supply or addition of the developer is not required. Owing to these facts, it is possible to reduce remarkably the use of the image display medium such as paper sheets as well as consumable materials such as developer in the prior art. In contrast to the image formation of the electrophotographic type or the like in the prior art, it is not necessary to melt the toner for fixing it onto a sheet of paper or the like, and a majority of the image forming energy, which is required in such an image forming apparatus in the prior art, is not required.

Owing to the above features, the medium can satisfy a current demand for reduction in environmental loads.

The developer contained in the cell includes at least two kinds of developing particles having different optical reflective densities, and in other words, exhibiting different contrasts or different colors. Further, the developing particles are dry particles, and one kind of the developing particles can appropriately screen or hide the other kind of developing particles. Therefore, image display in good contrast can be achieved.

The developer contained in the cell includes at least two kinds of the chargeable dry developing particles, which can be frictionally charged to have different chargeable polarities. For image display, the developing particles which are mutually reversely charged by the frictional charging are easily moved by the Coulomb force. This also achieves the display in good contrast, and can suppress remaining of the last image, and also allows quick display of images, and further can reduce a drive voltage required for image display.

The dry developing particles can suppress settling and condensation as compared with, e.g., electrophoretic particles in a display liquid used for electrophoretic image display, because the liquid is not present. This also suppress lowering of the contrast of the image display, and thereby can perform stable image display for a long time. Since the settling and condensation of the developing particles are suppressed, the remaining of the last image can be suppressed. As compared with the particles in the liquid, the dry developing particles can perform stable image display also for the reason that the charging performance thereof changes with time to a smaller extent.

As compared with the image display by a conventional CRT display or the like, easy-on-the-eyes image display in high resolution can be performed.

The electrostatic field corresponding to the image to be formed can be formed, for example, by applying a voltage corresponding to the image to be formed between electrodes arranged on the substrates of the image display medium, or by forming an electrostatic latent image on one of the substrates.

The electrostatic field can be formed based on the electrostatic latent image, which is formed on the outer surface of one of the two substrates. In this case, the electrostatic field may be formed simultaneously with formation of the electrostatic latent image, or may be formed after formation of the electrostatic latent image. The electrostatic field may be formed by placing a predetermined potential on the substrate, which is opposite to the substrate for carrying the electrostatic latent image. This predetermined potential can be placed by applying the bias voltage to the above opposite substrate, or grounding the opposite substrate, simultaneously with formation of the electrostatic latent image, or after formation of the electrostatic latent image.

Materials useful for substrates and cell partition walls can be selected from a wide range. Useful substrates include, for example, glass substrates, hard or soft synthetic resin substrates, and soft film substrates.

At least one of the two substrates forming the medium (arranged on the image observation side) is light permeable to allow seeing the displayed image.

In the case of forming an electrostatic latent image for image display on the medium surface, the substrate for carrying the electrostatic latent image can be formed of an insulating substrate. The other substrate on the opposite side (e.g., on the non-observation side) may be an insulating substrate or another kind of substrate. If the other substrate is an insulating substrate and ground potential or a bias voltage must be placed on the other insulating substrate, an electrically conductive film may be formed on the outer surface of the substrate, or the substrate may be entirely made of an electrically conductive material or a material containing an electrically conductive material, although these are not essential. By employing the above manner or structure, the substrate can be easily grounded to carry the ground potential, or the bias voltage can be easily applied to the substrate. An effect of externally shielding the electrical charges by the substrate on the opposite side can be achieved, if the substrate on the opposite side is an insulating substrate, and is provided at its outer surface with the electrically conductive film, or if the substrate itself on the opposite side is the electrically conductive substrate. Thereby, even in the case where the mediums on which images are displayed are overlapped together, collapsing of the images can be suppressed, and thereby the images can be stably held.

There is no limitation on the number, size, shape, distribution, arrangement (regular or irregular) and others of the developer-accommodating cells insofar as the image is displayed. Optionally a developer-moving suppressing member and a spacer for maintaining a gap between the substrates may be provided between the substrates. The cell partition wall may serve as the developer-moving suppressing member and the spacer.

For example, when an electrostatic latent image is formed on the substrate, an excessively large gap between the substrates or an excessively large thickness of each substrate reduces the electric field applied to the developer between the substrates, and therefore impairs the development performance so that the contrast is lowered. If the gap between the substrates is excessively small, this reduces an amount of the developer, which can be accommodated in the developer accommodating cell, so that required contrast can not be achieved. If the thickness of each substrate is excessively small, and therefore the whole thickness of the medium affected by the thickness of each substrate is excessively small, the medium is liable to be curved so that the gap between the substrates can not be uniform, and the image irregularities are liable to occur. Accordingly, it is preferable that each substrate has a thickness from 5 $\mu$m to 100 $\mu$m, the gap between the opposite substrates is in a range from 20 $\mu$m to 300 $\mu$m, and the whole thickness is in a range from 30 $\mu$m to 500 $\mu$m, although not restricted to these values.

The developing particles may be frictionally charged by applying mechanical vibrations after accommodating the developing particles in the cells, or by frictionally charging at least two kinds of developing particles by stirring and then accommodating the developing particles in the cells. The latter method is preferable to give the developing particles frictionally charged in the desired state. At any rate, the developing particles are frictionally charged before image display.

Such reversible image display medium may have or may not have electrodes. If the substrate is free of electrode, the medium can be so simplified and the use of an elastic substrate such as a film is easily allowed.

Useful reversible image display mediums with electrodes include, for example, those in which an electrode (preferably transparent electrode) is formed on the internal surface of one of substrates which is permeable to light while an electrode opposed to the electrode is formed on the internal surface of the other substrate.

The electrode formed on the internal surface of the other substrate may consist of a group of independent electrodes formed for respective pixels.

The image display medium with the electrodes may be provided with leads for the electrodes. It is desired that the lead is arranged in the non-image display region where the partition wall or the like may be present.

In either of the reversible image display mediums with and without the electrode, the developer accommodated in the developer accommodating cell may contain at least two kinds of dry developing particles, which have mutually different chargeable polarities, and different optical reflective densities (in other words, of different contrasts or different colors). As a typical example, the developer may contain positively chargeable (or negatively chargeable) black particles having light absorbing properties and negatively chargeable (or positively chargeable) white particles having light reflecting properties.

Among at least two kinds of developing particles forming the dry developer, at least one kind of the developing particles may be non-conductive particles. In this case, the presence of such non-conductive particles allows easy and reliable charging by friction of the two kinds of developing particles, regardless of whether the image display medium has the electrodes or not. Thereby, the image display can be further improved.

Of the two kinds of developing particles forming the dry developer, at least one kind of the developing particles may be magnetic particles. The existence of such magnetic particles allows affecting a magnetic stirring force on the developer (developing particles) by the magnetic field (e.g., oscillating magnetic field) in relation to driving the developing particles in the electrostatic field. Owing to the stirring of the developer, the developing particles can easily move in the electrostatic field for image display. Thereby, the contrast is further improved and the required voltage for image display can be further lowered.

In other words, regardless of whether the image display medium has the electrodes or not, the existence of such magnetic particles allows stirring the developer (developing particles) by the magnetic field (e.g., oscillating magnetic field). Owing to the stirring of the developer, the developing particles can easily move when initializing the medium or erasing the last image, or displaying the new image in the electrostatic field for image display. Thereby, the image display is further improved.

The developing particles may be stirred by applying AC voltage or like alternating voltage and/or applying mechanical vibrations. Optionally the stirring may be done using a combination of two or more stirring means such as alternating voltage agitation, magnetic agitation, mechanical agitation, ultrasonic wave emission and the like.

One kind of the developing particles may be nonconductive and magnetic particles.

In any one of the foregoing cases, if the developing particles are excessively small, they have an excessively large adhesiveness, and therefore cause mutual adhesion of the particles and reduction in developing efficiency. Further, such excessively small developing particles carry a large amount of charges so that a large electric field is required for moving the particles for image display, and therefore, a high drive voltage is required.

If the developing particles are excessively large, the frictional charging can not be performed in an intended manner so that the developing particle moving speed can not be increased sufficiently in the electrostatic field for image display, and/or good contrast can not be achieved.

In view of the above as well as the material and others for obtaining the predetermined characteristics of the developing particles, the appropriate particle diameter (volume average particle diameter) of the non-conductive developing particle is in a range from 1 $\mu$m to 50 $\mu$m, and the appropriate particle diameter (volume average particle diameter) of the magnetic developing particle is in a range from 1 $\mu$m to 100 $\mu$m.

The developing particles can be formed, for example, from a binder resin and a coloring agent, etc. or with a coloring agent alone, etc. Those which are usable are described below.

Binder Resin

The binder resin is not specifically limited in so far as it can disperse a coloring agent, magnetic substance, etc. and is usable usually as a binding agent. Binding resins which are usable for electrophotography toner are used as a representative example.

Examples of useful binder resins are polystyrene type resins, poly(meth)acrylic type resins, polyolefin type resins, polyamide type resins, polycarbonate type resins, polyether type resins, polysulfone type resins, polyester type resins, epoxy resins, urea resins, urethane resins, fluorine-containing resins, silicone resins and copolymers, block polymers, graft-polymers and polymer blend, etc. of these resins.

The binder resin may have a considerably high glass transition temperature (Tg) and need not be a thermoplastic resin.

Coloring Agents

As the coloring agents, the following various kinds of organic or inorganic pigments and dyestuffs having various colors are usable.

Examples of black pigments are carbon black, copper oxide, manganese dioxide, Aniline Black and activated carbon, etc.

Examples of yellow pigments are chrome yellow, zinc yellow, cadmium yellow, yellow iron oxide, mineral Fast Yellow, Nickel Titanium Yellow, Naphthol Yellow S, Hansa Yellow G, Hansa Yellow 10G, Benzidine Yellow G, Benzidine Yellow GR, Quinoline Yellow Lake, Permanent Yellow NCG and Tartrazine Lake, etc.

Examples of orange pigments are red chrome yellow, molybdenum orange, Permanent Orange GTR, Pyrazolone Orange, Vulcan Orange, Indanthrene Brilliant Orange RK, Benzidine Orange G and Indanthrene Brilliant Orange GK, etc.

Examples of red pigments are red iron oxide, cadmium red, red lead, mercury sulfide, Permanent Red 4R, Lithol Red, Pyrazolone Red, Watchung Red, Lake Red D, Brilliant Carmine 6B, eosine lake, Rhodamine Lake B, alizarin lake and Brilliant Carmine 3B, etc.

Examples of violet pigments are manganese violet, Fast Violet B and Methyl Violet Lake, etc.

Examples of blue pigments are prussian blue, cobalt blue, Alkali Blue Lake, Victoria Blue Lake, Phthalocyanine Blue, Phthalocyanine Blue containing no metal, partially chlorinated Phthalocyanine Blue, Fast Sky Blue and Indanthrene Blue BC, etc.

Examples of green pigments are chrome green, chromium oxide, Pigment Green B, Malachite Green Lake and Final Yellow Green G, etc.

Examples of white pigments are zinc white, titanium oxide, antimony white and zinc sulfide, etc.

Examples of extender pigments are barite powder, barium carbonate, clay, silica, white carbon, talc and alumina white, etc.

Examples of various kinds of dyestuffs such as basic, acid, disperse and substantive dye are Nigrosine, Methylene Blue, Rose Bengale, Quinoline Yellow and Ultramarine Blue, etc.

These coloring agents are usable alone or in combination of plural of them.

Especially in white-black display, carbon black is preferable as a black coloring agent and titanium dioxide as a white coloring agent.

Especially in the case of preparing developing particles from a mixture of a white pigment and a meltable binding resin (binder resin), it is preferable to use the white pigment in an amount of at least 10 parts by weight, more preferably at least 20 parts by weight, per 100 parts by weight of raw monomer of white particles, in order to obtain sufficient whiteness. It is desirable to use the white pigment in an amount of up to 60 parts by weight, more preferably up to 50 parts by weight, in order to secure sufficient dispersibility of the white pigment. Over 60 parts by weight of the white pigment, the binding of the pigment and the binding resin will decrease and the dispersion of the pigment will deteriorate. Less than 10 parts by weight of the white pigment, the developing particles having a different color will not sufficiently be shaded by the pigment.

Although carbon black is preferable as the black coloring agent, it is possible to use magnetic particles or magnetic fine powder such as magnetite, ferrite, etc. as the coloring agent in order to provide magnetic character to the developing particles.

Other Additives

Examples of additives preferably usable other than the above binder resin or coloring agent are magnetic substance, charge-controlling agent, resistance adjusting agent, etc.

Charge-Controlling Agent

The charge-controlling agent is not specifically limited in so far as it provides a charge to the developing particles by friction-charging.

Examples of plus-charge-controlling agents are Nigrosine dye, triphenylmethane compound, quaternary ammonium salt compound, polyamine resin, imidazole derivative, etc.

Examples of minus-charge-controlling agents are salicylic acid-metal complex, metal-containing azo dye, metal-containing oil-soluble dye (including metal ion or metal atom), quaternary ammonium salt compound, calixarene compound, boron-containing compound (benzilic acid-boron complex), nitroimidazole derivative, etc.

Other than the above, as charge-controlling agents are usable metal oxides such as ultrafine silica particles, ultrafine titanium oxide particles, ultrafine alumina particles, etc., nitrogen-containing cyclic compounds such as pyridine or its derivative, salt, various organic pigments, resins containing fluorine, chlorine, nitrogen, etc.

Magnetic Substances

Magnetic particles and magnetic fine powder are usable. Examples of these substances are ferromagnetic elements, alloy or compounds containing the element. Examples thereof are those containing a conventionally known magnetic substance such as magnetite, hematite, ferrite or like alloys or compounds of iron, cobalt, nickel, manganese, etc., other ferromagnetic alloy, etc. The magnetic powder may have various shapes such as particle, needle, thin flat shape, etc. and is suitably usable.

Resistance Adjusting Agent

Resistance adjusting agents include similar compounds to the above magnetic powder and coloring agent.

Examples of resistance adjusting agents are metal oxides, graphite, carbon black, etc. having various shapes such as thin flat, fibrous or powder shape, etc.

Below is explained an example of preparing developing particles.

Prescribed amount of each of components selected from the above binder resin, magnetic powder, coloring agent, charge-controlling agent, resistance adjusting agent and other additives is prepared, and those components are mixed thoroughly. The mixture is further mixed with heating by use of press-kneader, twin-screw mixing device, etc. After cooling, the mixture is roughly pulverized with use of hammer mill, cutter mill, etc. and then finely pulverized with use of jet mill, angmill, etc. The resulting powder is classified by a wind classifier, etc. to a predetermined average particle size to obtain developing particles.

A developer having a predetermined amount of charges is obtained by mixing and stirring thus obtained particles having different chargeable polarities and contrasts (optical reflective densities) at a predetermined rate thereof. A third agent such as fluidization agent may be added thereto to improve fluidity of the developer.

Fluidization Agent

Examples of fluidity improving agents are silica, alumina, titanium oxide, barium titanate, magnesium titanate, calcium titanate, strontium titanate, zinc oxide, siliceous sand, clay, mica, wallastonite, diatomaceous earth, chromium oxide, cerium oxide, red iron oxide, antimony trioxide, magnesium oxide, zirconium oxide, barium sulfate, barium carbonate, calcium carbonate, silicon carbide, silicon nitride, etc.

Particularly preferable are fine powder of silica, aluminum oxide, titanium dioxide and magnesium fluoride. The fluidity improving agent is used either alone or in combination.

In the image display employing the reversible image display medium, the electrostatic field to be applied to the developing particles can be formed, for example, based on the electrostatic latent image, which is formed on, or brought close to or into contact with, e.g., the surface of one (e.g., on the image observation side) of-the two substrates in accordance with the image to be displayed. The formation of the electrostatic field may be performed simultaneously with or after the formation or approach of the electrostatic latent image. The formation of the electrostatic field is performed, e.g., by placing a predetermined potential, which is required for forming the electrostatic field, on the substrate opposite to the substrate, on which the electrostatic latent image is to be formed. The above predetermined potential can be placed by applying a bias to the opposite substrate, or by grounding the opposite substrate.

The electrostatic latent image may be formed directly on the medium surface (substrate surface), e.g., by a device for directly forming the electrostatic latent image, or may be formed by transferring the electrostatic latent image, which is formed outside the medium by an external electrostatic latent image forming device, onto the medium surface (substrate surface). The electrostatic latent image, which is formed outside the medium by an external electrostatic latent image forming device, may be brought close to or into contact with the medium surface (substrate surface).

The direct electrostatic latent image forming device may be of various discharging types, in which the electrostatic latent image charges are placed by performing the discharge to the medium surface in accordance with the image to be displayed, or of various charge injection types, in which the electrostatic latent image charges are placed by injecting charges to the medium surface in accordance with the image to be displayed. For example, the devices of the former type may be of an ion flow type, and also may be of a multi-stylus type having an electrostatic record head, in which recording electrodes are arranged in a predetermined direction (e.g., main scanning direction for substrate scanning by the device). In an example of the latter type, the device of the multi-stylus type may be used, which includes an electrostatic record head, in which the recording electrodes are arranged in a predetermined direction (e.g., main scanning direction for substrate scanning by the device), and neighboring control electrodes are arranged close to the recording electrodes.

The external electrostatic latent image forming device may be configured such that the electrostatic latent image corresponding to the image to be displayed is formed on the electrostatic latent image carrier, and then is transferred onto, or brought close to or into contact with the substrate surface. More specifically, the electrostatic latent image corresponding to the image to be displayed may be formed, e.g., on a photoconductive member such as a photosensitive member, and may be transferred onto, or brought close to or into contact with the substrate surface. Alternatively, the electrostatic latent image corresponding to the image to be displayed may be formed on a dielectric member, and may be transferred onto, or brought close to or into contact with the substrate surface.

The image display may be performed with the electric field forming device including one of the foregoing electrostatic latent image forming devices.

By forming the electrostatic latent image on the image display medium in the foregoing transfer manner or the direct formation manner or by bringing the electrostatic latent image close to or into contact with the image display medium, the image holding properties of the medium can be improved. In particular, the image holding properties can be improved in the case of using developer having high flowability or developer having flowability which can be increased by the developer stirring operation prior to the image display.

In the reversible image display medium having the opposite electrodes, the electrostatic field for the image display can be formed by applying a voltage across the opposite electrodes. The electrostatic field formation device for such medium will be described later.

In the reversible image display medium without an electrode or with an electrode on only one of the substrates, the electrostatic field to be applied to the developing particles can be formed, for example, by arranging an electrode or electrodes on the outer surface(s) of the medium and applying a voltage through the electrode(s).

In both the reversible image display mediums with and without the electrode, image erasing processing may be performed for erasing the previously displayed image prior to the new image display.

The image erasing processing can be performed, e.g., by forming an electric field, which can move the developing particles forming the developer in the image display medium, and/or applying a stirring force to the developer. The application of the stirring force can be performed, e.g., by forming an alternating electric field, forming an oscillating magnetic field, emitting ultrasonic waves, and/or applying mechanical vibrations.

For the image display, therefore, various kinds of image easing devices can be appropriately employed. Such image erasing devices may include the electric field forming device for forming the electric field moving the developing particles, the stirring device for applying a stirring force to the developing particles, or both the electric field forming device and the stirring device.

For example, under the electric field, one kind of the developing particles, which have the same optical reflection density (i.e., the same contrast or the same color), among the two kinds of developing particles described above may be collected to one of the substrates, and the other kind of developing particles having the same optical reflection density may be collected to the other substrate. Thereby, the image erasure can be performed. Further, the next image formation can be performed by moving the developing particles on only the image portion so that the image display can be performed smoothly and reliably in high quality.

For example, in the operation of stirring the developer (developing particles), the image is erased, and the amount of charges and the flowability of the developing particles are improved. Thereby, the next image formation can be performed smoothly and reliably in a high quality.

The electric field forming device for image erasing may include a pair of electrodes (usually made of metal) or dielectric members, which are arranged on the opposite sides of the reversible image display medium, and a power supply device for applying a bias voltage across these electrodes or dielectric members.

In addition to the above, it is possible to employ various kinds of electric field forming devices of the discharging type, in which the electric field is formed by performing the discharging to the image display medium, and various kinds of electric field forming devices of the charge injection type, in which the electric field is formed by injecting the electric charges to the reversible image display medium. The devices of the former type may be specifically are a Corona charging device, an electric field forming device of an ion flow type, and an electric field forming device of the multi-stylus type having a head, in which electrodes are arranged in a predetermined direction. The device of a latter type may be specifically an electric field forming device of the multi-stylus type, in which electrodes are arranged in a predetermined direction, and neighboring control electrodes are arranged close to the electrodes.

The stirring device may be configured as follows:

Thus, the stirring device may be configured to form an alternating electric field applied to the reversible image display medium.

This device can be utilized if at least one kind of developing particles have the electrically insulating property.

Also, the stirring device may be configured to form an oscillating magnetic field applied to the reversible image display medium.

This device can be utilized if at least one kind of developing particles contain a magnetic material.

Further, the stirring device may be configured to emit ultrasonic waves to the reversible image display medium.

The stirring device may be configured to apply mechanical vibrations to the reversible image display medium.

The stirring device may be formed of a combination of the foregoing two or more structures.

The alternating electric field applying device and the oscillating magnetic field applying device can efficiently stir the developer.

As already described, the stirring of the developer (developing particles) improves the amount of charges and the flowability of the developing particles, and thereby can achieve smooth and reliable image display with high quality.

By stirring the developer prior to the image display, the amount of charges of the developing particles is stabilized. This likewise achieves good image display. Further, the allowable ranges of the chargeability and flowability of the developer can be widened.

For the image display using the reversible image display medium either with or without the electrode, the developer may be stirred also for the purpose of performing the foregoing image erasing processing, or independently of the image erasing processing.

When using the image display medium without an electrode or with an electrode on only one of the substrates, for example, the electrostatic latent image corresponding to the image to be displayed may be formed, e.g., on the surface (substrate surface) of the image display medium, and the electrostatic field may be formed based on the electrostatic latent image simultaneously with or after the formation of the electrostatic latent image, and the developer may be stirred, for example, simultaneously with and/or before formation of the electrostatic field.

For the image display medium provided with the opposite electrodes, a voltage may be applied across the opposite electrodes to form the electrostatic field, and the developer may be stirred before or simultaneously with the formation of the electrostatic field.

Regardless of whether the electrode is employed or not, the developer can be stirred, e.g., by a stirring device, which is opposed to an image display medium transporting path, and is located in or upstream to the region for forming the electrostatic field by the electric field formation device in the relative transporting direction of the image display medium with respect to the electric field formation device.

The developer stirring device and method may be the same as or similar to those already exemplified in connection with the image erasing processing.

By stirring the developer for the image display, the contrast can be further improved, and the drive voltage can be further lowered.

For the image display employing the reversible image display medium, the electrostatic latent image may be formed on the surface (substrate surface) of the image display medium in such a manner that the medium surface is uniformly charged to carry the predetermined potential before formation of the electrostatic latent image, and the electrostatic latent image in accordance with the image to be displayed is formed on the charged region. Based on the electrostatic latent image, the predetermined electrostatic field is formed in accordance with the image to be displayed. Thereby, the developing particles may be moved for the image display.

The formation of electrostatic latent image on the medium can be performed, e.g., by directly forming it on the medium surface charged in the charging step, or by transferring the electrostatic latent image formed on the electrostatic latent image carrier outside the medium onto the medium surface charged in the charging step.

The region of the electrostatic latent image formed on the medium may have such charging characteristics that the region is charged to carry the same polarity as or the polarity different from the charged polarity of the region of the medium surface, which is uniformly charged prior to the electrostatic latent image formation, or that the region of the latent image is charged to 0 V.

According to the above manner, in which the electrostatic latent image is written onto the charged region formed by uniformly charging the surface of the image display medium to carry the uniform potential, the charged developing particles in the developer accommodating cell(s) can be moved. Further, such an electrostatic field, which is enough to hold the moved developing particles is formed. In other words, after uniformly charging the surface of the image display medium to carry the predetermined potential, the electrostatic latent image is written onto the charged region, whereby the image holding properties are improved. Particularly, in the case of using the developer having high flowability or the developer having the flowability which can be increased by the developer stirring operation prior to the image display, the advantages relating to the image holding can be achieved. Owing to the above, images of good contrast and high quality can be stably displayed for a long time.

According to the various reversible image display mediums described above, the images of good contrast, high resolution and high quality can be stably displayed for a long time. Further, remaining of last images can be suppressed, and therefore good reversibility can be achieved. These improve the quality of the displayed image. The image display can be quickly performed with lower drive voltage. The image display can be performed with fewer irregularities.

Now description is turned to the charge quantity of developing particles. If the charge quantity of developing particles is excessively small, the following problems arise.

When image display is carried out by application of an electrostatic field corresponding to the image to be formed to move the developing particles by a Coulomb force for image display, the developing particles can not be smoothly moved, the contrast is lowered, and the image density reproducibility is reduced in repeated image display.

On the other hand, if the charge quantity of developing particles is excessively large, the adhesion of the developing particles to the substrate is increased, the erasure of images becomes difficult and remaining of last images is liable to occur. Further, for example, when an electrostatic latent image corresponding to the image to be displayed is formed and an image is displayed based on the electrostatic latent image, the amount of developing particles to be attracted and adhered to the substrate carrying the electrostatic latent image becomes insufficient, whereby the contrast is impaired and the density reproducibility is lowered in the case of repeated image display.

If the dry developer contained in the reversible image display medium is set to an average charge quantity of 1.0 $\mu$C/g to 10 $\mu$C/g as determined by an electric field separation measuring method, the reduction of contrast can be prevented, the decrease in the density reproducibility can be suppressed in the case of repeated image display, the image can be smoothly erased, and the image display can be stably repeated.

Especially, when an electrostatic latent image corresponding to the image to be displayed is formed and an image is displayed based on the electrostatic latent image, it is desirable that the dry developer is set to an average charge quantity of 1.0 $\mu$C/g to 10 $\mu$C/g as determined by an electric field separation measuring method.

The measurement of the average charge quantity of the developer by the electric field separation measuring method used herein refers to the measurement by the following method.

Using an electrode to be initially provided with a developer and an electrode to be opposed to the electrode with a predetermined gap therebetween, the initial weight of the opposite electrode is measured and then a developer for measurement is placed on the electrode to be provided with the developer. Thereafter the opposite electrode is placed as opposed with a predetermined space from the developer, namely in a position which is out of contact with the developer. A power source is connected to the developer-provided electrode so that the power source can apply a polarity voltage for flying the positively (or negatively) charged developing particles in the developer to the opposite electrode. The opposite electrode is grounded via a condenser. A voltmeter is connected to both sides of the condenser. The foregoing voltage is applied to the developer-provided electrode from the power source in this state. Thereby the positively (or negatively) charged developing particles are flied to the opposite electrode and are adhered thereto. Then, the charge quantity collected in the condenser is calculated from the value of the voltmeter. Subsequently the weight of the opposite electrode having the developing particles adhered thereto is measured. A difference (weight of adhered developing particles) between the obtained weight and the initial weight is calculated. Thereby an average charge quantity of the adhered developing particles (charge quantity of condenser/weight of adhered developing particles) is calculated from the charge quantity collected in the condenser and the weight difference.

This measuring method can be conducted also when at least one kind of the developing particles among the two kinds of the frictionally chargeable dry developing particles having different chargeable polarities and contained in the medium are magnetic developing particles.

When at least one kind of the developing particles among the two kinds of the developing particles in the medium having the foregoing structure are magnetic developing particles, the magnetic developing particles having an excessively low coercive force facilitate movement of the developer in the developer accommodating cells even by slight oscillation, readily collapse the displayed images, cause disturbance of images and lower the retention of image density.

When the magnetic developing particles have an excessively high coercive force, the magnetic developing particles tend to arrange themselves in a chain-like shape and provide rigid chains (magnetic developing particles chained due to the magnetic force), and the following problems are posed. When a stirring force is applied to the developer from outside by application of an alternating electric field, oscillating magnetic field or the like for easy movement of the developing particles in image display, erasure of images and the like, the developer is irregularly stirred and image display is rendered irregular in image display (irregularities of images occur), the density of displayed images is insufficient and the displayed images can not be easily erased in erasure of images.

The term "coercive force" used herein means the strength of residual magnetic field of magnetic developing particles.

Accordingly, when at least one kind of the developing particles among the two kinds of the developing particles having different chargeable polarities and different optical reflection densities are magnetic developing particles, the magnetic developing particles have preferably a coercive force of 50 oersteds to 250 oersteds. In this case, the already displayed images are stably retained in a predetermined density and in good contrast, while image display can be performed with suppressed image irregularities and in good contrast, and the images can be smoothly erased.

The coercive force can be adjusted, for example, according to the quantity and quality of the magnetic material powder forming the magnetic developing particles.

If the magnetic developing particles are ones having higher optical reflection density (e.g. black developing particles), an excessively low optical reflection density of the magnetic developing particles results in failure to obtain a sufficient density for the image portion (e.g. black image portion) which is higher in optical reflection density, consequently making it difficult to achieve good contrast. Therefore, it is desirable that at least one kind, among the two kinds, of the developing particles are magnetic developing particles having an optical reflection density of 1.0 or more at which good contrast can be attained.

The optical reflection density can be measured by various methods. Typical examples of the method include those in which magnetic developing particles are filled into a cylindrical cell having a depth of 200 µm and an inner diameter of 6 mm, and the top portion of the developing particles filled in the cylindrical cell is cut by rubbing to a flat level along the edge of the opening of the cell. Preferably the optical reflection density is measured on the flat level surface of the particles. The optical reflection density obtained by the measuring method is preferably 1.0 or more.

At least one kind of developing particles may be magnetic developing particles having a coercive force of 50 oersteds to 250 oersteds and an optical reflection density of 1.0 or more.

In the reversible image display medium having the foregoing basic structure, at least two kinds of frictionally chargeable dry developing particles having different chargeable polarities and different optical reflection densities are used. When the two kinds of developing particles are represented by a and b, the optical reflection density of the display portion formed of the particles a in the displayed image on the medium is determined by the amount of the particles a adhering to the substrate on the image observation side per unit area of the substrate in the display portion formed of the particles a. The optical reflection density of the display portion formed of the particles b is determined by the amount of the particles b adhering to the substrate on the image observation side per unit area of the substrate in the display portion formed of the particles b.

To obtain the desired image density, the following values may be adjusted to a proper range concerning the developer accommodating cell:

cell gap D (height or thickness of a space defining the developer accommodating cell between the pair of substrates);

a mixing ratio $T_c$ by weight in terms of weight of either particles (a or b) to all particles (particles a and b when they are developing particles a and b) in the cell; and a ratio PD of the volume of all particles (when the particles are developing particles a and b, the volume of particles a and b is meant) in the cell to a cell volume (volume of a space defining the cell).

For adjustment of the values, the reversible image display medium is so structured as to satisfy the following formula 1 and formula 2 concerning the cell:

$$PD \geq [1/\rho_a + (1-T_c)/(T_c \times \rho_b)] \times M_a/(D \times f) \quad \text{Formula 1}$$
$$PD \geq \{1/\rho_b + T_c/[(1-T_c) \times \rho_a]\} \times M_b/(D \times f) \quad \text{Formula 2}$$

wherein:

D means the cell gap (the height or thickness of the space defining the cell between the pair of substrates forming the cells);

$\rho_a$ is a true specific gravity of the particle a, and $\rho_b$ is a true specific gravity of the particle b;

$M_a$ is the amount of the particles a adhering to the substrate per unit area of the substrate, more specifically, the required weight of the particles a adhering to the substrate per unit area of the substrate on the image observation side when a solid image display having a contemplated image density is performed using the particles a;

$M_b$ is the amount of the particles b adhering to the substrate per unit area of the substrate, more specifically, the required weight of the particles b adhering to the substrate per unit area of the substrate on the image observation side when a solid image display having a contemplated image density is performed using the particles b;

$T_c$ is the mixing ratio by weight of the particles a to all particles in the cell;

PD is the ratio of the volume of all particles (volume of all particles in the cell) to the cell volume (volume of the cell space); and f is (the cell volume)/(display area×D) wherein the display area is an effective region area $S_{dsp}$ for image display in the portion forming the cell in the substrate on the image observation side.

When a plurality of cells are employed, an average value calculated based on plural cells randomly selected, e.g. all of cells may be used in respect of the cell gap and others.

Image display in higher contrast can be achieved by satisfying the formula 1 and formula 2.

The formula 1 shows PD when the amount of the particles a is less than the required amount of the particles a for obtaining the desired (contemplated) image density in the display portion formed of the particles a, whereas the particles b are excessively present.

The formula 2 shows PD when the amount of the particles b is less than the required amount of the particles b for obtaining the desired (contemplated) image density in the display portion formed of the particles b, whereas the particles a are excessively present.

As is the case with the reversible image display medium which is described herein, in image display by movement of the developing particles, excessive PD renders the movement of particles difficult, making it impossible to achieve good image display. While the range of facilitated movement of the particles is different according to the flowability and shape of the developing particles or the like, PD of 0.55 or less assures sufficient moving ability of substantially all developing particles. Therefore the following Formula 3 is preferably fulfilled not only because of the above but in view of the factor f. Thereby the flowability of the developing particles is improved and image display in higher contrast can be achieved.

$$PD \leq 0.55/f \qquad \text{Formula 3}$$

Figure 17:
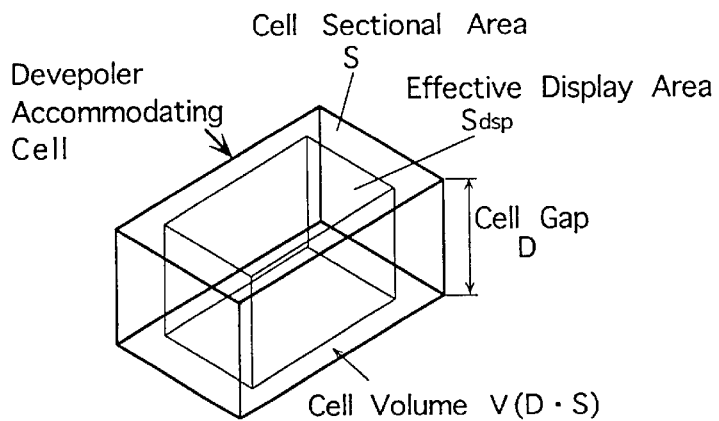

The leading of the formula 1 and formula 2 will be described below with reference to FIG. 17.

The formula 4 represents a minimum value PDmin in the ratio PD of the volume of all particles in the cell to the cell volume V for obtaining the desired (contemplated) image density.

$$PDmin = (\text{required volume of particles } a + \text{required volume of particles } b)/\text{cell volume } V \qquad \text{Formula 4}$$

If the required weight of the particles a adhering to the substrate per unit area of the substrate on the image observation side when a solid image display having a contemplated image density is performed using the particles a in the cell is $M_a$; and if the required weight of the particles b adhering to the substrate per unit area of the substrate on the image observation side when a solid image display having a contemplated image density is performed using the particles b in the cell is $M_b$; and if the sectional area of the cell is S, the formula 5 and the formula 6 are given below:

$$PDmin = (M_a \cdot S/\rho_a + M_b \cdot S/\rho_b)/V \qquad \text{Formula 5}$$

$$V = S \cdot D$$

$$PDmin = (M_a/\rho_a + M_b/\rho_b)/D \qquad \text{Formula 6}$$

The required amount $M_a$ of the particles a can be obtained as follows: solid images involving various amounts of adhered particles a are formed; the image density of each of the solid images is measured; a curve for the amount of adhered particles a vs. the image density is formed; and the required amount of adhered particles is obtained from the curve and the desired (contemplated) image density. The required amount $M_b$ can be obtained in the same manner.

The weight ratio $T_c$, which is a mixing ratio of the particles a to all particles in the cell, is generally different in many cases from the theoretical weight ratio $T_{cth}$ obtained from the required amount of the particles because of the adjustment of charged amount of particles or the like. Description is given below on the case where the amount of particles a is less than the theoretical weight ratio (theoretical existing ratio) ($T_c \leq T_{cth}$), namely the case of the formula 1.

Since the weight ratio $T_c$ of the particles a is lower than the theoretical weight ratio $T_{cth}$, if the particles a exist in the amount equal to or larger than the required amount, the particles b essentially fulfill the required amount. In the formula (6), PD is represented by a thickness ratio.

Namely $M_a/\rho_a$ corresponds to a true thickness (not bulk) of adhered particles a and $M_b/\rho_b$ corresponds to a true thickness (not bulk) of adhered particles b.

If the particle thickness of the particles a is equal to (or larger than) the theoretical particle thickness $M_a/\rho_a$, the particle thickness of particles b is inevitably larger than the required particle thickness $M_b/\rho_b$.

Accordingly $M_b$ in the formula (6) is replaced by the existing amount of the particles b, whereby the minimum PD is obtained.

If the existing amount of particles is represented by addition of ' (apostrophe), the existing amount $M_b'$ of the particles b is obtained from the required amount $M_a$ (=$M_a'$) of the particles a and $T_c$ as indicated by the formula (7).

$$M_b' = (M_a/T_c) - M_a = (1 - T_c)M_a/T_c \qquad \text{(formula 7)}$$

$$(\because T_c = M_a'/(M_a' + M_b'))$$

If $M_b$ is replaced by $M_b'$ in the formula (6), the formula (8) is given.

$$PDmin = [(M_a/\rho_a) + (1 - T_c)M_a/(T_c \cdot \rho_a)]/D \qquad \text{(formula 8)}$$

The factor f is introduced herein. f is a volume wherein the display particles can exist with respect to the effective image display area $S_{dsp}$ in the section area S of the cell.

$$f = (\text{cell volume } V)/(S_{dsp} \times \text{cell gap } D) \qquad \text{(Formula 9)}$$

The introduction of the factor f can obviate a difference between the display area $S_{dsp}$ and the sectional area S in the region wherein the particles can exist. It is possible that the sectional area S will be equal or substantially equal to the display area $S_{dsp}$. In this case, f is 1 or substantially 1.

If the formula 9 is substituted for the formula 8 and simplification is done, the formula 10 is given.

$$PDmin = [(1/\rho_a) + (1 - T_c)/(T_c \cdot \rho_b)]M_a/D/f \qquad \text{(formula 10)}$$

Therefore, a proper range of PD is represented by the formula 1.

$$PD \geq [1/\rho_a + (1 - T_c)/(T_c \times \rho_b)] \times M_a/(D \times f) \qquad \text{(Formula 1)}$$

When the particles a exist in an amount exceeding the theoretical weight ratio (theoretical existing ratio) ($T_c > T_{cth}$, in the case of formula 2), the minimum PD (PDmin) is obtainable as shown by the formula 2 by replacing Ma in the formula 6 by the existing amount $M_a'$ of the particles a in the same manner as above.

$$PD \geq \{1/\rho_b + T_c/[(1 - T_c) \times \rho_a]\} \times M_b/(D \times f) \qquad \text{Formula 2}$$

$$(\because M_a' = M_b \cdot T_c/(1 - T_c))$$

The reversible image display medium having the above-mentioned basic structure is such that the image density of displayed images is affected by the projected area of the developing particles adhering to the substrate per unit area of the substrate on the image observation side. To obtain the same image density, a smaller amount of particles can be used as the particle size of the same kind of particles is decreased. The gap between the substrates can be reduced as the amount of particles is decreased, which means that the medium can be thinner and can be formed with higher handleability.

This matter will be described with reference to FIG. 23(A) to FIG. 23(C).

Large-size, middle-size and small-size particles having the following relative values were used.

| Particle size | Radius | Sectional area | Volume |
|---|---|---|---|
| Large-size | 2 | 4 | 8 |
| Middle-size | 1 | 1 | 1 |
| Small-size | 0.5 | 0.25 | 0.125 |

Figure 23A:
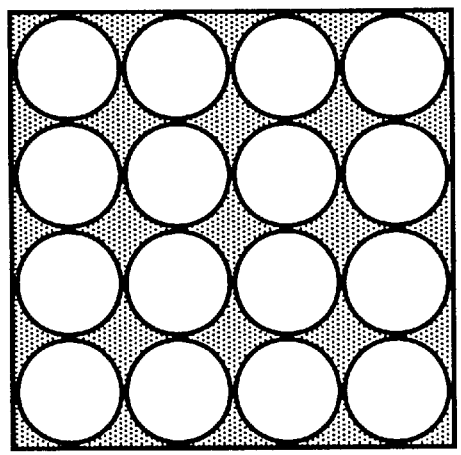
FIG. 23(A) to FIG. 23(C) are views for clarification of the relation between the particle size and the amount of the developing particles adhering to the substrate on the image observation side on one hand and the image density on the other hand.

If 16 large-size particles adhere to a unit area of the substrate as shown in FIG. 23(A), the volume (amount of adhered particles) of 16 particles is 128 and the projected area is 64.

Figure 23B:
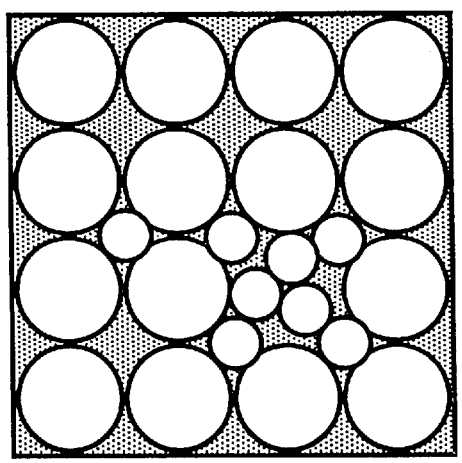

If one large-size particle is replaced with 8 middle-size particles to attain the same adhering amount of 128, in other words, the amount of middle-size particles is about 6 wt % ((8×1)/128), the projected area is increased to 68 (4×15+1×8) as shown in FIG. 23(B).

Figure 23C:
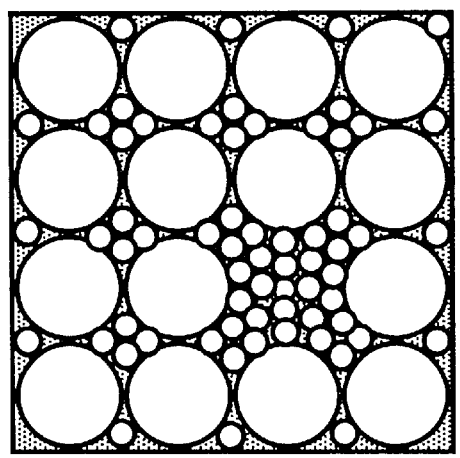

If one large-size particle is replaced with 64 small-size particles to attain the same adhering amount of 128, in other words, the amount of small-size particles is about 6 wt % ((64×0.125)/128), the projected area is increased to 76 (4×15+0.25×64) as shown in FIG. 23(C).

As apparent from FIG. 23(A) to FIG. 23(C), when the projected area of particles is varied, the image density is changed. As the particle size is reduced, the amount of particles can be decreased to obtain the same image density. While the image density needs to be discussed actually on a higher level, the particle size dependency of the image density is qualitatively the same.

From these viewpoints, the smaller the particle size of developing particle is, the more preferable.

However, the small-size particles have high van der Waals' forces, and high water crosslinking strength or like adhesion. For this reason, in the case where the developing particles are driven by an electrostatic field as described above and adhere to the substrate, the particles are fixed to the surface of the substrate with high adhesion, after adhering to the substrate, so that they can not be easily separated. Consequently as the amount of small-size particles are increased, the quality of displayed image is lowered.

If small-size particles are used in large quantity, the small-size particles having a small surface area are low in charge quantity and are reduced in moving capability due to an external electric field when uniformly controlling the charge quantity of all developing particles of the developer. Accordingly they more slowly move toward the substrate on the image observation side compared with large-size particles, resulting in failure to obtain a sufficient image density.

The above problem is overcome by decreasing the amount of, among developing particles, small-size developing particles which have high adhesion to the substrate and which lower the quality of image. Small-size particles having a particle size of about 3 $\mu$m have high adhesion to the substrate and can not easily move in an electrostatic field after adhering thereto. When using developing particles less than 3 $\mu$m in particle size in the amount of about 0.5% or less in the volume particle size distribution, these particles, even if adhering to the substrate on the image observation side, can be scarcely seen.

Magnetic developing particles having an excessively small particle size are low in magnetic force. When the developing particles of low magnetic force are used in a large amount, it becomes difficult to control the movement of magnetic developing particles due to magnetic force in the case of applying a stirring force to the developer to initialize the medium by a magnetic field and to smoothly move the developing particles by an electrostatic field for image display.

The above problem can be resolved by decreasing the amount of small-size particles having a low magnetic force to apply a magnetic stirring force in a sufficient degree or by applying a great magnetic stirring force. From the viewpoints of simplifying the structure of the image forming apparatus and lowering the cost of the apparatus, it is desirable to reduce the amount of small-size particles having a low magnetic force. If the amount of magnetic developing particles of about 4 $\mu$m or less in particle size is reduced to about 1% or less in the volume particle size distribution, the movement of magnetic developing particles by the magnetic field becomes easily controllable.

On the other hand, a method of reducing the adhesion of particles to the substrate is known which comprises adding a third component (fluidization agent or a component predominantly containing a fluidization agent).

However, if the third component is added to the developer, the amount of frictional charge of developing particles is changed. Especially if a large amount of the third component is added to suppress the adhesion of small-size particles to the substrate, significant irregularities occur in frictional charge quantity of developing particles, so that this hinders the movement of developing particles based on the charge quantity of particles and the electrostatic field for image display. It is difficult in this way to achieve two objects at the same time, i.e. to reduce the adhesion of developing particles to the substrate by the addition of the third component and to assure simultaneously the proper moving capability of developing particles.

The addition of the third component in a large amount poses another problem that the properties of particles are changed when the third component adhering to the particles is separated from the particles.

To overcome these problems arising from the addition of the third component, the proportion of the third component to be added to developing particles is varied depending on large-size component and small-size component of the developing particles.

For this purpose, for example, the small-size component (small-size particles) prepared by classification or small-size particles prepared separately may be subjected to post-treatment for reducing the adhesion of particles and for adjusting the charge quantity to a proper range. Thereafter the small-size particles prepared separately may be added to the large-size component (large size particles).

Post treatments for controlling the properties of small-size particles can be carried out as follows. The addition proportion of the third component (fluidization agent or a component predominantly containing a fluidization agent) to the small-size particles is made different from the addition proportion of the third component to the large-size particles. Alternatively the kind of third component (fluidization agent or a component predominantly containing a fluidization agent) to be added to the small-size particles is made different from the kind of third component to be added to the large-size particles. At any rate, the fluidization agent may include those described later.

In any case, the kind of the fluidization agent to be added to the small-size component or large-size component may not always be the same, and a plurality of fluidization agents can be used.

At any rate, the amount of the third component is, for example, 0 to about 1 wt. % for addition to the large-size component, and about 1 wt. % to about 10 wt. % for addition to the small-size component, but is not always limited thereto since the effect of reducing the adhesion is different according to the kind of the fluidization agent to be used.

When the same kind of the third component is added to the large-size and small-size components, it is preferred to add the third component to the small-size component in a larger proportion than the large-size component.

From the above description, it is clear that the following reversible image display mediums are desirable.

(1) A reversible image display medium wherein at least one kind of developing particles among the foregoing dry developing particles are non-magnetic developing particles and the amount of the non-magnetic developing particles having a particle size of 3 $\mu$m or less in the volume particle size distribution of the non-magnetic developing particles is 0.5 wt. % or less.

In this medium, the non-magnetic developing particles include a reduced amount of the small-size component which is likely to adhere and fix to the substrate on the image observation side. This suppresses the adhesion and fixing of particles to the substrate in the corresponding degree so that high quality images can be displayed.

(2) A reversible image display medium wherein at least one kind of developing particles among the foregoing dry developing particles are magnetic developing particles and the amount of the magnetic developing particles having a particle size of 4 $\mu$m or less in the volume particle size distribution of the magnetic developing particles is 1 wt. % or less.

In this medium, the magnetic developing particles include a reduced amount of the small-size component which is likely to adhere and fix to the substrate on the image observation side. This suppresses the adhesion and fixing of particles to the substrate in the corresponding degree. Further the magnetic developing particles include a reduced amount of the small-size component having a low magnetic force so that the movement of developing particles due to the magnetic stirring force becomes easily controllable. Thereby high quality images can be displayed.

(3) A reversible image display medium wherein the foregoing dry developing particles include non-magnetic developing particles and magnetic developing particles and wherein the amount of the non-magnetic developing particles having a particle size of 3 $\mu$m or less in the volume particle size distribution of the non-magnetic developing particles is 0.5 wt. % or less and the amount of the magnetic developing particles having a particle size of 4 $\mu$m or less in the volume particle size distribution of the magnetic developing particles is 1 wt. % or less.

This medium has both advantages of the mediums (1) and (2).

It is possible to provide the following reversible image display mediums (4) and (5) having the foregoing basic structure wherein the third component is added to the small-size developing particles in a manner to attempt the improvement.

(4) A reversible image display medium wherein the third component (fluidization agent or a-component predominantly containing a fluidization agent) is added to at least one kind (e.g., non-magnetic developing particles) of the dry developing particles.

Concerning the developing particles to which the third component is added, the addition proportion of the third component to the developing particles of 5 $\mu$m or less in particle size in the volume particle size distribution of the developing particles is made different from the addition proportion of the third component to the developing particles of more than 5 $\mu$m in particle size such that the adhesion of the particles can be reduced to a larger extent than when employing the same proportion of the third component to the developing particles of 5 $\mu$m or less in particle size as the proportion of the third component to the developing particles of more than 5 $\mu$m in particle size.

The kind of the third component to be added to the small-size particles of 5 $\mu$m or less in particle size in the volume particle size distribution of the developing particles may not always be the same as the third component to be added to a larger size component. A plurality of fluidization agents may be used.

When the same kind of third component is added to the large-size component and the small-size component, generally it is preferable to use the third component in a larger proportion to the small-size component than to the large-size component.

(5) A reversible image display medium wherein the third component (fluidization agent or a component predominantly containing a fluidization agent) is added to at least one kind (e.g., non-magnetic developing particles) of the dry developing particles.

Concerning the developing particles to which the third component is added, the third component to be added to the developing particles of 5 $\mu$m or less in particle size in the volume particle size distribution of the developing particles is made different from the third component to be added to the developing particles of more than 5 $\mu$m in particle size such that the adhesion of the particles can be reduced to a larger extent than when using the same third component to be added to the developing particles of 5 $\mu$m or less in particle size as the third component to be added to the developing particles of more than 5 $\mu$m in particle size.

In the mediums (4) and (5), the developer contains the small-size component of 5 $\mu$m or less in particle size in the volume particle size distribution of the developing particles, and the third component is added to at least one kind of the developing particles. The developing particles to which the third component is added is improved in flowability since the small-size component is treated with the third component by other method than the large-size component.

Thereby the desired image density can be achieved with a reduced amount of the developer and the gap between the particles is reduced as the amount of developing particles is decreased, whereby the medium can be thinner and can be formed with higher handleability.

The following reversible image display mediums (6) to (8) can be also provided.

The reversible image display mediums (4) or (5) having the features of one or more of the mediums (6) to (8) can be also provided.

(6) A reversible image display medium wherein at least one kind of the dry developing particles are non-magnetic developing particles, and the amount of the non-magnetic developing particles having a particle size of 3 $\mu$m or less in the volume particle size distribution of the non-magnetic developing particles is 0.5 wt. % or less.

The medium (6) has the advantages of the mediums (1) and [(4) or (5)].

(7) A reversible image display medium wherein at least one kind of the dry developing particles are magnetic developing particles and the amount of the magnetic developing particles having a particle size of 4 $\mu$m or less in the volume particle size distribution of the magnetic developing particles is 1 wt. % or less.

The medium (7) has the advantages of the mediums (2) and [(4) or (5)].

(8) A reversible image display medium wherein the foregoing dry developing particles contain non-magnetic developing particles and magnetic developing particles and wherein the amount of the non-magnetic developing particles having a particle size of 3 $\mu$m or less in the volume particle size distribution of the non-magnetic developing particles is 0.5 wt. % or less and the amount of the magnetic developing particles having a particle size of 4 $\mu$m or less in the volume particle size distribution of the magnetic developing particles is 1 wt. % or less.

The medium (8) has the advantages of the mediums (3) and [(4) or (5)].

In brief, when the developer contains non-magnetic developing particles, it is desirable that the amount of the non-magnetic developing particles having a particle size of 3 $\mu$m or less in the volume particle size distribution of the non-magnetic developing particles is 0.5 wt. % or less in order to prevent the reduction in the quality of images due to the adhesion and fixing of small-size particles to the substrate on the image observation side.

When the developer contains magnetic developing particles, it is desirable that the amount of the magnetic developing particles having a particle size of 4 $\mu$m or less in the volume particle size distribution of the magnetic developing particles is 1 wt. % or less in order to apply a stirring force to the developer in a sufficient degree by the magnetic field.

When the third component (fluidization agent or a component predominantly containing a fluidization agent) is added to at least one kind (e.g. non-magnetic developing particles) of the developing particles whether in the case of reducing the amount of small-size component in the developer or not, the developing particles to which the third component is added are desirably such that the proportion of the third component to the developing particles of 5 $\mu$m or less in particle size in the volume particle size distribution is made different from the proportion of the third component to the developing particles of 5 $\mu$m or more in particle size so as to decrease the adhesion of particles to the substrate. Alternatively the third component to be added to the small-size component of 5 $\mu$m or less in particle size is made different from the third component to be added to the developing particles of 5 $\mu$m or more in particle size so as to decrease the adhesion of particles to the substrate.

From the viewpoint of the quality of displayed images, when image display is performed using the medium having the foregoing basic structure, an increased difference in particle size between the two kinds of developing particles having different optical reflection densities (i.e. different colors) may result in off-balance of irregularities of image densities (irregularities in colors) between the image portion formed by one kind of particles and another image portion formed by the other kind of particles, may increase the difference in particulate feel in image observation and may impair the quality of displayed image.

To overcome these problems, it is desirable that a ratio of volume average particle size in the two kinds of dry developing particles is in a predetermined range.

If the particle size ratio exceeds 10, there arises an increased difference in particulate feel between image displays performed by particles having different optical reflection densities. For example, when using two kinds, i.e. magnetic and non-magnetic developing particles having different optical reflection densities, a difference is increased in particulate feel between the image display performed by the magnetic developing particles and the image display performed by the non-magnetic developing particles. Thereby the quality of displayed image is deteriorated.

When at least two kinds of developing particles forming the dry developer are represented by a and b, it is preferable that the volume average particle size ratio (=volume average particle size of particles a/volume average particle size of particles b) (although volume average particle size of particles a≧volume average particle size of particles b) is in a range of 1 to 10.

In the medium wherein the volume average particle size ratio of the two kinds of developing particles a, b is 1 to 10, a difference is decreased in particulate feel due to particles between image displays performed by two kinds of developing particles having different optical reflection densities, for example, between the image display performed by magnetic developing particles and the image display performed by non-magnetic developing particles, whereby images can be displayed in high quality.

From the viewpoint of image displaying rate, when one of two kinds of developing particles having different optical reflection densities are magnetic developing particles, a magnetic stirring force can be applied to the developer from outside, whereby the developing particles must be smoothly moved by an electrostatic field and the image displaying rate must be enhanced. However, if the magnetic developing particles are too small in particle size among the two kinds of developing particles having different optical reflection densities and a low stirring force is exerted due to the particles, the other kind of developing particles (e.g. non-magnetic particles) resist the movement in a relatively higher degree than the restraint force of the former kind of developing particles (magnetic) due to the magnetic field so that it becomes difficult to control the movement of particles by magnetic stirring force and Coulomb force. When the other kind of developing-particles (e.g. non-magnetic particles) are too small in particle size compared with the former kind of developing particles (magnetic developing particles), the former kind of developing particles (magnetic developing particles) less effectively scrape the other kind of developing particles adhering to the image display surface of the substrate in the image display. In either case, this is not desirable from the viewpoint of image displaying rate.

To resolve such problem, it is desirable that a ratio of volume average particle size in the two kinds of dry developing particles containing magnetic developing particles (=volume average particle size of the magnetic developing particles/volume average particle size of the other kind of developing particles) is in a predetermined range.

If the particle size ratio exceeds 10, the following phenomena arise in the two kinds of particles of different optical reflection densities. One kind of developing particles (e.g., non-magnetic developing particles) are too small in particle size compared with the other kind of developing particles (magnetic developing particles), while the other kind of developing particles (magnetic developing particles) less effectively scrape the former kind of developing particles so that the image displaying rate is correspondingly lower. If the particle size ratio is smaller than 0.5, the former kind of developing particles (e.g. non-magnetic developing particles) are too large in particle size compared with the other kind of developing particles (magnetic developing particles), so that a stirring force due to the magnetic developing particles is insufficient and the image displaying rate is correspondingly lowered.

Accordingly a ratio of volume average particle size (=volume average particle size of one kind of (magnetic)

developing particles/volume average particle size of the other kind of developing particles) is preferably in a range of 0.5 to 10.

The other kind of developing particles may be insulating particles (non-conductive particles). In any case, the other kind of developing particles may be either non-magnetic particles or magnetic particles.

In an image display medium wherein the ratio of volume average particle size is 0.5 to 10, one kind of developing particles (magnetic particles) more effectively scrape the other kind of developing particles (other kind of developing particles adhering to the substrate). The image displaying rate is correspondingly enhanced. Further, a stirring force is increased by the magnetic developing particles. The image displaying rate is correspondingly increased.

Specific examples of the reversible image display medium, image display method and image forming apparatus will now be described below with reference to the drawings.

<Reversible Image Display Medium>

Reversible Image Display Medium 11

FIGS. 1 and 2 show an example of the reversible image display medium. A medium 11 shown in FIGS. 1 and 2 includes first and second substrates 111 and 112. These substrates 111 and 112 are opposed to each other with a predetermined gap therebetween. A partition member 113 is arranged between the substrates 111 and 112 for keeping a predetermined gap between the substrates. The partition member 113 serves also as a spacer between the substrates 111 and 112. The partition member 113 couples and fixes the substrates 111 and 112 together.

The first substrate 111 is formed of a light-transparent plate such as a glass plate, a transparent resin film or the like. The substrate 111 is located on the image observation side.

The partition member 113 is also a group of partition walls forming developer accommodating cells (see FIG. 3). The partition member 113 is arranged on the inner surface of the first substrate 111 and has a grid-like form as shown in FIG. 3. Thereby, the partition member 113 defines a plurality of developer accommodating cells 116, each of which has a square form and is surrounded by a portion of the partition member 113. The partition wall has a width (thickness) α and a height h, and is spaced by a distance of pt from the neighboring wall.

A first electrode 114 is a transparent electrode, and formed on the inner surface of the first substrate 111 opposed to the second substrate 112. The first electrode 114 includes a plurality of independent electrodes 114a arranged in a grid-like form. Each of the independent electrodes 114a is transparent and made of, e.g., indium tin oxide (ITO) The independent electrodes 114a are arranged in cells 116, respectively, with a distance between the neighboring independent electrodes, which is substantially identical with the partition wall thickness α. Thus one cell corresponds to one pixel.

The second substrate 112 is not essentially required to be transparent, but is formed of a light-transparent plate such as a glass plate, a resin film or the like in this embodiment.

The second substrate 112 is provided at its inner surface opposed to the first substrate 111 with a second electrode 115. The second electrode 115 in this example extends continuously throughout an image display region of the inner surface of the substrate. The second electrode 115 is not essentially required to be transparent, but may be formed of, e.g., transparent ITO.

Each cell accommodates the dry developer DL including the white and black developing particles WP and BP, which are mutually and frictionally charged.

Each cell is sealed so that the developer DL does not leak from the cell.

Figure 4:
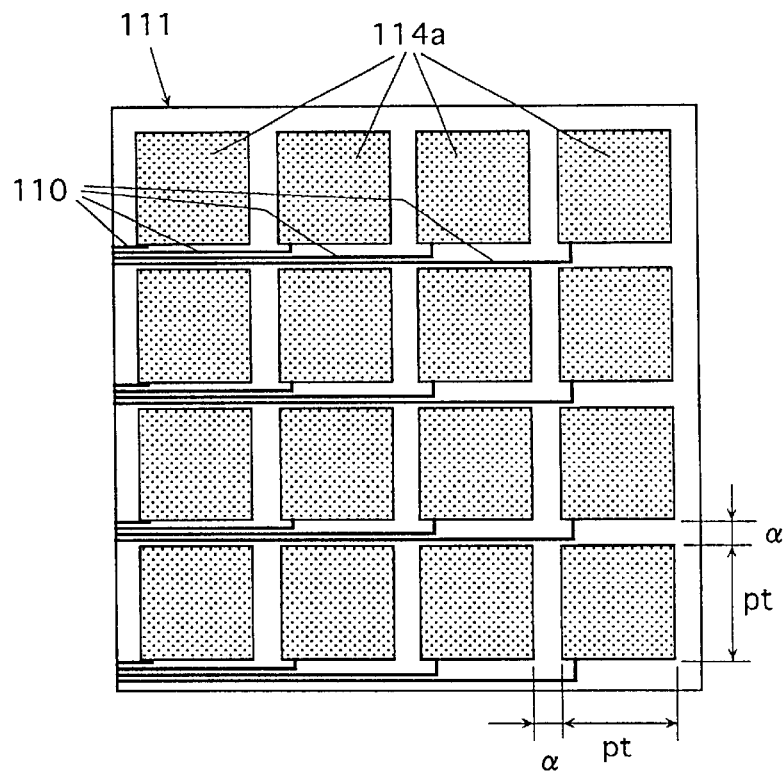
FIG. 4 is a plan view showing the first substrate and independent electrodes formed thereon in the medium shown in FIG. 1.

The independent electrode 114a forming the second electrode 114 in the image display medium 11 is connected to or provided with a lead portion 110 as shown in FIG. 4, and is connected to an electrode select circuit 117 through the lead portion as shown in FIG. 1. The electrode select circuit 117 is connected to a positive drive voltage generating circuit 118a, a negative drive voltage generating circuit 118b and a display data control portion 119. Each independent electrode 114a is independently supplied with a drive voltage from the electrode select circuit 117. The display data control portion 119 receives display data from display data output means (not shown) such as a computer, a word processor, a facsimile machine or the like, and controls the electrode select circuit 117 based on the supplied data. In other words, these electrode select circuit and others form an example of the electric field forming device or the image forming apparatus for the reversible image display medium provided with the electrodes.

Figure 5:
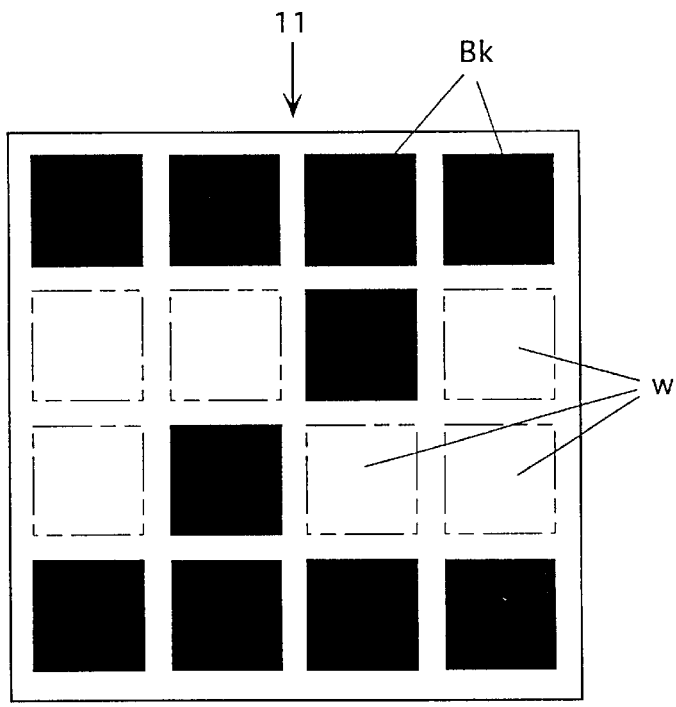
FIG. 5 is a view showing an example of the image display on the medium shown in FIG. 1.

For example, the second electrode 115 in the image display medium 11 is grounded, or a bias voltage is applied from a bias source (not shown) to the electrode 115, if necessary, and the positive or negative drive voltage generating circuit 118a or 118b applies the predetermined voltage across the electrode 115 and each independent electrode 114a via the electrode select circuit 117, which is controlled to perform the desired image display by the display data control portion 119. Thereby, the predetermined electric field is formed for each pixel so that the developing particles WP and BP, which are mixed in the developer DL as shown in FIG. 1, move in accordance with the respective electric fields as shown in FIG. 2. In this manner, the image can be displayed in predetermined contrast. For example, image display can be performed as shown in FIG. 5. In FIG. 5, Bk indicates a portion displayed in black, W indicates a portion displayed in white.

A roller R2 shown with a chain line in FIG. 2 will be described later.

Reversible Image Display Mediums 12, 12'

Figure 6A:
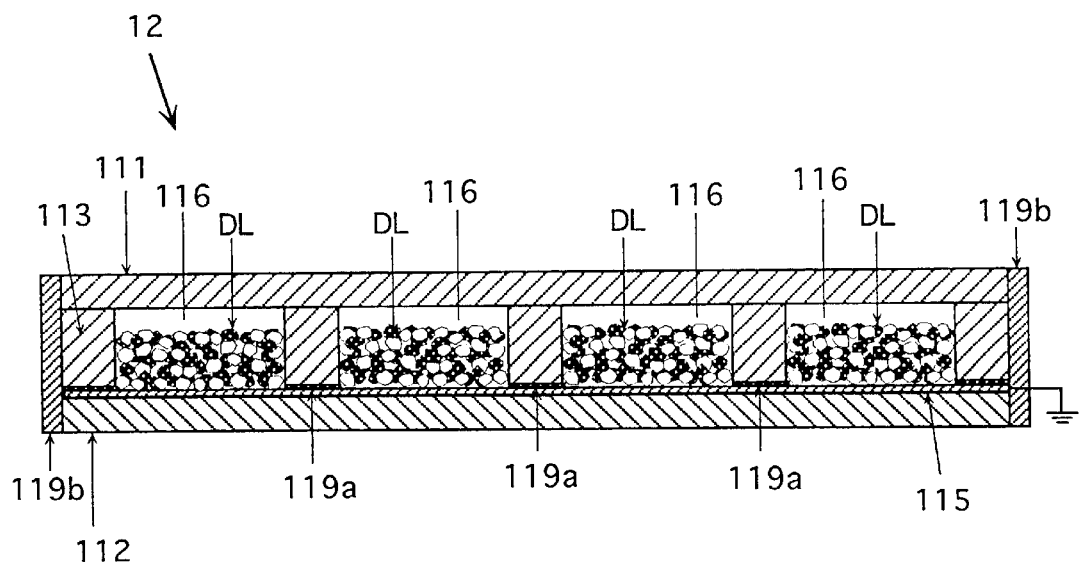
FIG. 6(A) is a sectional view showing another example of the reversible image display medium.
Figure 6B:
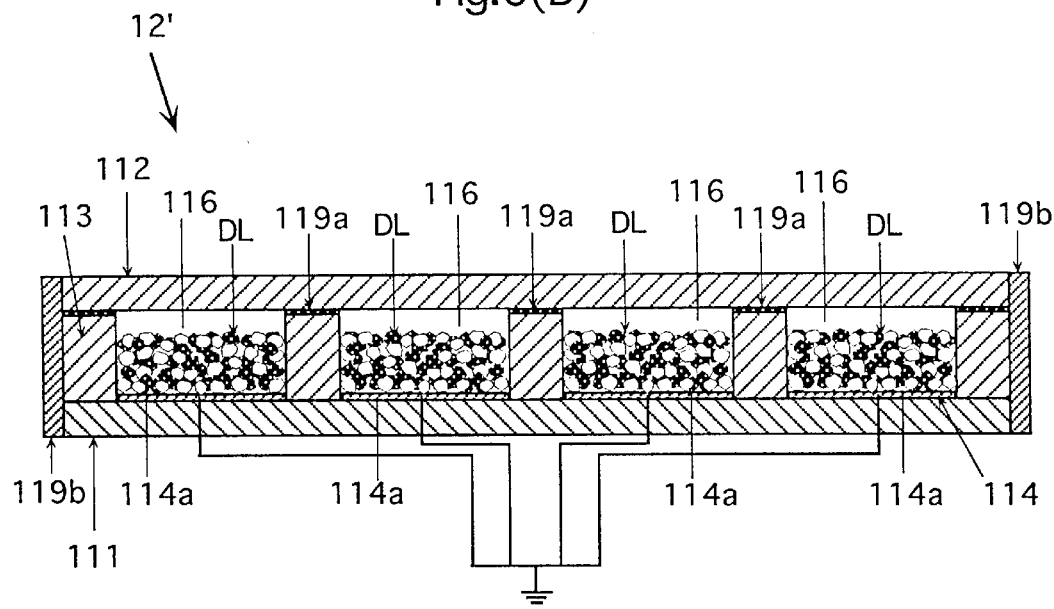
FIG. 6(B) is a sectional view showing a further example of the reversible image display medium.

FIG. 6(A) and FIG. 6(B) show other examples of the reversible image display medium.

The reversible image display medium 12 shown in FIG. 6(A) is identical with the medium 11 of FIG. 1 if the medium 11 is such that at least the first substrate 111 is formed of a material having a light transmitting property and an insulating property and that the independent electrodes 114a are not provided.

The medium 12 is identical in other respects with the medium 11 of FIG. 1. In FIG. 6(A), the same components and parts as in the medium 11 are indicated with the same reference symbols.

The reversible image display medium 12' shown in FIG. 6(B) is identical with the medium 11 of FIG. 1 if the medium 11 is such that at least the second substrate 112 is formed of a material having a light transmitting property and an insulating property and that the electrode 115 is not provided. The medium 12' has the substrate 112 on the image observation side.

The medium 12' is identical in other respects with the medium 11 of FIG. 1. In FIG. 6(B), the same components and parts as the medium 11 are indicated with the same reference symbols.

In the medium 12 (or the medium 12'), for example, the electrode 115 of the second substrate 112 (electrodes 114a in the medium 12') is (are) grounded. In addition, for example, over the external surface of the first substrate 111 (second substrate 112 in the medium 12'), a) an electrode or electrodes are provided to selectively apply a voltage corresponding to the image to be formed between the electrode(s) and the ground electrode(s), b) an electrostatic latent image corresponding to the image to be formed is directly formed, or c) an image carrier carrying the electrostatic latent image corresponding to the image to be formed is contacted (or made to come close), whereby the electric field for driving the developing particles is applied to the developer DL, whereby an image can be displayed.

The electrode 115 of the medium 12 and the electrodes 114a of the medium 12' may be electrode(s) having an intermediate resistance value.

Reversible Image Display Medium 13

Figure 7A:
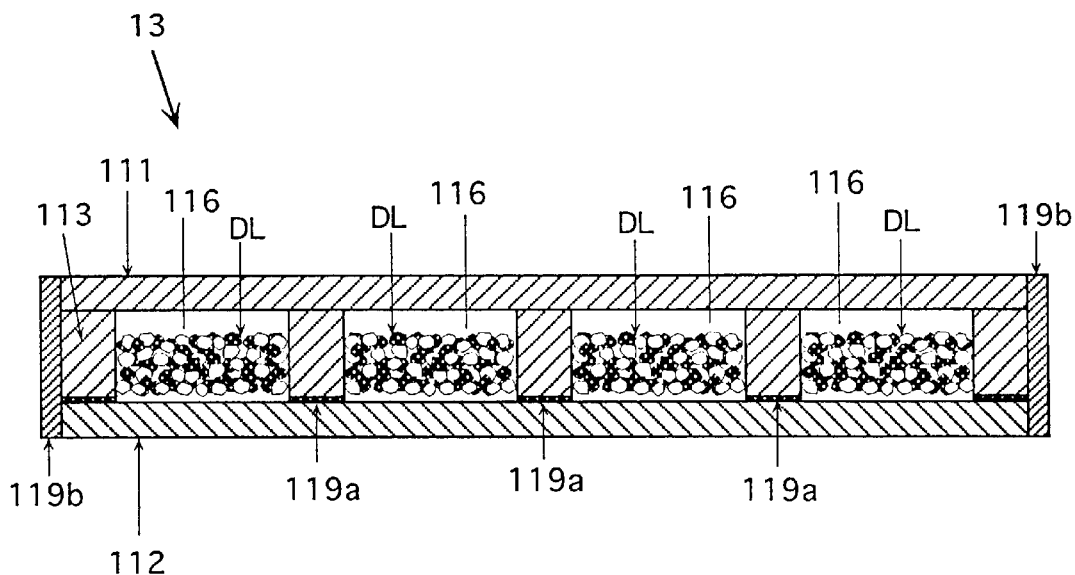
FIG. 7(A) and FIG. 7(B) show other example of the reversible image display medium.

FIG. 7(A) shows another example of the reversible image display medium.

The reversible image display medium 13 shown in FIG. 7(A) is identical with the medium 11 of FIG. 1 if the medium 11 is such that at least the first substrate 111 is formed of a material having a light transmitting property and an insulating property and that the first substrate electrode 114 and the second substrate electrode 115 are not provided.

The medium 13 is identical in other respects with the medium 11 of FIG. 1. In FIG. 7(A), the same components and parts as in the medium 11 are indicated with the same reference symbols.

Reversible Image Display Medium 14

Figure 8A:
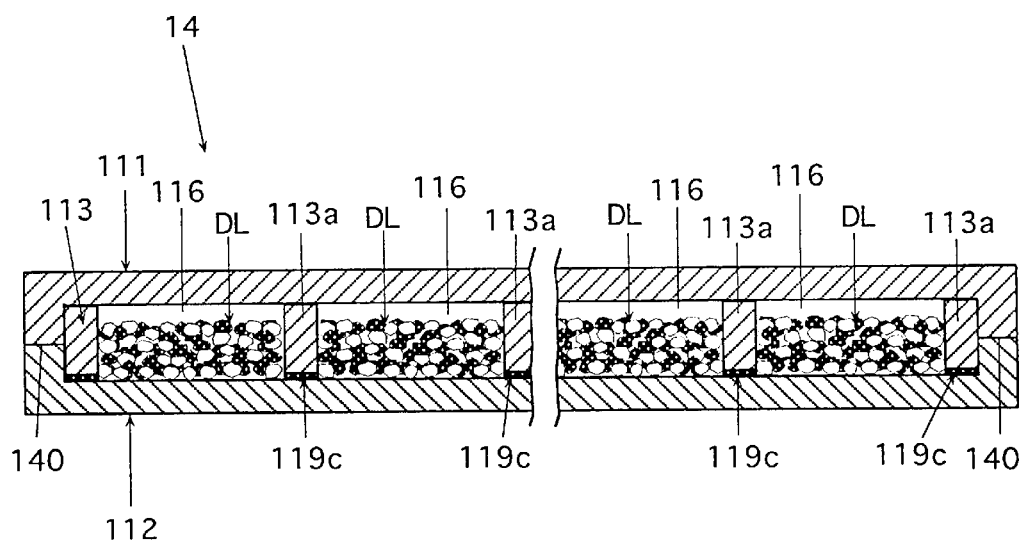
FIG. 8(A) and FIG. 8(B) show further example of the reversible image display medium.

FIG. 8(A) shows a further example of the reversible image display medium.

Figure 9:
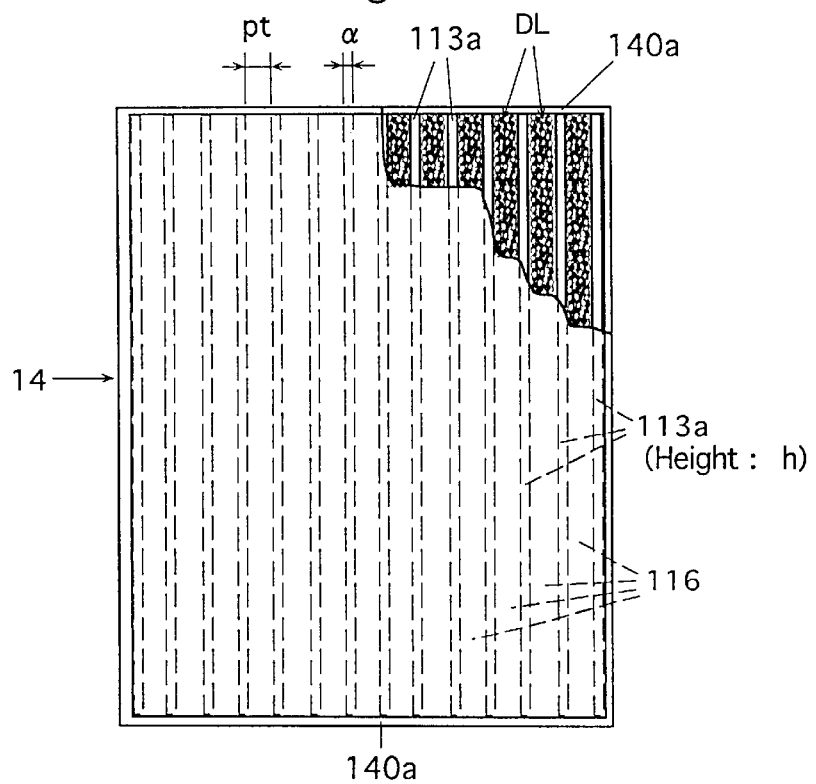
FIG. 9 is a plan view showing the medium shown in FIG. 8(A) and FIG. 8(B) as partly cut away.

The reversible image display medium 14 shown in FIG. 8(A) is identical with the medium 11 of FIG. 1 if the medium 11 is such that at least the first substrate 111 is formed of a material having a light transmitting property and an insulating property, that the first substrate electrode 114 and the second substrate electrode 115 are not provided, and that a partition member 113 is provided which consists of a plurality of partition walls 113a extending in parallel with the lengthwise side of the medium 14 instead of the grid-like partition member (see FIG. 9). The developer-accommodating cell 116 is provided between the neighboring partition walls 113a. Each cell 116 accommodates the developer DL containing mutually frictionally charged white developing particles WP and black developing particles BP.

In the periphery of the medium 14, the two substrates 111, 112 are heat-sealed to form a sealing portion 140. The part 140a of the sealing portion 140 is provided at the both ends of the longitudinal partition walls 113a extending in the lengthwise direction, and serves also as the partition wall forming the cell 116.

As shown in FIG. 9, the partition walls 113a are formed with a width α, a height h and a space pt between the adjacent partition walls 113a.

In the mediums 13, 14, for example, a) an electrostatic latent image corresponding to the image to be formed is directly formed on the first substrate 111, or b) an image carrier carrying the electrostatic latent image corresponding to the image to be formed is contacted with (or made close to) the first substrate 111. Thereby an image can be displayed by applying to the developer DL an electric field for driving the developing particles. The second substrate 112 may be set to a ground potential, if necessary.

Reversible Image Display Mediums 15, 15'

Figure 10A:
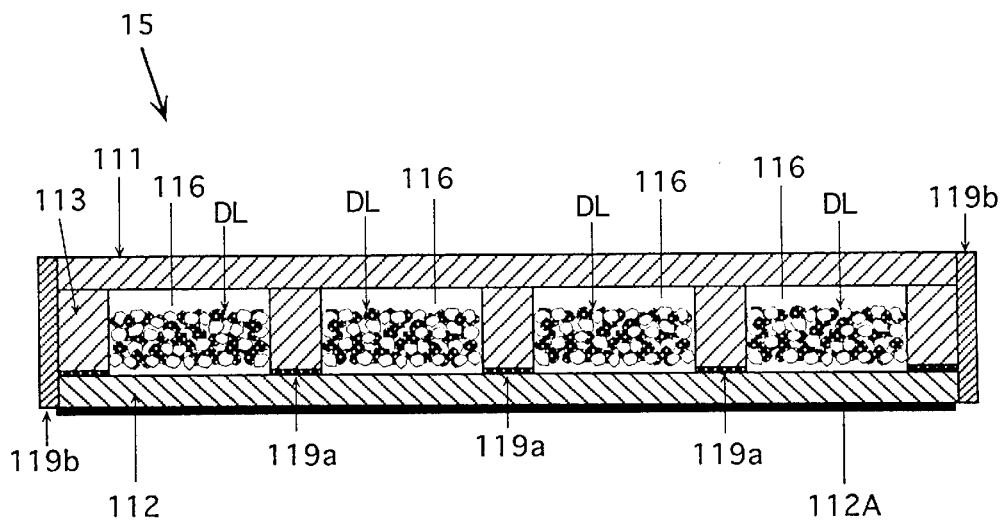
FIG. 10(A) is a sectional view showing another example of the reversible image display medium.
Figure 10B:
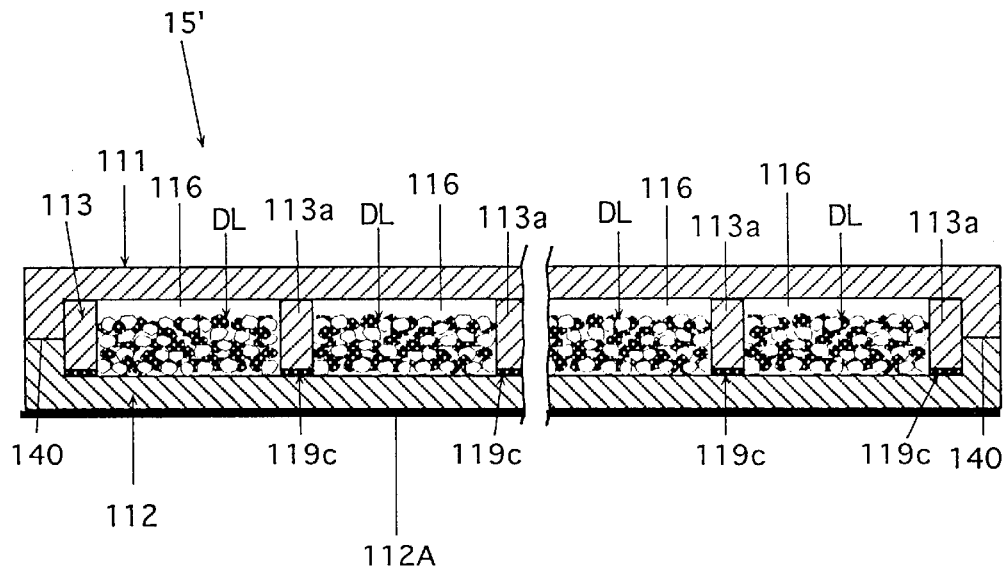
FIG. 10(B) is a sectional view showing a further example of the reversible image display medium.

FIG. 10(A) and FIG. 10(B) show further examples of the reversible image display medium.

The reversible image display medium 15 (15') shown in FIG. 10(A) (FIG. 10(B)) is identical with the medium 13 (14) except that an electrically conductive film 112A is formed on an outer surface of the second substrate 112 in the medium 13 (14).

The medium 15 (15') is identical in other respects with the medium 13 (14). In FIG. 10(A) and FIG. 10(B), the same components and parts as in the medium 13 (14) are indicated with the same reference symbols.

In image display by the mediums 15, 15', for example, the electrically conductive film 112A is set to a ground potential or like proper potential, and a) an electrostatic latent image corresponding to the image to be formed is directly formed on the first substrate 111, or b) an image carrier carrying the electrostatic latent image corresponding to the image to be formed is contacted with (or made close to) the first substrate 111, whereby an image can be displayed by application of electric field for driving the developing particles to the developer DL.

Optionally the second substrate 112 may be made electrically conductive by dispersing an electrically conductive material, instead of provision of the electrically conductive film 112A and may be set to a ground potential or like proper potential.

Each of the image display mediums already described with reference to the drawings and the image display method utilizing the mediums can repeat the image display and image erasure.

The developing particles WP and BP are contained in the cell, and it is not necessary to supply externally the developer into the cell. Thereby, it is possible to suppress significantly the use of medium such as paper sheets and consumable materials such as developer, which are required for image display in the prior art. Since a heat energy for melting and fixing the toner onto the medium is not required in contrast to the conventional image display, the image forming energy can be reduced. Accordingly, it is possible to satisfy the present demand for reduction in environmental loads.

Since each of the mediums 11 to 15' employs the dry developer DL including developing particles WP and BP of different colors, one kind of the developing particles WP (or BP) can hide the other kind of developing particles BP (or WP) to a higher extent so that the image display in higher contrast can be achieved.

The developing particles WP and BP accommodated in the cell are charged to the different polarities, respectively, and therefore can be easily moved for image display by the Coulomb force applied thereto. This also improves the contrast for image display, and can suppress remaining of the last image. Further, the image display can be quickly performed, and the drive voltage for image display can be lowered.

Further, employment of the dry developer DL can suppress settling and condensation of the developing particles so that lowering in contrast for the image display can be suppressed, and the image display can be stably performed for a long time. Since the settling and condensation of the developing particles are suppressed, remaining of the last displayed image can be suppressed. Since the change in quality with time is suppressed in the dry developer DL, this also allows stable image display for a long time.

Any one of the mediums 11 to 15' can display images in high resolution as compared with the conventional electrophoretic display.

The mediums except for the medium 11 can display images in higher resolution as compared with the medium 11 in which the resolution is affected by the size of the pixel electrodes 114a.

If the dry developer contained in any of reversible image display mediums 11 to 15' is set to have an average charge quantity of 1.0 $\mu$C/g to 10 $\mu$C/g as determined by an electric field separation measuring method, the reduction of contrast and the decrease in image density reproducibility can be suppressed, and the images can be smoothly erased, whereby the repeated image display is stabilized.

When, for example, black developing particles BP among the black developing particles BP and white developing particles WP of the developer DL contained in any of the mediums 11 to 15' are magnetic developing particles and have a coercive force of 50 oersteds to 250 oersteds, the displayed images can be held in a predetermined image density, in good contrast and in high stability. Further, image irregularities can be suppressed in image display, image display can be performed in good contrast and images can be smoothly erased.

When using black magnetic developing particles having an optical density of 1.0 or more, image display can be performed in good contrast.

If developer-accommodating cells in any of the mediums 11 to 15' are formed in a manner to satisfy the foregoing formulas 1 and 2 or to further satisfy the formula 3 on the assumption that developing particles a and b are developing particles WP and BP, respectively, images can be displayed in a predetermined image density and in good contrast.

If the amount of white non-magnetic developing particles WP of 3 $\mu$m or less in particle size in the volume particle size distribution as contained in the developer DL in any of the mediums 11 to 15' is 0.5 wt. % or less, it is possible to suppress the reduction in image quality due to the adhesion and fixing of white non-magnetic developing particles to the substrate on the image observation side. In respect of black magnetic developing particles BP, a stirring force can be sufficiently applied to the developer by a magnetic field by using 1 wt. % or less of the magnetic developing particles of 4 $\mu$m or less in particle size in the volume particle size distribution.

When a fluidization agent is added to the white non-magnetic developing particles, the adhesion of the particles can be reduced (flowability can be increased) by employing an addition proportion of the fluidization agent to white particles of 5 $\mu$m or less in particle size in the volume particle size distribution which proportion is different from an addition proportion of the fluidization agent to the white particles of more than 5 $\mu$m in particle size. Alternatively, the adhesion of particles can be reduced (flowability can be increased) by using the fluidization agent to be added to the white particles of 5 $\mu$m or less in particle size which agent is different from the fluidization agent to be added to the white particles of more than 5 $\mu$m in particle size.

When, for example, black developing particles BP among the black developing particles BP and white developing particles WP of the developer DL contained in any of the mediums 11 to 15' are magnetic developing particles, and the volume average particle size ratio in the white non-magnetic developing particles WP and the black magnetic developing particles BP (=volume average particle size of the black magnetic developing particles BP/volume average particle size of the white developing particles WP) is in a range of 1 to 10, the reduction in image quality can be suppressed.

When the volume average particle size ratio in the white non-magnetic developing particles WP and the black magnetic developing particles BP (=volume average particle size of the black magnetic developing particles BP/volume average particle size of the white non-magnetic developing particles WP) is in a range of 0.5 to 10, the decrease in image displaying rate can be suppressed.

Now, description is given below on examples of image display operation using mediums 12, 12', 13, 14, 15 and 15', as well as on image forming apparatuses.

Figure 11:
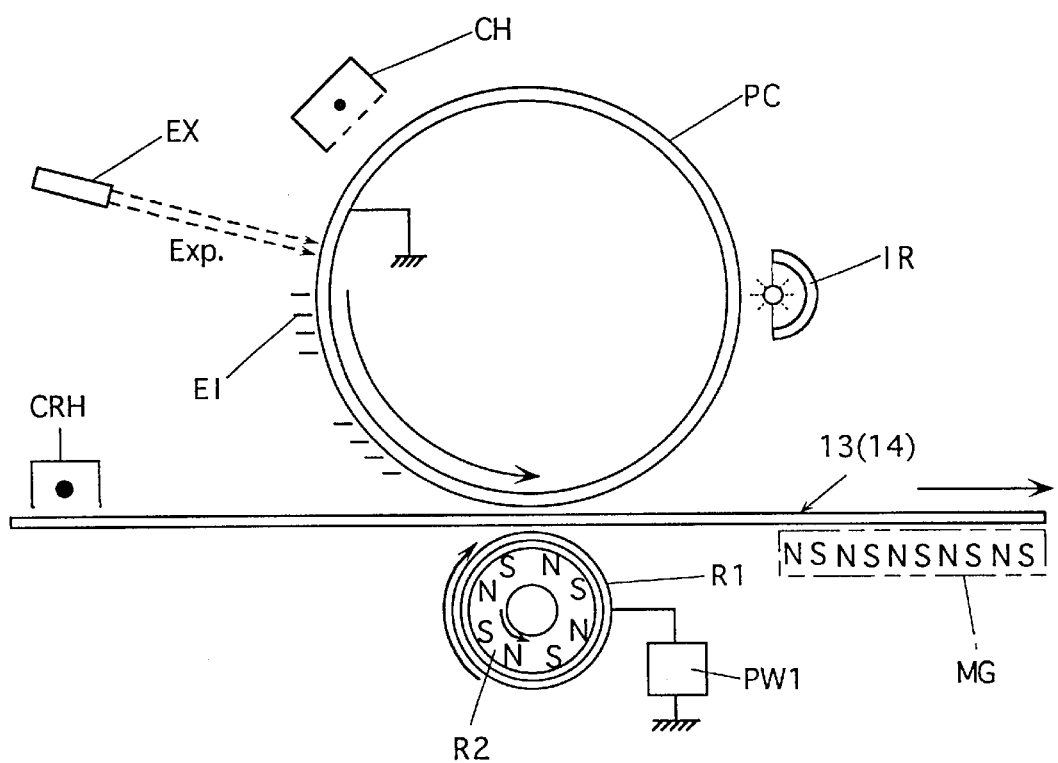
FIG. 11 is a view schematically showing an example of an image forming apparatus having an external electrostatic latent image forming device.

The image forming apparatus shown in FIG. 11 includes a photosensitive drum PC which is driven to rotate in the direction of an arrow in the drawing. Provided around the photosensitive drum PC are a scorotron charger CH, a laser image exposing device EX, and an eraser lamp IR. The electrode roller R1 which is driven to rotate is provided under the drum PC. The electrode roller R1 is a developing electrode roller for forming an electrostatic field for image display. The electrode roller R1 can be supplied with a bias voltage from the power source PW1 and may be internally provided with a rotary magnetic pole roller R2 which is driven to rotate in a direction opposite to that of the roller R1 (or which is driven to rotate reciprocatingly).

After the surface of the drum PC is charged by the charger CH, image exposure is performed on the charged region by the laser image exposing device EX to form an electrostatic latent image E1 on the drum PC. On the other hand, the electrode roller R1 is supplied with a bias voltage from the power source PW1. Optionally the electrode roller R1 may be set to a ground potential.

Then, e.g. the medium 13 or 14 is sent between the drum PC and the electrode roller R1 in synchronization with the electrostatic latent image E1 on the drum PC. In this operation, the surface of the medium 13 (14) is uniformly charged by the charger CRH such as a corona charger to carry a predetermined potential.

Figure 7B:
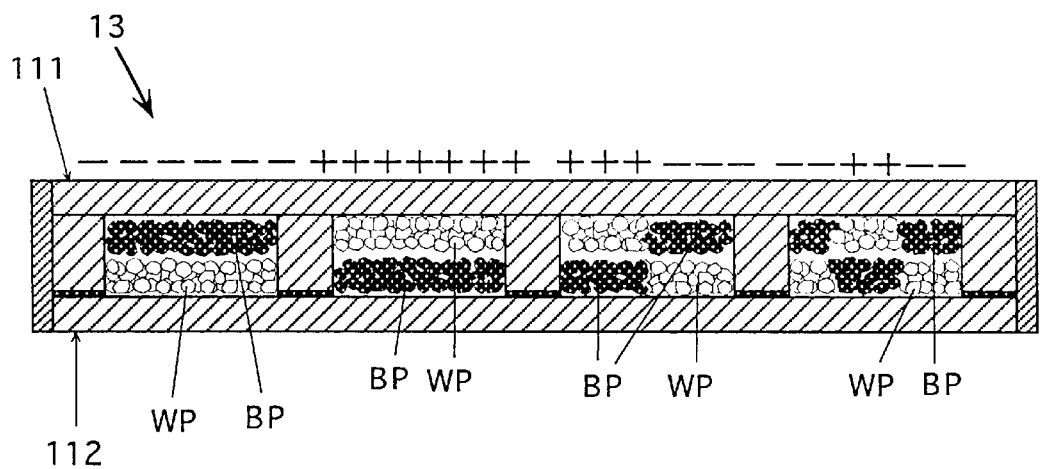
Figure 8B:
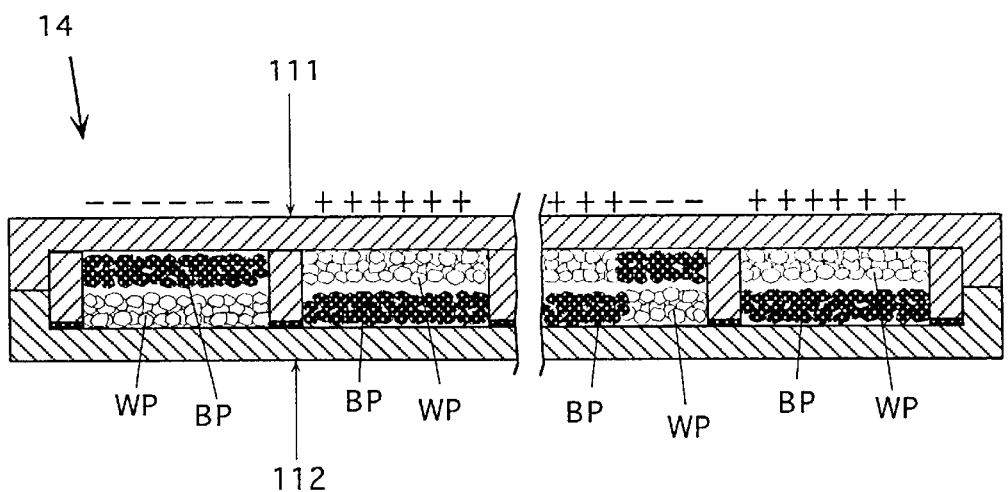

In this way, an electrostatic field is formed based on the electrostatic latent image E1 and applied to the developing particles BP, WP of the developer DL accommodated in the cells 116 of the medium 13 (14), whereby the developing particles are moved by the Coulomb force exerted between the electrostatic field and the charged developing particles. Subsequently the white and black particles WP, BP mingled as shown in FIG. 7(A) or FIG. 8(A) are moved according to the electric field as shown in FIG. 7(B) or FIG. 8(B), whereby images can be displayed in the predetermined contrast.

After image display as described above, the charges on the surface of the photosensitive drum PC are erased by the eraser lamp IR to make ready for the next printing.

It is not essential that the surface of the medium 13 (14) be charged by the charger CRH.

When the developer DL contains magnetic developing particles in image display, e.g. black developing particles BP are magnetic, the magnetic pole roller R2 is provided and rotated whereby the developer DL in the cells 116 is stirred and the developing particles BP, WP become easily movable to accomplish display of better images with lower drive voltage.

If the developer DL contains magnetic developing particles in the medium 11 shown in FIGS. 1 and 2, the rotary magnetic pole roller R2 is usable as indicated with a chain line in FIG. 2.

Optionally, a magnet plate MG with alternately arranged S and N magnetic poles may be provided downstream in a medium feed path as shown with a chain line in FIG. 11 instead of the rotary magnetic pole roller R2.

Using the mediums 12, 12' or the mediums 15, 15', image display can be also achieved by this image forming apparatus. When images are displayed on the medium 12, 12', 15 or 15', the following electrodes or the like may be grounded or supplied with a bias voltage: the second electrode 115 in the medium 12, the pixel electrodes 114a in the medium 12' and the electrically conductive film 112A in the mediums 15, 15'.

Figure 12A:
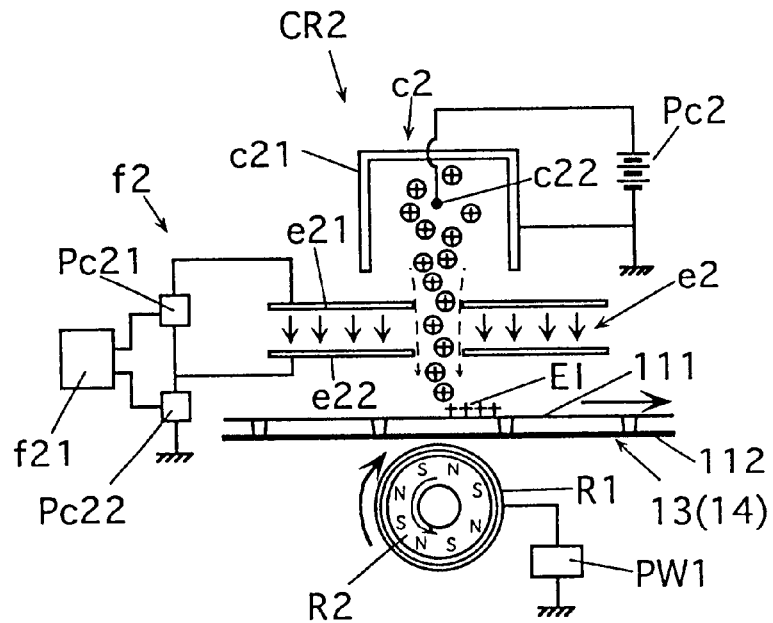
FIG. 12(A) and FIG. 12(B) show a schematic view showing the structure of an example of an image forming apparatus having an ion flow type direct electrostatic latent image forming device.

The image forming apparatus shown in FIG. 12(A) includes a direct electrostatic latent image forming device CR2 of an ion flow type. The device CR2 includes a corona ion generating portion c2 for generating corona ions, a write electrode e2 for leading the corona ions generated by the ion generating portion onto the surface of, e.g., the first substrate 111 in the medium 13 (or 14), a write electrode control circuit f2 for applying to the write electrode e2 the voltage, which is used for leading the positive or negative corona ions to the pixel corresponding portion on the surface of the substrate 111 in accordance with the image to be displayed.

The corona ion generating portion c2 includes a shield casing c21 and a corona wire c22, which is stretched in the casing c21. The corona wire c22 is formed of, e.g., gold-plated tungsten wire of 60 $\mu$m to 120 $\mu$m in diameter. A power source Pc2 applies a positive or negative voltage (4 kV to 10 kV) to the wire c22 for generating the corona ions.

The write electrode e2 is opposed to a portion of the shield casing c21, which faces the first substrate 111 of the medium 13 (or medium 14). The write electrode e2 is formed of upper and lower electrodes e21 and e22, and is provided at its center with a hole, through which the corona ions can flow.

The electrode control circuit f2 includes a control power source Pc21, a bias power source Pc22 and a control portion f21. The control portion f21 can apply to the electrodes e21 and e22 the ion leading voltages corresponding to the polarity of the ions to be led toward the medium 13.

Under the control by the control portion f21, the positive and negative voltages are applied to the upper and lower electrodes e21 and e22, respectively, whereby the positive corona ions can be led to the medium (FIG. 12(A)). By applying the negative and positive voltages to the upper and lower electrodes e21 and e22, respectively, the positive corona ions can be confined (FIG. 12(B)).

The electrode roller R1 is opposed to the write electrode e2, and is supplied with a positive bias voltage from the power source PW1 or the roller R1 is grounded. The roller R1 is internally provided with a magnetic pole roller R2, which is driven to rotate.

Figure 12B:
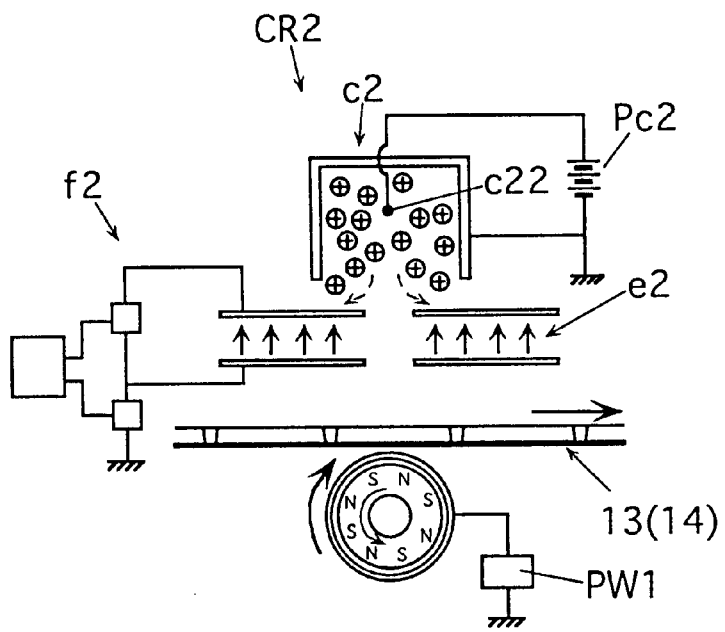

The surface of the medium 13 (or 14) is uniformly charged to a predetermined potential by a charger such as corona charger and the charged medium 13 (14) is moved relatively to the device CR2. At the same time, the electrode roller R1 is driven to rotate in the medium feed direction, and the magnetic pole roller R2 is rotated in the opposite direction. In accordance with the instruction by the control portion f21, positive corona ions are led to the predetermined pixel corresponding portion corresponding to the image to be displayed among the plurality of pixel corresponding portions on the surface of the first substrate 111, as shown in FIG. 12(A), and outflow of the ions are prevented for the other pixels as shown in FIG. 12(B). Thus the image display on the medium 13 (or 14) can be performed as shown in FIGS. 7(B) and 8(B).

It is not essential that the surface of the medium 13 (or 14) is previously charged. The discharging wire c22 in the device CR2 may be replaced with solid discharging elements.

Using the mediums 12, 12' or the mediums 15, 15', image display can be achieved by this image forming apparatus. When images are displayed on these medium 12, 12', 15 or 15', the following electrodes or the like may be used instead of the electrode roller R1 and may be grounded or supplied with a bias voltage: the second electrode 115 in the medium 12, the pixel electrodes 114a in the medium 12' and the electrically conductive film 112A in the mediums 15, 15'.

The electrostatic latent image forming device CR2 shown in FIG. 12(A) utilizes the discharging phenomenon. Instead of it, electrostatic latent image forming devices of various discharging types other than the above may be utilized.

Figure 13:
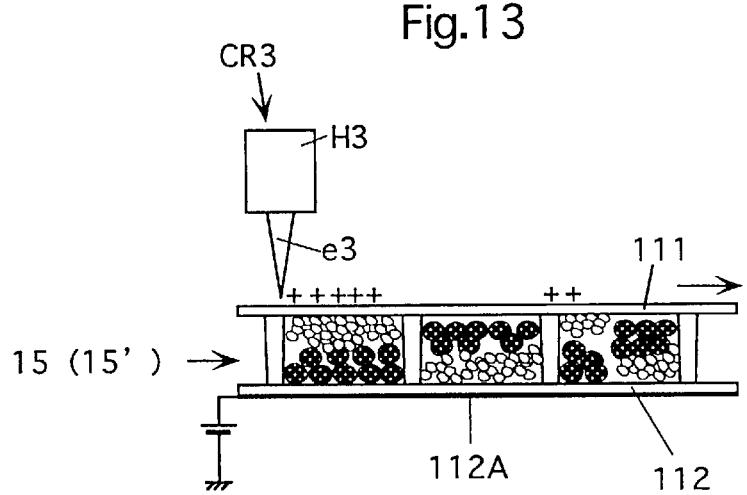
FIG. 13 is a schematic view showing the structure of an example of an image forming apparatus having a multi-stylus type direct electrostatic latent image forming device.

The image forming apparatus shown in FIG. 13 includes a direct electrostatic latent image forming device CR3 of the multi-stylus type. The device CR3 includes a multi-stylus head H3 having a plurality of electrodes e3, which are arranged in the main scanning direction of, e.g., medium 15 (or 15'), and are arranged close to the first substrate 111. A signal voltage is applied to each electrode e3 for applying electrostatic latent image charges to the pixel corresponding portion on the surface of the first substrate 111 in accordance with the image to be displayed. The medium 15 (or 15') is transported relatively to the head H3, e.g., while applying a bias to the conductive film 112A of the second substrate 112 or the film 112A is grounded so that the image display is performed.

Using the mediums 12, 12', images can be formed by the foregoing image forming apparatus. In this case, the second electrode 115 of the medium 12 and the electrodes 114a of the medium 12' may be supplied with a bias voltage, when so required.

In the mediums 13, 14, the outer surface of the second substrate 112 may be supplied with a bias voltage or it may be contacted with an external electrode which can be grounded, whereby images can be displayed by the foregoing image forming apparatus.

Figure 14:
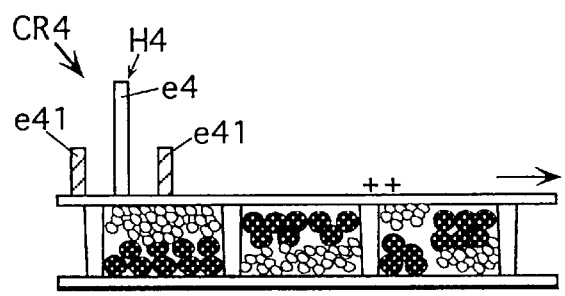
FIG. 14 is a schematic view showing the structure of an example of an image forming apparatus having a multi-stylus type direct electrostatic latent image forming device provided with neighboring control electrodes.

The image forming apparatus shown in FIG. 14 includes a direct electrostatic latent image forming device CR4 of the charge injection type. The device CR4 is of a multi-stylus type, and has an electrostatic record head H4, in which a plurality of record electrodes e4 are arranged in the main scanning direction of the medium, and neighboring control electrodes e41 are arranged close to the record electrodes e4. This head is located, e.g., near the medium, and the control electrodes e41 of the head H4 are successively and sequentially supplied with a voltage nearly equal to half the voltage (record voltage) required for the image recording. Also, the record electrodes e4 are supplied with the image signal voltage nearly equal to half the record voltage. Thereby, the electrostatic latent image can be formed on the medium located immediately under the record electrode.

Figure 16:
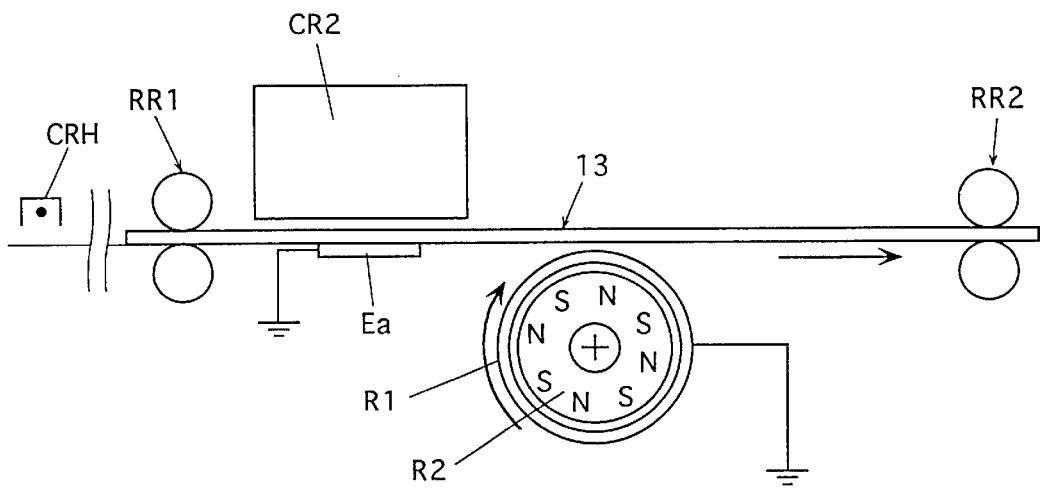
FIG. 16 is a view schematically showing the structure of another example of the image forming apparatus having an ion flow type direct electrostatic latent image forming device.

An image forming apparatus shown in FIG. 16 employs the ion flow type direct electrostatic latent image forming device CR2 shown in FIG. 12. In this image forming apparatus, the image display medium 13 or the like is transported from a pair of inlet side medium feed rollers RR1 to a pair of outlet side medium feed rollers RR2. The ion flow type direct electrostatic latent image forming device CR2 is disposed between these feed rollers and a roller R1 is arranged downstream thereof. A ground electrode Ea is disposed in a position opposed to the device CR2. The roller R1 is grounded and is internally provided with a magnet roller R2 which is driven to rotate for stirring the developer in the medium. A charger CRH is opposed to a medium feed path upstream of the pair of inlet side feed rollers RR1.

In the image forming apparatus shown in FIG. 16, the surface of the substrate on the electrostatic latent image forming side of the medium 13 or the like containing magnetic developing particles is uniformly charged by the charger CRH to carry a predetermined potential. Then, an electrostatic latent image corresponding to an image to be formed is formed by the device CR2 on the charged medium 13 or the like, and the developer in the medium is stirred by the magnet roller R2 to perform image display. A magnet plate MG shown in FIG. 11 may be disposed downstream of the device CR2 instead of the magnet roller R2. Thereby an oscillating magnetic field for stirring the developer is formed while the medium is transported.

A proper bias may be applied from the roller R1 to the medium such as the medium 15 or 15' shown in FIG. 10(A) or FIG. 10(B) in which the electrically conductive film 112A is formed on the substrate 112 opposed to the substrate on the electrostatic latent image forming side. When this bias is applied, the medium is supplied with a bias potential between a surface potential of an image portion and a surface potential of a non-image portion of the substrate 111.

Figure 24:
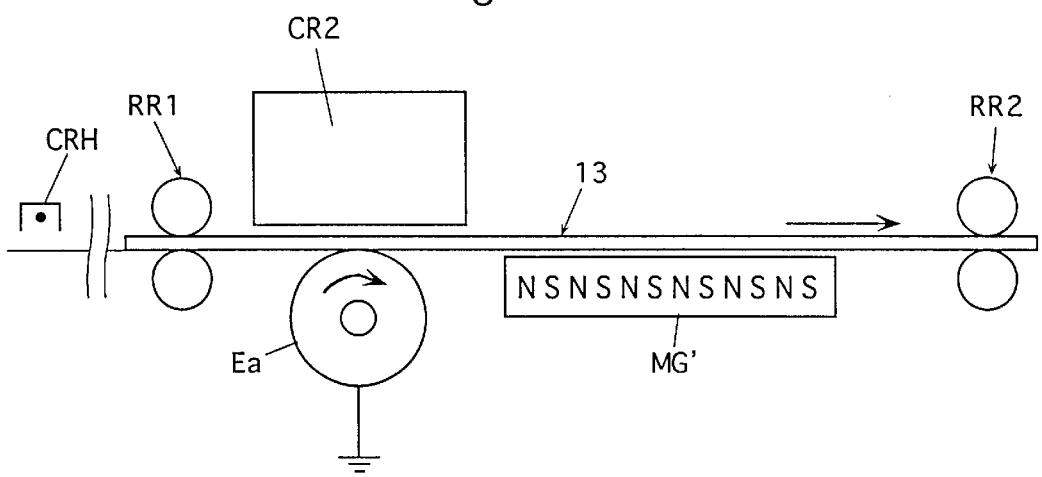
FIG. 24 is a view showing a further example of the image forming apparatus.

An image forming apparatus shown in FIG. 24 employs the ion flow type direct electrostatic latent image forming device CR2 shown in FIG. 12. In this image forming apparatus, the image display medium 13 or the like is transported from the pair of inlet side medium feed rollers RR1 to the pair of outlet side medium feed rollers RR2. The ion flow type direct electrostatic latent image forming device CR2 is disposed between these feed rollers. A rubber magnet plate MG' having N and S poles alternately arranged is disposed downstream thereof. The ground electrode Ea is disposed in a position opposed to the device CR2. The charger CRH is opposed to the medium feed path upstream of the pair of inlet side feed rollers RR1.

In the image forming apparatus shown in FIG. 24, the surface of the substrate on the electrostatic latent image forming side of the medium 13 or the like containing magnetic developing particles is uniformly charged by the charger CRH to carry a predetermined potential. Then, an electrostatic latent image corresponding to an image to be formed is formed by the device CR2 on the charged medium 13 or the like. Then, an oscillating magnetic field for stirring the developer is applied by the magnet plate MG' while the medium is transported, whereby the image can be displayed by stirring the developer in the medium.

A proper bias may be applied from a roller type of electrode Ea to a medium such as the medium 15 or 15' as shown in FIG. 10(A) or FIG. 10(B) in which the electrically conductive film 112A is formed on the substrate 112 opposed to the substrate on the electrostatic latent image forming side. When this bias is applied, the medium is supplied with a bias potential between the surface potential of an image portion and the surface potential of a non-image portion of the substrate 111.

Now, description is given below on specific examples of developing particles and developer, and on specific examples of the reversible image display medium and experimental examples using the image display mediums.

(I) Examples of Adjustment of Average Charge Quantity of the Developer as Measured by Electric Field Separation Measuring Method
<Developing Particles and Developer>
White Developing Particles WP In a Henschel mixer were thoroughly mixed 100 parts by weight of thermoplastic polyester resin (softening point: 121° C., Tg: 67° C.), 40 parts by weight of titanium oxide (Ishihara Sangyo Kaisha., Ltd.: CR-50) and 0 to 6 parts by weight of salicylic acid-zinc complex (minus-charge-controlling agent, Orient Chemical Co., Ltd.: Bontron E-84). The mixture was further mixed by a twin-screw extruder and then cooled. The mixture was roughly pulverized, then pulverized by a jet mill and classified with wind to obtain white fine particles which have a volume average particle size of 10.1 $\mu$m. To the white fine particles was added 0.1 to 0.3 parts by weight of hydrophobic silica fine particles (Nihon Aerosil Co., Ltd.: Aerosil R-972). The mixture was mixed by a Henschel mixer to prepare white developing particles WP.

Black Developing Particles BP

In a Henschel mixer were thoroughly mixed 100 parts by weight of styrene-n-butyl methacrylate resin (softening point: 132° C., Tg: 65° C.), 2 parts by weight of carbon black (Lion Oil & Fat Co., Ltd.: Ketchen Black), 1.5 parts by weight of silica (Nihon Aerosil Co., Ltd.: #200) and 500 parts by weight of magnetic powder containing magnetite (RB-BL, Titan Kogyo Co., Ltd.). The mixture was further mixed by a kneader.

After cooling, the mixture was roughly pulverized by a feather mill, then finely pulverized by a jet mill and classified with wind to obtain black particles BP which have a volume average particle size of 25 $\mu$m.
Preparation of Developer DL The white particles WP (30 g) and the black particles BP (70 g) were placed into a polyethylene bottle. The bottle was rotated by a ball mill pedestal to perform kneading and mixing for 30 minutes to obtain each developer DL (DL1 to DL10). The white developing particles WP were negatively charged and black developing particles BP were positively charged in the developers.

Table 1 shows an average charge quantity of each of the obtained developers as measured by an electric field separation measuring method. The charge quantity (positive polarity charge quantity) of black developing particles BP in each developer is the same in terms of absolute value as the white developing particles WP in the developer. The charge quantity (absolute value) of white developing particles shown in Table 1 is the charge quantity of the developer.

Description is given below on the measurement of average charge quantity of the developer DL containing white developing particles WP and black developing particles BP according to an electric field separation measuring method.

Figure 15:
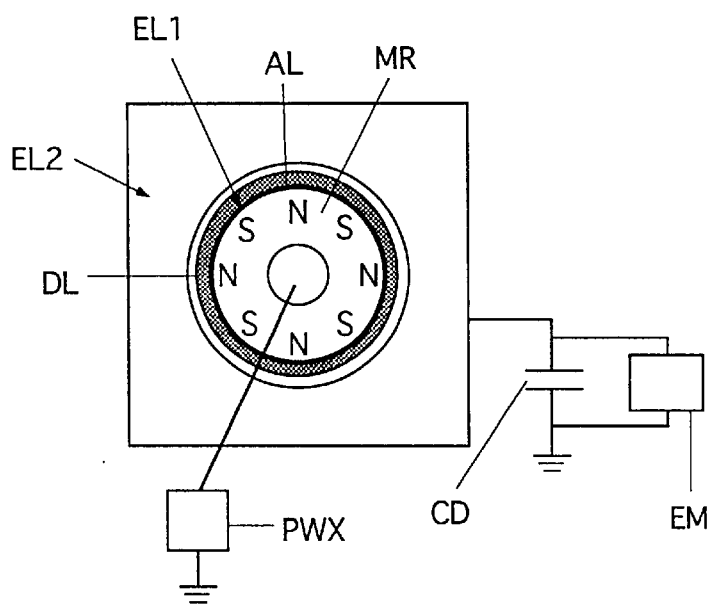
FIG. 15 is a view showing an example of the measurement of an average charge quantity of the developing particles as determined by an electric field separation measuring method.

As shown in FIG. 15, a magnet electrode EL1 was provided in which a magnet roller MR circular in cross section was rotatably driven in a cylindrical sleeve AL made of non-magnetic aluminum, and an opposite electrode EL2 was provided which can be externally fitted around the sleeve AL with a space of about 1.5 mm therebetween.

The magnet roller MR include N and S poles alternately arranged (8 poles in total). The width of each magnetic pole in a circumferential direction of the roller was 70 mm and the poles extend in a direction of rotating axis of the roller. The cylindrical sleeve AL had a diameter of 30 mm.

The initial weight of the opposite electrode EL2 was measured. Then 1 g (gram) of the developer DL having a charge quantity to be measured was uniformly disposed on an external circumferential surface of the sleeve AL of the magnet electrode EL1. The opposite electrode EL2 was externally fitted around the sleeve AL with a space of about 1.5 mm therebetween so that it was out of contact with the developer.

To the sleeve AL was connected a power source PWX for applying a polarity voltage for flying the white particles WP in the developer DL to the opposite electrode EL2. The opposite electrode EL2 was grounded via a condenser CD (1 $\mu$F), and a voltmeter EW was connected to both ends of the condenser.

The foregoing voltage was applied from the power source PWX to the sleeve AL in this state while the magnet roller MR was rotated at 1000 rpm (with the sleeve AL fixed). Thereby the developer was stirred, and the white particles WP were flied and fixed to the opposite electrode EL2 so that the black particles BP were fixed to the surface of the sleeve AL due to the magnetic force.

After about 30 seconds, the revolution of the roller MR was stopped and the charge quantity collected in the condenser CD was calculated from the value indicated by the voltmeter EM. Then, the weight of the opposite electrode EL2 having the white particles WP adhered thereto was measured to calculate a difference (weight of adhered white particles) between the obtained weight and the initial weight. An average charge quantity of the white particles was obtained from the charge quantity collected in the condenser CD and from the weight difference (charge quantity of condenser/weight of adhered white particles).

The obtained average charge quantity (absolute value) of the white developing particles is an average charge quantity of the developer.

TABLE 1

| | white particle WP | | |
|---|---|---|---|
| developer DL | charge-controlling agent E-84 weight part | amount of hydrophobic silica particles R972 weight part | charge quantity $\mu C/g$ |
| DL1 | 0 | 0.1 | −0.6 |
| DL2 | 1.0 | 0.1 | −1.2 |
| DL3 | 2.0 | 0.1 | −2.6 |
| DL4 | 0 | 0.3 | −2.8 |
| DL5 | 1.0 | 0.3 | −4.8 |
| DL6 | 2.0 | 0.3 | −5.6 |
| DL7 | 3.0 | 0.3 | −7.2 |
| DL8 | 4.0 | 0.3 | −9.5 |
| DL9 | 5.0 | 0.3 | −10.8 |
| DL10 | 6.0 | 0.3 | −12.8 |

<Reversible Image Display Mediums D1 to D10>

These reversible image display mediums are of the same type as the medium 13 shown in FIGS. 7(A) and 7(B) and were prepared as follows.

A film of UV-curing resin of 100 µm thickness was brought close to a first substrate 111 formed of a transparent PET (polyethylene terephthalate) film of 25 µm thickness. Over the UV-curing resin film was laid a photomask opened in a specified pattern. The top of the photomask was irradiated with UV rays, followed by development and washing. A grid-like partition member 113 was formed on the substrate 111 (see FIG. 3). Partition walls 113a forming the partition member 113 had a thickness (width) α (50 µm), a height h (100 µm), and a wall space pt between the neighbouring wall portions (corresponding to one side of the electrode 114a) (1 mm). The substrate 111 was located on the image observation side (on which an electrostatic latent image was formed).

A solution of a surfactant was applied to the surface, on which the partition member 113 had been formed, of the substrate 111 and dried to adjust the resistance thereof.

One of developers DL1 to DL10 was placed into each square cavity surrounded with the partition wall 113a of the first substrate 111. The volume proportion of the developer placed into the cavities was 30% based on the volume of the cavity.

A photo-curing adhesive 119a (see FIG. 7(A)) was applied to a small thickness only to the top of the partition member 113 on the first substrate 111. Subsequently, a PET film of 25 µm in thickness containing carbon black as a second substrate 112 was brought close to the adhesive. Then, the adhesive was cured by UV irradiation to adhere the film.

Thereafter, the peripheries of the first and second substrates 111, 112 were heat-sealed instead of sealing with the epoxy resin adhesive 119b as shown in FIG. 7(A).

In this way, 10 kinds of mediums D1 (having developer DL1) to D10 (having developer DL10) of the type shown in FIG. 7(A) were produced.

Image display was performed using each of the mediums D1 to D10 by the image forming apparatus including the ion flow type direct electrostatic latent image forming device CR2 as shown in FIG. 12.

In each image display, the surface of the first substrate 111 was uniformly charged by a corona charger (not shown) to carry a negative polarity potential (−500 V). The second substrate 112 of the charged medium was set to a ground potential. Then, positive corona ions were led to the predetermined pixel corresponding portions corresponding to the image to be displayed among a plurality of pixel corresponding portions on the surface of the first substrate 111 of the medium. The portions were charged to carry a positive polarity potential (+500 V), in other words, to carry the same potential (500 V) in terms of absolute value as the above negatively charged polarity potential (−500 V). For the other pixels, only a bias potential (ground potential) was applied. Thereby the positive corona ion-charged portions and the non-charged portions were charged to carry the same potential (500 V) in terms of absolute value and to give different polarities. Thus, image display was conducted such that the positive corona ion-loaded portions were displayed in white by negatively charged white developing particles WP and the positive corona ion-unloaded portions were displayed in black by positively charged black developing particles BP.

In image display, the magnetic pole roller R2 was rotated to apply a stirring force to the developing particles in the medium, whereby images were smoothly displayed.

Using each of the mediums D1 to D10, image display was performed as described above to evaluate the contrast of displayed images, and to evaluate the initial images, the images after repeated image display, and the stability of the images after repeated image display (image density reproducibility and property of suppressing the remaining of last images).

The contrast was evaluated by measuring the average image density (Bk av.) of the black portions and the average image density (W av.) of the white portions by a reflection densitometer (product of Konica Corporation, Sakura DENSITMETER PDA-65). The average density ratio (Bk av./W av.) of 5.0 or more was rated as good (○) and that of less than 5.0 as poor (×).

The repeated image stability was evaluated by comparing the average image density of initially displayed images with the average image density of repeatedly displayed images (the 50$^{th}$ images after 49 times repetition). When the change of average image density between the initially displayed image and repeatedly displayed image (the 50$^{th}$ image after 49 times repetition) was 0.2 or less, it was rated as good (○). The value of more than 0.2 was rated as not good (×).

The image evaluation results are shown in Table 2.

TABLE 2

| reversible image display medium | initial image | | | | | | 50th image after 49 times repetition | | | | | |
|---|---|---|---|---|---|---|---|---|---|---|---|---|
| | black portion | | | white portion | | | black portion | | | white portion | | |
| | maximum density ① | minimum density ② | average density (Bk av.) ③ | maximum density ④ | minimum density ⑤ | average density (W av.) ⑥ | maximum density ⑦ | minimum density ⑧ | average density (Bk av.) ⑨ | maximum density ⑩ | minimum density ⑪ | average density (W av.) ⑫ |
| D1 | 1.33 | 0.90 | 1.12 | 0.65 | 0.48 | 0.57 | 1.20 | 0.70 | 0.95 | 0.75 | 0.52 | 0.64 |
| D2 | 1.55 | 1.48 | 1.52 | 0.32 | 0.25 | 0.29 | 1.50 | 1.38 | 1.44 | 0.34 | 0.22 | 0.28 |
| D3 | 1.62 | 1.52 | 1.57 | 0.28 | 0.23 | 0.26 | 1.55 | 1.44 | 1.50 | 0.26 | 0.23 | 0.25 |
| D4 | 1.65 | 1.57 | 1.61 | 0.25 | 0.21 | 0.23 | 1.60 | 1.52 | 1.56 | 0.25 | 0.22 | 0.24 |
| D5 | 1.64 | 1.56 | 1.60 | 0.24 | 0.20 | 0.22 | 1.59 | 1.48 | 1.54 | 0.24 | 0.21 | 0.23 |
| D6 | 1.63 | 1.53 | 1.58 | 0.23 | 0.21 | 0.22 | 1.61 | 1.48 | 1.55 | 0.25 | 0.22 | 0.24 |
| D7 | 1.65 | 1.52 | 1.59 | 0.25 | 0.22 | 0.24 | 1.60 | 1.45 | 1.53 | 0.24 | 0.20 | 0.22 |
| D8 | 1.59 | 1.53 | 1.56 | 0.30 | 0.23 | 0.27 | 1.52 | 1.42 | 1.47 | 0.30 | 0.25 | 0.28 |
| D9 | 1.59 | 1.53 | 1.56 | 0.28 | 0.24 | 0.26 | 1.43 | 1.28 | 1.36 | 0.35 | 0.28 | 0.32 |
| D10 | 1.53 | 1.43 | 1.48 | 0.40 | 0.23 | 0.32 | 1.32 | 1.18 | 1.25 | 0.56 | 0.30 | 0.43 |

| reversible image display medium | initial image contrast Bk av./W av. ③/⑥ | | 50th image after 49 times repetition contrast Bk av./W av. ⑨/⑫ | | repetition stability ③−⑨ | overall evaluation |
|---|---|---|---|---|---|---|
| D1 | 2.0 | X | 1.5 | X | 0.17 | ○ |
| D2 | 5.3 | ○ | 5.1 | ○ | 0.08 | ○ |
| D3 | 6.2 | ○ | 6.1 | ○ | 0.08 | ○ |
| D4 | 7.0 | ○ | 6.6 | ○ | 0.05 | ○ |
| D5 | 7.3 | ○ | 6.8 | ○ | 0.06 | ○ |
| D6 | 7.2 | ○ | 6.6 | ○ | 0.04 | ○ |
| D7 | 6.7 | ○ | 6.9 | ○ | 0.06 | ○ |
| D8 | 5.9 | ○ | 5.3 | ○ | 0.09 | ○ |
| D9 | 6.0 | ○ | 4.3 | X | 0.21 | X |
| D10 | 4.7 | X | 2.9 | X | 0.23 | X |

○: 5.0 or more  ○: 5.0 or more  ○: 0.2 or less
X: other  X: other  X: other

As apparent from Table 2, a proper average charge quantity of the dry developer in the medium is in a range of 1.0 µC/g to 10 µC/g as determined by the electric field separation measuring method.

The same can be mentioned about the mediums of the same type as the mediums 11, 12, 12', 14, 15 and 15'.

(II) Examples of Controlling the Coercive Force of Black Magnetic Developing Particles and the Optical Reflection Density Thereof <Developing Particles and Developer>

White Developing Particles WP

In a Henschel mixer were thoroughly mixed 100 parts by weight of thermoplastic polyester resin (softening point: 121° C., Tg: 67° C.), 40 parts by weight of titanium oxide (Ishihara Sangyo Kaisha, Ltd.: CR-50) and 5 parts by weight of salicylic acid-zinc complex (minus-charge-controlling agent, Orient Chemical Co., Ltd.: Bontron E-84). The mixture was further mixed by a twin-screw extruder and then cooled. The mixture was roughly pulverized, then pulverized by a jet mill and classified with wind to obtain white fine particles which have a volume average particle size of 10.1 µm. To the white fine particles was added 0.3 parts by weight of hydrophobic silica particles (Nihon Aerosil Co., Ltd.: Aerosil R-972). The mixture was mixed by a Henschel mixer to prepare white developing particles WP.

Black Developing Particles BP

In a Henschel mixer were thoroughly mixed 100 parts by weight of styrene-n-butyl methacrylate resin (softening point: 132° C., Tg: 65° C.), a specified amount of carbon black (Lion Oil & Fat Co., Ltd.: Ketchen Black), a specified amount of silica (Nihon Aerosil Co., Ltd.: #200) and a specified amount of magnetic powder containing magnetite (RB-BL, Titan Kogyo Co., Ltd.). The mixture was further mixed by a kneader.

After cooling, the mixture was roughly pulverized by a feather mill, then finely pulverized by a jet mill and classified with wind to obtain black particles BP (BP1 to BP11) which have a volume average particle size of 25 µm or 26 µm.

The particulars of the black developing particles BP1 to BP11 are shown in Table 3.

The coercive force of black magnetic developing particles as shown in Table 3 was measured with use of a device for automatically recording a direct current magnetization characteristic (Yokogawa Hokushin Denki Co., Ltd., TYPE-3257).

Each kind of magnetic developing particles BP1 to BP11 was packed into a cylindrical cell of 200 µm depth and 6 mm inner diameter. Then the top portion of developing particles was cut by rubbing to a flat level along the edge of the cell opening. The reflectivity of the cut surface was measured using a reflection densitometer (product of X-Rite Incorporated, 310 TR, aperture diameter 2 mm).

The cylindrical cell was placed on a white reflection plate having a reflection density of 0.07, when measuring the optical reflection density.

TABLE 3

| black magnetic particles | binder resin styrene-n butyl methacrylate resin (weight part) | magnetic powder magnetite RB-BL-P (weight part) | carbon black ketchen black EC (weight part) | silica aerosil#200 (wt %) | black magnetic particles average particle size ($\mu$m) | coercive force Hc (Oe) | optical reflection density |
|---|---|---|---|---|---|---|---|
| BP1  | 100 | 1   | 10 | 1.5 | 26 | 5   | 1.55 |
| BP2  | 100 | 2   | 10 | 1.5 | 26 | 50  | 1.55 |
| BP3  | 100 | 10  | 10 | 1.5 | 26 | 100 | 1.5  |
| BP4  | 100 | 200 | 10 | 1.5 | 26 | 201 | 1.5  |
| BP5  | 100 | 700 | 10 | 1.5 | 25 | 250 | 1.5  |
| BP6  | 100 | 900 | 10 | 1.5 | 25 | 260 | 1.45 |
| BP7  | 100 | 200 | 0  | 1.5 | 26 | 200 | 0.7  |
| BP8  | 100 | 200 | 2  | 1.5 | 26 | 200 | 0.95 |
| BP9  | 100 | 200 | 3  | 1.5 | 26 | 200 | 1.1  |
| BP10 | 100 | 200 | 5  | 1.5 | 26 | 200 | 1.3  |
| BP11 | 100 | 200 | 7  | 1.5 | 26 | 200 | 1.45 |

Preparation of Developer DL

The white particles WP (30 g) and the black particles BP (70 g) were placed into a polyethylene bottle. The bottle was rotated by a ball mill pedestal to perform kneading and mixing for 30 minutes to obtain 11 kinds of developer DL (DL1' to DL11'). The white developing particles WP were negatively charged and black developing particles BP were positively charged in the developer.

The black developing particles contained in developers DL1'~DL11' are as follows. The white developing particles WP are same in each developer.

| Developer | Black developing particles |
|---|---|
| DL1'  | BP 1  |
| DL2'  | BP 2  |
| DL3'  | BP 3  |
| DL4'  | BP 4  |
| DL5'  | BP 5  |
| DL6'  | BP 6  |
| DL7'  | BP 7  |
| DL8'  | BP 8  |
| DL9'  | BP 9  |
| DL10' | BP 10 |
| DL11' | BP 11 |

<Reversible image display mediums D1' to D11'>

These reversible image display mediums are of the same type as the medium 15' shown in FIG. 10(B).

A transparent PET (polyethylene terephthalate) film was molded by thermal pressing molding method to form a plurality of continuous partition walls 113a on a base portion of 25 $\mu$m thickness which served as the first substrate 111. The continuous partition walls 113a had a wall thickness (width) $\alpha$ (20 $\mu$m), a height h (100 $\mu$m) and a space pt (200 $\mu$m) between neighboring partition walls. A plurality of such substrates 111 were provided.

A different developer selected from developers DL1' to DL11' was placed into respective continuous groove-like cells 116 between the neighboring partition walls 113a on the substrate 111. The developer was placed into the cell at a fill factor of 34 vol. % based on the volume of the cell.

A photo-curing adhesive 119c (see FIG. 10(B)) was applied to a small thickness only to the top of each partition wall 113a on the substrate 111. Then, a PET film of 25 $\mu$m thickness having an electrically conductive film of aluminum 112A of 30 $\mu$m thickness formed over its external surface by deposition was adhered, as the second substrate 112, to the adhesive over its internal surface. The adhesive was cured by UV irradiation to adhere the film.

Thereafter, the peripheries of the first and second substrates 111, 112 were heat-sealed.

In this way, there were obtained mediums of the type shown in FIG. 10(B) containing different developers, i.e. 11 kinds of mediums D1' (having developer DL1') to mediums D11' (having developer DL11').

The developers contained in the mediums are as follows.

| Medium | Developer |
|---|---|
| D1'  | DL 1'  |
| D2'  | DL 2'  |
| D3'  | DL 3'  |
| D4'  | DL 4'  |
| D5'  | DL 5'  |
| D6'  | DL 6'  |
| D7'  | DL 7'  |
| D8'  | DL 8'  |
| D9'  | DL 9'  |
| D10' | DL 10' |
| D11' | DL 11' |

Image display was performed on each of the mediums D1' to D11' by the image forming apparatus including the ion flow type direct electrostatic latent image forming device CR2 shown in FIG. 16.

The surface of the first substrate 111 was uniformly charged by the corona charger CRH to carry a negative polarity potential (−400 V). The second substrate 112 of the charged medium was set to a ground potential. Then, positive corona ions were led to the predetermined pixel corresponding portions corresponding to the image to be displayed among a plurality of pixel corresponding portions on the surface of the first substrate 111 of the medium. The portions were charged to carry a positive polarity potential (+400 V), in other words, to carry the same potential (400 V) in terms of absolute value as the above negatively charged potential (−400 V). For the other pixels, only a bias potential (ground potential) was applied. Thereby the positive corona ion-charged portions and the non-charged portions were charged to carry the same potential (400 V) in terms of absolute value and to give different polarities. The developer was stirred in the medium by the magnetic pole roller R2 which was driven to rotate, whereby the positive corona ion-loaded portions were displayed in white by negatively charged white developing particles WP and the positive corona ion-unloaded-portions were displayed in black by positively charged black developing particles BP. The latent image potential in the image portion was −400 V and the potential in the background portion was +400 V.

Measurements were made of an average reflection density (Bk reflection density) of solid portions (black portions) and an average reflection density (W reflection density) of white portions forming a background on each of the mediums D1' to D11'. Then an average reflection density ratio [B(Bk)/W] was calculated based on the measurements. The reflection density was measured using a reflection densitometer (product of X-Rite Incorporated, 310 TR, aperture diameter 2 mm).

A reflection density ratio (B/W) of 5.0 or more was rated as good (o) in contrast and that of less than 5.0 was rated as unsatisfactory in contrast (x).

The image evaluation results are shown in Tables 4 and 5.

TABLE 4

| image display medium | black magnetic particles | coercive force (Hc) | Bk reflection density | W reflection density | B/W image density ratio | image density ratio evaluation |
|---|---|---|---|---|---|---|
| D1' | BP1 | 5 | 1.2 | 0.5 | 2.4 | X |
| D2' | BP2 | 50 | 1.5 | 0.22 | 6.8 | ○ |
| D3' | BP3 | 100 | 1.6 | 0.2 | 8.0 | ○ |
| D4' | BP4 | 201 | 1.7 | 0.23 | 7.4 | ○ |
| D5' | BP5 | 250 | 1.7 | 0.24 | 7.1 | ○ |
| D6' | BP6 | 260 | 1.5 | 0.35 | 4.3 | X | when B/W ratio is 5.0 or more : ○
other: X

TABLE 5

| image display medium | black magnetic particles | optical reflection density | Bk reflection density | W reflection density | B/W image density ratio | image density ratio evaluation |
|---|---|---|---|---|---|---|
| D7' | BP7 | 0.7 | 0.65 | 0.2 | 3.3 | X |
| D8' | BP8 | 0.95 | 0.92 | 0.2 | 4.6 | X |
| D9' | BP9 | 1.1 | 1.05 | 0.2 | 5.3 | ○ |
| D10' | BP10 | 1.3 | 1.48 | 0.2 | 7.4 | ○ |
| D11' | BP11 | 1.45 | 1.68 | 0.2 | 8.4 | ○ | when B/W ratio is 5.0 or more : ○
other: X

From the results of image evaluation, the followings are understood. It is desirable that at least one of two or more kinds of frictionally chargeable dry developing particles having different chargeable polarities and different optical reflection densities in each medium have a coercive force in a range of 50 oersteds to 250 oersteds.

It is also desirable that at least one of two or more kinds of frictionally chargeable dry developing particles having different chargeable polarities and different optical reflection densities properly are magnetic developing particles and that the optical reflection density of magnetic developing particles is 1.0 or more.

The same can be mentioned about the mediums of the same type as the mediums 11, 12, 12', 13, 14 and 15.

(III) Examples of Satisfying the Formula 1 and Formula 2
<Developing Particles and Developer>
White Developing Particles WP In a Henschel mixer were thoroughly mixed 100 parts by weight of thermoplastic polyester resin (softening point: 121° C., Tg: 67° C.), 40 parts by weight of titanium oxide (Ishihara Sangyo Kaisha, Ltd.: CR-50) and 5 parts by weight of salicylic acid-zinc complex (minus-charge-controlling agent, Orient Chemical Co., Ltd.: Bontron E-84). The mixture was further mixed by a twin-screw extruder and then cooled. The mixture was roughly pulverized, then pulverized by a jet mill and classified with wind to obtain white fine particles which have a volume average particle size of 7.2 μm. To the white fine particles was added 0.3 parts by weight of hydrophobic silica particles (Nihon Aerosil Co., Ltd.: Aerosil R-972). The mixture was mixed by a Henschel mixer to prepare white developing particles $WP1_x$ of 7.2 μm in particle size.

In the same manner, there were produced white developing particles WP2x having an average particle size of 10.1 μm and white developing particles WP3x having an average particle size of 14.4 μm. Black developing particles BP In a Henschel mixer were thoroughly mixed 100 parts by weight of styrene-n-butyl methacrylate resin (softening point: 132° C., Tg: 65° C.), 2 parts by weight of carbon black (Lion Oil & Fat Co., Ltd.: Ketchen Black), 1.5 parts by weight of silica (Nihon Aerosil Co., Ltd.: #200) and 500 parts by weight of magnetic powder containing magnetite (RB-BL, Titan Kogyo Co., Ltd.). The mixture was further mixed by a kneader.

After cooling, the mixture was roughly pulverized by a feather mill, then finely pulverized by a jet mill and classified with wind to obtain black developing particles BP1x which have a volume average particle size of 17 μm.

In the same manner, there were produced black developing particles BP2x having an average particle size of 25 μm and black developing particles BP3x having an average particle size of 31 μm.

Preparation of Developer DL

The white particles in different amounts and the black particles (70 g) were placed into a polyethylene bottle. The bottle was rotated by a ball mill pedestal to perform kneading and mixing for 30 minutes to obtain plural kinds of developers DL. The white developing particles were negatively charged and black developing particles were positively charged in the developer.

Table 8 shows the kinds of white and black particles forming the developers and a mixing weight ratio Tc of white particles to the mixture of white and black particles.
<Reversible Image Display Mediums D1x to D20x>

These reversible image display mediums are of the same type as the medium 13 shown in FIG. 7(A) and were prepared as follows.

A film of UV-curing resin of 100 μm thickness was brought close to the first substrate 111 formed of a transparent PET (polyethylene terephthalate) film of 25 μm thickness. Over the UV-curing resin film was laid a photomask opened in a specified pattern. The top of the photomask was irradiated with UV rays, followed by development and washing. A grid-like partition member 113 was formed on the substrate 111 (see FIG. 3). Partition walls 113a forming the partition member 113 had a thickness (width) α (50 μm), a height h (in other words, cell gap D which is different in each medium), and a wall space pt (1 mm) between the wall portions. The substrate 111 was located on the image observation side (on which an electrostatic latent image was formed).

The developer DL was placed into each square cavity surrounded with the partition wall 113a of the first substrate 111. The developer was accommodated into the cavity in a volume proportion PD (different in each medium) of the accommodated developer (all particles) to the volume of the cavity (cell volume).

A photo-curing adhesive 119a (see FIG. 7(A)) was applied to a small thickness only to the top of the partition member 113 on the first substrate 111. Subsequently, a PET film of 25 μm in thickness containing carbon black which served as the second substrate 112 was brought close to the adhesive. Then, the adhesive was cured by UV irradiation to adhere the film.

Thereafter, the peripheries of the first and second substrates 111, 112 were heat-sealed instead of sealing with the epoxy resin adhesive 119b as shown in FIG. 7(A).

In this way, the mediums D1x to D20x of the type shown in FIG. 7(A) were produced.

Table 8 shows the wall height (cell gap D) and PD value in each of the mediums D1x to D20x. These values are mean values given by calculation from the total number of cells. Table 8 also shows the required minimum PD values (=PDmin).

The PDmin in Table 8 was calculated from the foregoing formula 1 and formula 2. More specifically, the PDmin value can be obtained from the formula L and formula 2 wherein Ma is the required amount of adhered white particles and Mb is the required amount of adhered black particles, each for obtaining an empirically determined preferable contemplated image density (contemplated ID) in a solid image formed of white or black developing particles forming the developer used in the medium; $\rho_a$ is a true specific gravity of 1.2 g/cm$^3$ of white particles; $\rho_b$ is a true specific gravity of 2.4 g/cm$^3$ of black particles; and $T_c$ is a mixing weight ratio. The contemplated ID (see Table 9) can be obtained from the curve showing a relation between an amount of adhered developing particles and image density in FIGS. 21 and 22 to be described later.

Figure 21:
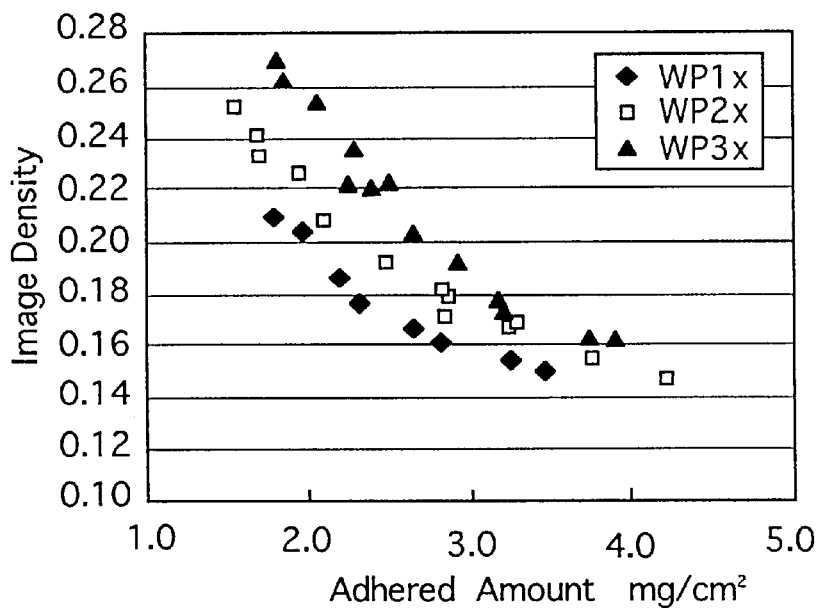
FIG. 21 is a view showing a relation between the amount of adhered white developing particles and the white image density.
Figure 22:
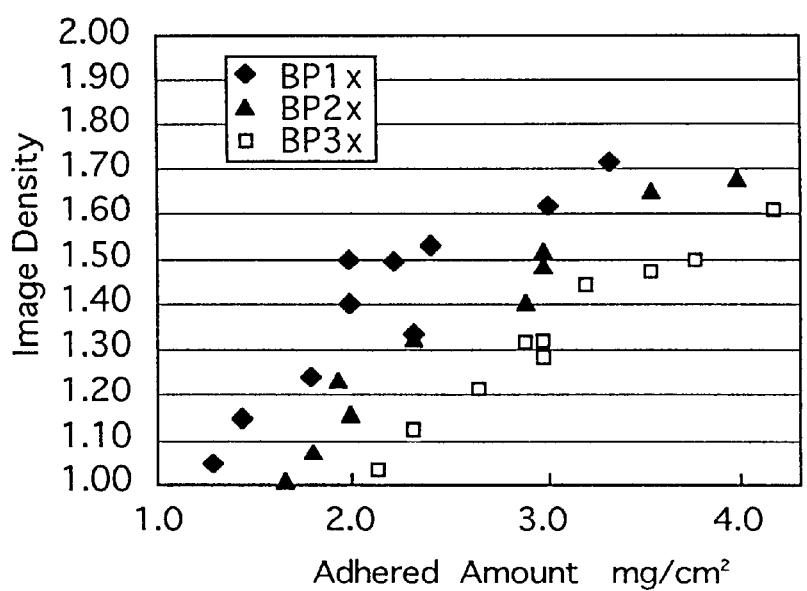
FIG. 22 is a view showing a relation between the amount of adhered black developing particles and the black image density.

FIG. 21 and FIG. 22 will be described below.

Investigations were conducted as to a relation between the amount of each kind of white developing particles WP1x to WP3x adhering to the substrate and the solid white image density and as to a relation between the amount of each kind of black developing particles BP1x to BP3x adhering to the substrate and the solid black image density.

The amount of particles adhering to the substrate and the image density relating to the amount thereof were obtained as follows.

White Developing Particles WP1x to WP3x

Figure 18:
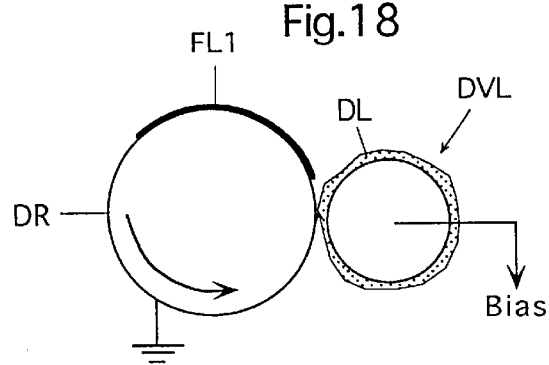
FIG. 18 is a view schematically showing the structure of a white image forming apparatus using white developing particles.

A plurality of PET films FL1 of 25 μm thickness each having an electrically conductive film of aluminum formed over one surface thereof were provided. An electrostatic latent image was written on the PET side of each film FL1 using an ion-flow type direct electrostatic latent image forming device CR2 shown in FIG. 12(A) and the electrostatic latent image was written on each of the films FL1 at different potentials (selected from 100 V to 600 V). Each film FL1 carrying the electrostatic latent image was held over the surface of drum DR on the aluminum film side of the film FL1. The drum DR was set to carry a ground potential as shown in FIG. 18. The electrostatic latent image was developed by a developing device DVL having a developer DL to form a white visible image. The aluminum film of each film FL1 having the white visible image was dissolved in an aqueous solution of sodium hydroxide for removal. A central portion of the film FL1 with a specified size was cut out to give a cut-out portion. The weight Wx (mg) of the cut-out portion CP was measured.

Figure 19:
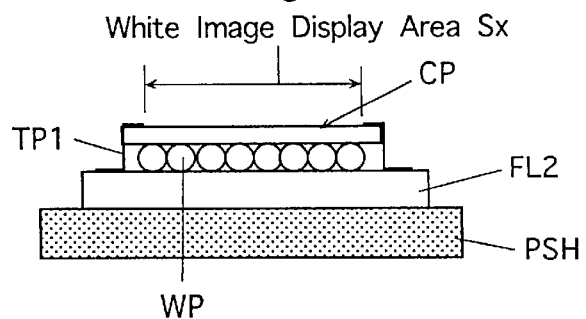
FIG. 19 is a view showing a method of measuring the white image density.

The cut-out portion CP was overlaid as shown in FIG. 19 on a PET film FL2 of 100 μm thickness so that the side having the white image of the portion CP was in contact therewith. A periphery of the portion CP was fixed to the film FL2 with adhesive tape TP1. The film FL2 was placed on a piece of flock paper PSH with the portion CP facing up. The density of the white image in the portion CP was measured using a reflection densitometer (product of X-Rite Incorporated, MODEL 310 TR, aperture diameter 2 mm) Thereafter the area of the white image display Sx (cm$^2$) was measured. After the white particles WP were removed, the weight Wy (mg) of the portion CP which was washed with isopropyl alcohol was determined.

The amount of the white developing particles adhering to the substrate per unit area of the substrate was determined by an equation: (Wx−Wy)/Sx (mg/cm$^2$)

Table 6 shows the amounts of adhered white developing particles WP1x, WP2x and WP3x, respectively, and the measured results of image density ID. FIG. 21 shows a relation between the amount of adhered developing particles WP1x to WP3x and the image density.

TABLE 6

| white particles WP1x particle size 7.2 μm | | white particles WP2x particle size 10.1 μm | | white particles WP3x particle size 14.4 μm | |
|---|---|---|---|---|---|
| adhered amount | ID | adhered amount | ID | adhered amount | ID |
| 1.78 | 0.21 | 4.21 | 0.15 | 3.89 | 0.16 |
| 2.30 | 0.18 | 3.75 | 0.16 | 3.73 | 0.16 |
| 3.45 | 0.15 | 3.22 | 0.17 | 3.19 | 0.17 |
| 3.23 | 0.16 | 3.28 | 0.17 | 3.16 | 0.18 |
| 2.80 | 0.16 | 2.83 | 0.17 | 2.90 | 0.19 |
| 2.63 | 0.17 | 2.85 | 0.18 | 2.63 | 0.20 |
| 2.18 | 0.19 | 2.81 | 0.18 | 2.36 | 0.22 |
| 1.95 | 0.20 | 2.47 | 0.19 | 2.23 | 0.22 |
| | | 2.08 | 0.21 | 2.48 | 0.22 |
| | | 1.92 | 0.23 | 2.26 | 0.24 |
| | | 1.68 | 0.23 | 2.03 | 0.25 |
| | | 1.66 | 0.24 | 1.82 | 0.26 |
| | | 1.53 | 0.25 | 1.78 | 0.27 |

Black Developing Particles BP

Figure 20:
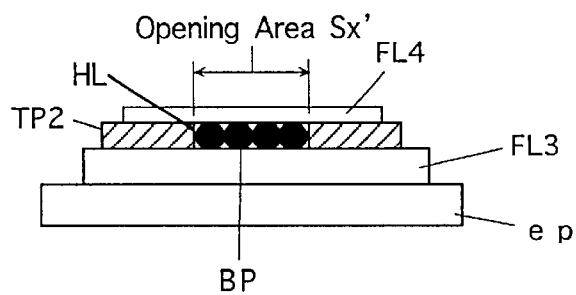
FIG. 20 is a view showing a method of measuring the black image density.

Adhesive tape TP2 having an opening HL of 6.4 mm in diameter in its center (opening area Sx') was adhered to a PET film FL3 of 100 μm thickness as shown in FIG. 20. The overall weight Y' of film FL3, tape TP2 and a PET film FL4 of 25 μm thickness to be used later was measured. The black developing particles BP were filled into the opening HL of the tape, and the film FL4 was adhered to cover the opening. The film FL3 was laid on a sheet of EP paper ep (product of Minolta Co., Ltd., plain paper (white)). The solid black image density was measured from the film FL4 side with use of a reflection densitometer (product of X-Rite Incorporated, Ltd., 310 TR, aperture diameter 2 mm. Thereafter the overall weight X' of the films FL3 and FL4, tape TP2 and the packed developing particles BP was measured.

The amount of the black developing particles adhering to the substrate per unit area of the substrate was determined by an equation: $(X'-Y')/Sx'(mg/cm^2)$ Such experiment was carried out using each kind of black developing particles and the tape TP2 having different thicknesses.

Table 7 shows the amount of adhered black developing particles BP1x, BP2x and BP3x, respectively and the measured results of image density ID. FIG. 22 shows a relation between the amount of adhered black developing particles BP1x, BP2x and BP3x and the image density.

TABLE 7

| black particles BP1x particle size 17 μm | | black particles BP2x particle size 25 μm | | black particles BP3x particle size 31 μm | |
|---|---|---|---|---|---|
| adhered amount | ID | adhered amount | ID | adhered amount | ID |
| 1.28 | 1.04 | 1.66 | 1.00 | 2.00 | 0.95 |
| 1.43 | 1.14 | 1.80 | 1.07 | 2.14 | 1.03 |
| 1.79 | 1.23 | 2.00 | 1.15 | 2.32 | 1.12 |
| 2.32 | 1.33 | 1.93 | 1.23 | 2.65 | 1.21 |
| 1.99 | 1.39 | 2.32 | 1.32 | 2.98 | 1.28 |
| 1.99 | 1.49 | 2.89 | 1.40 | 2.89 | 1.31 |
| 2.22 | 1.49 | 2.98 | 1.48 | 2.98 | 1.31 |
| 2.40 | 1.53 | 2.98 | 1.51 | 3.20 | 1.44 |
| 3.00 | 1.62 | 3.53 | 1.65 | 3.53 | 1.47 |
| 3.31 | 1.72 | 3.97 | 1.68 | 3.76 | 1.50 |
| | | 4.17 | 1.74 | 4.17 | 1.61 |

It is clear from Table 6 and FIG. 21 and from Table 7 and FIG. 22 that the image density is affected by the amount of adhered developing particles per unit area of the substrate forming the image display medium.

Using each of the mediums D1x to D20x, images were displayed by an image forming apparatus having an ion flow type direct electrostatic latent image forming device CR2 shown in FIG. 16.

The surface of the first substrate 111 was uniformly charged by the corona charger CRH to carry a negative polarity potential (−500 V). The second substrate 112 of the charged medium was set to a ground potential. Then, positive corona ions were led to the predetermined pixel corresponding portions corresponding to the image to be displayed among a plurality of pixel corresponding portions on the surface of the first substrate 111 of the medium. The portions were charged to carry a positive polarity potential (+500 V), in other words, to carry the same potential (500 V) in terms of absolute value as the above negatively charged polarity potential (−500 V) For the other pixels, only a bias potential (ground potential) was applied. Thereby the positive corona ion-charged portions and the non-charged portions were charged to carry the same potential (500 V) in terms of absolute value and to give different polarities. The developer was stirred in the medium by the magnetic pole roller R2 which was driven to rotate, whereby image display was conducted such that the positive corona ion-loaded portions were displayed in white by negatively charged white developing particles WP and the positive corona ion-unloaded portions were displayed in black by positively charged black developing particles BP. Thus there were produced two kinds of image portions, i.e. a solid (black) image portion formed of black developing particles and a solid white image portion formed of white developing particles in each medium.

The image density (actual image density) of the solid black portion and the solid white portion in each medium was measured using a reflection densitometer (product of X-Rite Incorporated, Model 310 TR, aperture diameter 2 mm).

The actual image density (actual ID) is shown in Table 9. Table 9 also shows the contemplated image density (contemplated ID) of the solid white image formed of white developing particles and that of the solid black image formed of black developing particles used in each of the mediums D1x to D20x.

The solid white image and solid black image were evaluated according to the following criteria:

PD Evaluation:

Minimum PD (=PDmin)≦Actual PD Good (○)

Minimum PD (=PDmin)>Actual PD not Good (×)

Evaluation of White Image Density:

Actual ID/Contemplated ID<0.95 Excellent (◎)

0.95≦Actual ID/Contemplated ID<1.00 Good (○)

1.00≦Actual ID/Contemplated ID<1.05 Poor (Δ)

Actual ID/Contemplated ID≧1.05 Very poor (×)

Evaluation of Black Image Density:

Actual ID/Contemplated ID>1.2 Excellent (◎)

1.2≧Actual ID/Contemplated ID>1.0 Good (○)

1.0≧Actual ID/Contemplated ID>0.95 Poor (Δ)

Actual ID/Contemplated ID≦0.95 Very poor (×)

Overall Evaluation

Both white and black image densities are excellent (◎).

At least one of white and black image densities is very poor (×).

Both white and black image densities are not very poor and at least one of white and black image densities is poor (Δ).

Other than the above (○)

TABLE 8

| image display medium | white particles WP | | black particles BP | | cell gap μm | Tc % | PD % | PD min % |
|---|---|---|---|---|---|---|---|---|
| | kind of particles | particle size μm | kind of particles | particle size μm | | | | |
| D1x | WP1x | 7.2 | BP1x | 17 | 150 | 30 | 28 | 23.3 |
| D2x | WP2x | 10.1 | BP1x | 17 | 150 | 30 | 28 | 27.9 |
| D3x | WP3x | 14.4 | BP1x | 17 | 150 | 30 | 28 | 32.9 |
| D4x | WP2x | 10.1 | BP1x | 17 | 100 | 33 | 28 | 27.5 |
| D5x | WP2x | 10.1 | BP2x | 25 | 100 | 33 | 28 | 27.5 |
| D6x | WP2x | 10.1 | BP3x | 31 | 100 | 33 | 28 | 30.3 |
| D7x | WP1x | 7.2 | BP2x | 25 | 100 | 30 | 25 | 34.9 |
| D8x | WP1x | 7.2 | BP2x | 25 | 125 | 30 | 25 | 27.9 |
| D9x | WP1x | 7.2 | BP2x | 25 | 150 | 30 | 25 | 23.3 |
| D10x | WP1x | 7.2 | BP2x | 25 | 175 | 30 | 25 | 19.9 |
| D11x | WP2x | 10.1 | BP2x | 25 | 125 | 20 | 28 | 32.8 |
| D12x | WP2x | 10.1 | BP2x | 25 | 125 | 25 | 28 | 27.3 |
| D13x | WP2x | 10.1 | BP2x | 25 | 125 | 30 | 28 | 23.7 |
| D14x | WP2x | 10.1 | BP2x | 25 | 125 | 35 | 28 | 21.1 |
| D15x | WP2x | 10.1 | BP2x | 25 | 100 | 30 | 25 | 29.6 |
| D16x | WP2x | 10.1 | BP2x | 25 | 100 | 30 | 30 | 29.6 |
| D17x | WP2x | 10.1 | BP2x | 25 | 100 | 30 | 40 | 29.6 |
| D18x | WP2x | 10.1 | BP2x | 25 | 100 | 30 | 50 | 29.6 |
| D19x | WP2x | 10.1 | BP2x | 25 | 100 | 30 | 55 | 29.6 |
| D20x | WP2x | 10.1 | BP3x | 31 | 100 | 30 | 57 | 29.6 |

TABLE 9

| image display medium | contemplated ID white | contemplated ID black | actual ID white | actual ID black | contemplated ID/ actual ID white | contemplated ID/ actual ID black | evaluation PD | evaluation white | evaluation black | evaluation overall |
|---|---|---|---|---|---|---|---|---|---|---|
| D1x | 0.200 | 1.30 | 0.176 | 1.65 | 0.88 | 1.27 | ○ | ⊚ | ⊚ | ⊚ |
| D2x | 0.200 | 1.30 | 0.197 | 1.65 | 0.99 | 1.27 | ○ | ○ | ⊚ | ○ |
| D3x | 0.200 | 1.30 | 0.225 | 1.66 | 1.13 | 1.28 | X | X | ⊚ | X |
| D4x | 0.240 | 1.50 | 0.236 | 1.64 | 0.98 | 1.09 | ○ | ○ | ○ | ○ |
| D5x | 0.240 | 1.50 | 0.238 | 1.54 | 0.99 | 1.03 | ○ | ○ | ○ | ○ |
| D6x | 0.240 | 1.50 | 0.236 | 1.38 | 0.98 | 0.92 | X | ○ | X | X |
| D7x | 0.200 | 1.30 | 0.215 | 1.51 | 1.08 | 1.16 | X | X | ○ | X |
| D8x | 0.200 | 1.30 | 0.213 | 1.64 | 1.07 | 1.26 | X | X | ⊚ | X |
| D9x | 0.200 | 1.30 | 0.188 | 1.67 | 0.94 | 1.28 | ○ | ⊚ | ⊚ | ⊚ |
| D10x | 0.200 | 1.30 | 0.174 | 1.64 | 0.87 | 1.26 | ○ | ⊚ | ⊚ | ⊚ |
| D11x | 0.240 | 1.50 | 0.245 | 1.65 | 1.02 | 1.10 | X | Δ | ○ | Δ |
| D12x | 0.240 | 1.50 | 0.235 | 1.66 | 0.98 | 1.11 | ○ | ○ | ○ | ○ |
| D13x | 0.240 | 1.50 | 0.218 | 1.66 | 0.91 | 1.11 | ○ | ⊚ | ○ | ○ |
| D14x | 0.240 | 1.50 | 0.205 | 1.65 | 0.85 | 1.10 | ○ | ⊚ | ○ | ○ |
| D15x | 0.240 | 1.50 | 0.249 | 1.50 | 1.04 | 1.00 | X | ○ | Δ | Δ |
| D16x | 0.240 | 1.50 | 0.038 | 1.64 | 0.99 | 1.09 | ○ | ⊚ | ○ | ○ |
| D17x | 0.240 | 1.50 | 0.204 | 1.66 | 0.85 | 1.11 | ○ | ⊚ | ○ | ○ |
| D18x | 0.240 | 1.50 | 0.179 | 1.65 | 0.75 | 1.10 | ○ | ⊚ | ○ | ○ |
| D19x | 0.240 | 1.50 | 0.168 | 1.64 | 0.70 | 1.09 | ○ | ⊚ | ○ | ○ |
| D20x | 0.240 | 1.50 | 0.310 | 1.40 | 1.29 | 0.93 | X | X | X | X |

The particle size of white developing particles was varied in the mediums D1x to D3x. It is clear that as the particle size was reduced, the minimum PD was decreased.

In the case of mediums D1x and D2x wherein the PD value was the minimum PD or more than the minimum PD (○ in PD evaluation), the desired image density was obtained (overall evaluation ⊚ or ○). In the case of medium D3x wherein the PD value was smaller than minimum PD (PD evaluation was x), the white image became blacker than contemplated ID (overall evaluation x).

The following values were varied: the particle size of black developing particles in the mediums D4x to D6x, the cell gap D in the mediums D7x to D10x, Tc in the mediums D11x and D14x, and PD value in the mediums D15x to D18x.

When the PD value is larger than the minimum PD value (PD evaluation is ○) as is the case with the mediums D1x to D3x, i.e. in the case of the mediums D4x and D5x, D9x and D10x, D12x to D14x and D16x to D19x, the desired image density was obtained.

When the PD value is smaller than the minimum PD (PD evaluation is x), i.e. in the case of the mediums D6x to D8x, D11x and D15x, the white image became blacker than contemplated ID and the black image became whiter than contemplated ID, namely the desired image density was not obtained.

In the medium D20x, PD was 57%, i.e., too high, in packing density so that the particles were unable to move, and substantially no contrast was seen.

The above shows that the packing density PD of developer significantly affects the evaluation of displayed images. It is evident from the results of the above experiments that the range of packing density (PD) which satisfies the formulas 1, 2 and 3 shows a good co-relative relation with image density reproducibility.

The same can be mentioned about the image display mediums of the same type as the mediums 11, 12, 12', 14, 15 and 15'.

Materials for the substrate on the image observation side which forms the image display medium are not limited to PET but they may be other film substrates, glass substrates, etc., if a curve for image density vs. amount of adhered particles is clarified as shown in FIGS. 21 and 22.

(IV) Examples of Adjusting the Amount of Small-Size Developing Particles and/or the Addition of Third Component <Developing Particles and Developer>

White Developing Particles WP

In a Henschel mixer were thoroughly mixed 100 parts by weight of thermoplastic polyester resin (softening point: 121° C., Tg: 67° C.), 40 parts by weight of titanium oxide (Ishihara Sangyo Kaisha, Ltd.: CR-50) and 5 parts by weight of salicylic acid-zinc complex (minus-charge-controlling agent, Orient Chemical Co., Ltd.: Bontron E-84). The mixture was further mixed by a twin-screw extruder and then cooled. The mixture was roughly pulverized, then pulverized by a jet mill and classified with wind to obtain white fine particles which have a volume average particle size (D50) of 10.1 μm.

In the same manner, white fine particles having volume average particle sizes (D50) of 10.4 μm, 9.8 μm, 19.1 μm, 5.1 μm, 4.2 μm and 4.5 μm, respectively were produced.

To the white fine particles was added a predetermined amount of fluidization agent as a third component for post-treatment. The mixture was mixed by a Henschel mixer to give large-size white developing particles 1 to 4 and small-size white developing particles 1 to 3 which are shown in Table 10. The term "−3 μm" used in Table 10 means the amount (wt. %) of white developing particles having a particle size of 3 μm or less than 3 μm in the volume particle size distribution of the white developing particles.

Useful fluidization agents include, for example, silica fluidization agents, R972 and #200 (products of Nihon Aerosil Co., Ltd.), and titanium oxide fluidization agent All (Titan Kogyo Co., Lid.) (see Table 12 given later for the fluidization agent)

TABLE 10

| kind of particles | particle size D50 | particle size −3 μm |
|---|---|---|
| white particles 1 | 10.1 | 0.2 |
| white particles 2 | 10.4 | 0.4 |

TABLE 10-continued

| kind of particles | particle size | |
|---|---|---|
| | D50 | −3 μm |
| white particles 3 | 9.8 | 0.7 |
| white particles 4 | 19.1 | 0.0 |
| small-size white particles 1 | 5.1 | 15.6 |
| small-size white particles 2 | 4.2 | 13.1 |
| small-size white particles 3 | 4.5 | 21.1 |

Black Developing Particles BP

In a Henschel mixer were thoroughly mixed 100 parts by weight of styrene-n-butyl methacrylate resin (softening point: 132° C., Tg: 65° C.), 2 parts by weight of carbon black (Lion Oil & Fat Co., Ltd.: Ketchen Black), 1.5 parts by weight of silica (Nihon Aerosil Co., Ltd.: #200) and 500 parts by weight of magnetic powder containing magnetite (RB-BL, Titan Kogyo Co., Ltd.). The mixture was further mixed by a kneader.

After cooling, the mixture was roughly pulverized by a feather mill, then finely pulverized by a jet mill and classified with wind to obtain black developing particles 1 having a volume average particle size (D50) of 23 μm and including 0.4 wt. % or less of black particles having a particle size of 4 μm or less in the volume particle size distribution.

In the same manner, black developing particles 2 to 5 were produced which were different in volume average particle size and different in the amount of particles with a particle size of 4 μm or less which are shown in Table 11. The term "-4 μm" used in Table 11 means the amount (wt. %) of black developing particles having a particle size of 4 μm or less in the volume particle size distribution of the black developing particles.

TABLE 11

| kind of particles | particle size | |
|---|---|---|
| | D50 | −4 μM |
| black particles 1 | 23.0 | 0.4 |
| black particles 2 | 31.0 | 0.0 |
| black particles 3 | 55.0 | 0.0 |
| black particles 4 | 16.7 | 1.3 |
| black particles 5 | 10.0 | 5.3 |

Preparation of Developer DL

The white particles and the black particles were mixed in various combinations. 70 g (grams) of black developing particles and 30 g of white developing particles in any combination were placed into a polyethylene bottle. The bottle was rotated by a ball mill pedestal to perform kneading and mixing for 30 minutes to obtain a plurality of developers DL. The white developing particles were negatively charged and black developing particles were positively charged in any developer. The composition of the developer is shown in Table 12.

<Reversible Image Display Mediums D1y to D22y>

These reversible image display mediums are of the same type as the medium 13 shown in FIG. 7(A) and were prepared as follows.

A film of UV-curing resin of 100 μm (or 170 μm) thickness was brought close to a first substrate 111 formed of a transparent PET (polyethylene terephthalate) film of 25 μm thickness. Over the UV-curing resin film was laid a photomask opened in a specified pattern. The top of the photomask was irradiated with UV rays, followed by development and washing. A grid-like partition member 113 was formed on the substrate 111 (see FIG. 3). Partition walls 113a forming the partition member 113 had a thickness (width) α (50 μm), a height h (100 μm or 170 μm), and a wall space pt (5 mm). The substrate 111 was located on the image observation side (on which an electrostatic latent image was formed).

One kind of developers DL was placed into each square cavity surrounded with the partition wall 113a of the first substrate 111. The volume proportion of the developer placed into the cavity was 30% based on the volume of the cavity.

A photo-curing adhesive 119a (see FIG. 7(A)) was applied to a small thickness only to the top of the partition member 113 on the first substrate 111. Subsequently, a PET film of 25 μm in thickness containing carbon black as a second substrate 112 was brought close to the adhesive. Then, the adhesive was cured by UV irradiation to adhere the film.

Thereafter, the peripheries of the first and second substrates 111, 112 were heat-sealed instead of sealing with the epoxy resin adhesive 119b as shown in FIG. 7(A).

In this way, 22 kinds of mediums D1y to D22y of the type shown in FIG. 7(A) which are different in the developer and cell gap were produced.

The particulars of the mediums D1y to D22y are shown in Table 12.

TABLE 12

| | kind of particles | | | | | | | | | | |
|---|---|---|---|---|---|---|---|---|---|---|---|
| image display medium | black | | white | | | | white small-size | | | | cell gap |
| | # | D50 μm | # | D50 μm | post-treatment kind | post-treatment amount wt % | added amount | # | D50 μm | post-treatment kind | post-treatment amount wt % | μm |
| D1y | 2 | 31 | 2 | 10.4 | R972 | 0.50% | | | | | | 170 |
| D2y | 1 | 23 | 2 | 10.4 | R972 | 0.50% | | | | | | 170 |
| D3y | 1 | 23 | 1 | 10.1 | R972 | 0.30% | | | | | | 170 |
| D4y | 3 | 55 | 1 | 10.1 | R972 | 0.30% | | | | | | 170 |
| D5y | 1 | 23 | 3 | 9.8 | R972 | 0.30% | | | | | | 170 |
| D6y | 4 | 17 | 1 | 10.1 | R972 | 0.30% | | | | | | 170 |
| D7y | 5 | 10 | 3 | 9.8 | R972 | 0.30% | | | | | | 170 |

TABLE 12-continued

| | | | | | kind of particles | | | | | | | |
| image | black | | white | | | | white small-size | | | | | |
| display | | D50 | | D50 | post-treatment | | added | | D50 | post-treatment | | cell gap |
| medium | # | μm | # | μm | kind | amount wt % | amount | # | μm | kind | amount wt % | μm |
|---|---|---|---|---|---|---|---|---|---|---|---|---|
| D8γ | 1 | 23 | 1 | 10.1 | R972 | 0.30% | 2.0% | 2 | 4.2 | R972 | 3.6% | 100 |
| D9γ | 1 | 23 | 4 | 19.1 | R972 | 0.30% | | | | | | 100 |
| D10γ | 3 | 55 | 1 | 10.1 | R972 | 0.30% | | | | | | 100 |
| D11γ | 3 | 55 | 4 | 19.1 | R972 | 0.30% | | | | | | 100 |
| D12γ | 1 | 23 | 1 | 10.1 | R972 | 0.50% | 1.5% | 1 | 5.1 | R972 | 5.5% | 170 |
| D13γ | 2 | 31 | 1 | 10.1 | R972 | 0.30% | 1.0% | 2 | 4.2 | R972 | 3.6% | 170 |
| D14γ | 2 | 31 | 1 | 10.1 | R972 | 0.30% | 1.0% | 2 | 4.2 | R972 | 1.5% | 170 |
| D15γ | 3 | 55 | 2 | 10.4 | R973 | 1.50% | 1.0% | 2 | 4.2 | R972 | 1.5% | 170 |
| D16γ | 2 | 31 | 1 | 10.1 | R972 | 0.30% | 1.0% | 2 | 4.2 | R972 | 0.3% | 170 |
| D17γ | 1 | 23 | 2 | 10.4 | #200 | 0.50% | 1.0% | 3 | 4.5 | #200 | 0.5% | 170 |
| D18γ | 2 | 31 | 1 | 10.1 | R972 | 0.30% | 1.0% | 2 | 4.2 | — | — | 170 |
| D19γ | 1 | 23 | 2 | 10.4 | R972 + A11 | 3.0 + 0.5% | 1.0% | 3 | 4.5 | R972 | 3.0% | 170 |
| D20γ | 1 | 23 | 2 | 10.4 | #200 | 5.00% | 1.0% | 3 | 4.5 | R972 | 3.0% | 170 |
| D21γ | 1 | 23 | 2 | 10.4 | R972 | 2.00% | 1.0% | 3 | 4.5 | #200 | 5.0% | 170 |
| D22γ | 1 | 23 | 2 | 10.4 | R972 | 3.00% | 1.0% | 3 | 4.5 | R972 | 3.0% | 170 |

Image display was performed on each of the mediums D1y to D22y by the image forming apparatus shown in FIG. 16.

The surface of the first substrate 111 was uniformly charged by the corona charger CRH to carry a negative polarity potential (−500 V). The second substrate 112 of the charged medium was set to a ground potential. Then, positive corona ions were led to the predetermined pixel corresponding portions corresponding to the image to be displayed among a plurality of pixel corresponding portions on the surface of the first substrate 111 of the medium. The portions were charged to carry a positive polarity potential (+500 V), in other words, to carry the same potential (500 V) in terms of absolute value as the above negatively charged polarity potential (−500 V). For the other pixels, only a bias potential (ground potential) was applied. Thereby the positive corona ion-charged portions and the non-charged portions were charged to carry the same potential (500 V) in terms of absolute value and to give different polarities. Thus, image display was conducted such that the positive corona ion-loaded portions were displayed in white by negatively charged white developing particles WP and the positive corona ion-unloaded portions were displayed in black by positively charged black developing particles BP.

In image display, the magnetic pole roller R2 was rotated to apply a stirring force to the developing particles in the medium, whereby the image was smoothly displayed.

As to the image formed on each of the mediums D1y to D22y, the amount of developing particles adhering to the substrate on the image observation side and the contrast of displayed image was evaluated.

The degree of adhered particles was assessed by organoleptic evaluation such as direct visual inspection or inspection through a magnifying glass (×15). The adhered particles refer to black particles which do not move by magnetic field stirring in the case of black developing particles, and to white particles adhering to the substrate when a black image was displayed in the case of white developing particles.

The degree of adhered particles was rated according to the following criteria:

The adhesion was not seen by visual inspection but was seen only with difficulty when magnified 15-fold (⊚).

The adhesion was not seen by visual inspection but was seen when magnified 15-fold (○).

The adhesion was seen by visual inspection but the quality of displayed image was scarcely affected (Δ).

The adhesion was seen by visual inspection and the quality of displayed image was adversely affected (×).

The contrast was evaluated by measuring the image density (ID) of black portions and white portions using a reflection densitometer (product of X-Rite Incorporated, MODEL 310 T, aperture diameter 2 mm). The image density was expressed in terms of average image density. The evaluation criteria are as follows:

1.5<black portion ID and white portion ID<0.35: ⊚
1.3<black portion ID and 0.35≦white portion ID<0.37 or 1.3<black portion ID≦1.5 and white portion ID<0.37: ○
1.2<black portion ID and 0.37≦white portion ID<0.42 or 1.2<black portion ID≦1.3 and 0.37≦white portion ID: Δ
Black portion ID≦1.2 and 0.42≦white portion ID: ×

In the above, ⊚ is excellent, ○ is good, Δ is slightly poor, and × is poor.

The image evaluation results are shown in Table 13.

TABLE 13

| image display medium | ID black | ID white | adherence white particles | adherence black particles | evaluation |
|---|---|---|---|---|---|
| D1y | 1.51 | 0.33 | ⊚ | ⊚ | ⊚ |
| D2y | 1.53 | 0.34 | ⊚ | ⊚ | ⊚ |
| D3y | 1.52 | 0.34 | ⊚ | ⊚ | ⊚ |
| D4y | 1.51 | 0.32 | ⊚ | ⊚ | ⊚ |
| D5y | 1.43 | 0.41 | Δ | ○ | Δ |
| D6y | 1.25 | 0.44 | × | Δ | × |
| D7y | 1.13 | 0.51 | × | × | × |
| D8y | 1.51 | 0.33 | ⊚ | ⊚ | ⊚ |
| D9y | 1.50 | 0.44 | ○ | ○ | × |
| D10y | 1.28 | 0.36 | ○ | ○ | Δ |
| D11y | 1.23 | 0.46 | ○ | ○ | × |
| D12y | 1.63 | 0.30 | ⊚ | ⊚ | ⊚ |
| D13y | 1.52 | 0.32 | ⊚ | ⊚ | ⊚ |
| D14y | 1.50 | 0.34 | ⊚ | ⊚ | ○ |
| D15y | 1.50 | 0.40 | ⊚ | ⊚ | Δ |
| D16y | 1.28 | 0.35 | Δ | ○ | Δ |
| D17y | 1.24 | 0.34 | Δ | ○ | Δ |
| D18y | 1.22 | 0.45 | × | × | × |
| D19y | 1.52 | 0.33 | ⊚ | ⊚ | ⊚ |

TABLE 13-continued

| image display medium | ID black | ID white | adherence white particles | adherence black particles | evaluation |
|---|---|---|---|---|---|
| D20y | 1.51 | 0.31 | ◎ | ◎ | ◎ |
| D21y | 1.47 | 0.35 | ◎ | ◎ | ○ |
| D22y | 1.44 | 0.41 | ◎ | ◎ | Δ |

In the mediums D1y to D4y, image display was carried out using reduced amount of small-size white particles with the result that good contrast (black ID about 1.5, white ID about 0.33) was achieved without adhesion of particles.

In the mediums D5y to D7y, image display was carried out without reducing the amount of small-size particles with the result that the adhesion of particles occurred and the contrast was lowered.

In the mediums D8y to D11y, image display was carried out with a gap between the substrates narrowed to 100 μm.

In the medium D8y, image display was carried out adding small-size white particles among which the amount of post-treating agent was increased over large-size white particles with the result that sufficient contrast was attained without giving rise to adhesion of particles even with a cell gap of 100 μm.

In the mediums D9y to D11y, the adhesion of particles was prevented by reducing the amount of small-size particles but the amount of particles was insufficient and the contrast was lowered.

In the mediums D12y to D17y, images were displayed adding small-size white particles post-treated with a fluidization agent which is of the same type as used for post-treatment of large-size white particles.

As found in the mediums D12y to D14y, the adhesion of particles did not occur with the addition of small-size white particles and satisfactory contrast was achieved.

In the mediums D15y and D16y, large-size white and small-size white particles were post-treated by equal amounts (wt. %) of post-treating agent.

In the medium D15y, a large amount (1.5 wt. %) of the agent was used so that the adhesion of small-size particles were prevented but an excessively large charge quantity of white particles was involved, resulting in failure to achieve sufficient adhesion of particles and in reduction of contrast.

In the mediums D16y and D17y, insufficient amounts of post-treating agent caused the adhesion of white particles.

In the medium D18y, the-addition of untreated small-size white particles resulted in marked adhesion of particles and in failure to obtain sufficient image quality and contrast.

In the mediums D19y to D21y, different kinds of fluidization agents were added to small-size and large-size white particles.

In the medium D22y, the same kind of the fluidization agent was added to small-size and large-size white particles and treatment was conducted in the same amount (wt. %). Three % of post-treating agent was added to prevent the adhesion of small-size particles. Thereby the adhesion of particles did not take place, but an excessively large charge quantity of white particles was involved, resulting in failure to obtain sufficient whiteness and in slight reduction of contrast.

On the other hand, in the mediums D19y to D21y, no particles adhered to the substrate and the contrast was satisfactory. This was accomplished due to small charge quantity of large-size particles which occupied a large portion of white particles.

In the medium D19y, large-size particles were post-treated with titanium oxide A11 as well as with 3% of R972, whereby the charge quantity of large-size particles was decreased. Since two kinds of post-treating agent were used, the treating agent amount (wt. %) for large-size particles was greater than that for small-size particles. But proper image display was achievable.

In the medium D20y, the kind of post-treating agent for large-size particles was the kind which causes a smaller charge quantity than that for small-size particles. In this case, the amount of post-treating agent of large-size particles was increased by using such different kind of post-treating agent, but a proper display was achievable.

In the medium D21y, use was made of a kind of post-treating agent for large-size particles which causes a larger charge quantity than that for small-size particles. In this case, the treating agent amount for large-size particles was set to a slightly lower level, whereby the prevention against the adhesion of white particles and sufficient contrast (whiteness) were both achievable.

As apparent from the examples of mediums D19y and D20y, when using different kinds of post-treating agents for large-size and small-size particles, simple comparison of amounts of agents to be added is meaningless. Especially the amount of adhered particles for attaining a proper contrast is determinable by the charge quantity of white particles and charge density of display-side substrate (substrate on the image observation side). A proper charge quantity is variable when using a different kind of display-side substrate. Therefore it is important to employ the amount of treating agent in the range in which proper display is achievable.

The adhesion of small-size particles to the substrate-can be prevented and proper image display is achievable by using a developer containing a reduced amount of small-size particles as described above.

When employing different post-treating conditions for large-size and small-size particles, it is possible to change the design of particles concerning the small-size particles affecting the image density and the large-size particles occupying the volume of major portion of the developer, and the quality of image display can be improved.

In respect of the mediums D1y to D22y, description was given on the system involving the magnetic stirring by magnetic developing particles. In the system not involving the magnetic stirring, proper image display can be performed. What was mentioned about the mediums D1y to D12y can be mentioned about the mediums of the same type as the mediums 11, 12, 12', 14, 15 and 15'.

(V) Examples of Controlling the Volume Average Particle Size Ratio of Developing Particles WP, BP <Developing Particles and Developer>

White Developing Particles WP

In a Henschel mixer were thoroughly mixed 100 parts by weight of thermoplastic polyester resin (softening point: 121° C., Tg: 67° C.), 40 parts by weight of titanium oxide (Ishihara Sangyo Kaisha, Ltd.: CR-50) and 5 parts by weight of salicylic acid-zinc complex (minus-charge-controlling agent, Orient Chemical Co., Ltd.: Bontron E-84). The mixture was further mixed by a twin-screw extruder and then cooled. The mixture was roughly pulverized, then pulverized by a jet mill and classified with wind to obtain white fine particles which have a volume average particle size of 4.8 μm. To the white fine particles was added 0.3 parts by weight of hydrophobic silica particles (Nihon Aerosil Co., Ltd.: Aerosil R-972). The mixture was mixed by a Henschel mixer to prepare white developing particles WP1z having a volume average particle size of 4.8 μm.

In the same manner, there were produced white developing particles WP2z, WP3z, WP4z, WP5z and WP6z having average particle sizes of 5.5 μm, 7.1 μm, 10.1 μm, 14.7 μm and 19.1 μm, respectively.

Black Developing Particles BP

In a Henschel mixer were thoroughly mixed 100 parts by weight of styrene-n-butyl methacrylate resin (softening point: 132° C., Tg: 65° C.), 2 parts by weight of carbon black (Lion Oil & Fat Co., Ltd.: Ketchen Black), 1.5 parts by weight of silica (Nihon Aerosil Co., Ltd.: #200) and 500 parts by weight of magnetic powder containing magnetite (RB-BL, Titan Kogyo Co., Ltd.). The mixture was further mixed by a kneader.

After cooling, the mixture was roughly pulverized by a feather mill, then finely pulverized by a jet mill and classified with wind to obtain black particles BP1z which have a volume average particle size of 5.6 μm. In the same manner, there were produced black developing particles BP2z, BP3z, BP4z, BP5z, BP6z and BP7z having average particle sizes of 8 μm, 10 μm, 23 μm, 41 μm, 62 μm and 74 μm, respectively.

Table 14 shows the particle size of white developing particles WP1z to WP6z and black developing particles BP1z to BP7z.

TABLE 14

| | particle size μm | | |
|---|---|---|---|
| black | | white | |
| BP1z | 5.6 | WP1z | 4.8 |
| BP2z | 8 | WP2z | 5.5 |
| BP3z | 10 | WP3z | 7.1 |
| BP4z | 23 | WP4z | 10.1 |
| BP5z | 41 | WP5z | 14.7 |
| BP6z | 62 | WP6z | 19.1 |
| BP7z | 74 | | |

Preparation of Developer DL

The white particles and the black particles were mixed in various combinations. In any combination, 70 g (grams) of black developing particles and 30 g of white developing particles were placed into a polyethylene bottle. The bottle was rotated by a ball mill pedestal to perform kneading and mixing for 30 minutes to obtain a plurality of developers DL. The combinations of white and black developing particles are shown in Table 15 given later. The white developing particles were negatively charged and black developing particles were positively charged in the developer.

<Reversible Image Display Mediums D1z to D16z>

These reversible image display mediums D1z to D16z are of the same type as the medium 13 shown in FIG. 7(A) and were prepared as follows.

A film of UV-curing resin of 100 μm thickness was brought close to a first substrate 111, i.e. a transparent PET (polyethylene terephthalate) film of 25 μm thickness. Over the UV-curing resin film was laid a photomask opened in a specified pattern. The top of the photomask was irradiated with UV rays, followed by development and washing. A grid-like partition member 113 was formed on the substrate 111 (see FIG. 3). Partition walls 113a forming the partition member 113 had a thickness (width) α (50 μm), a height h (100 μm), and a wall space pt (5 mm) (see FIG. 3 and FIG. 4). The substrate 111 was located on the image observation side (on which an electrostatic latent image was formed).

The developer was placed into each square cavity surrounded with the partition wall 113a of the first substrate 111.

More specifically, there was incorporated into the mediums D1z to D7z the developer having a ratio of volume average particle size in the white developing particles WP and black developing particles BP (=volume average particle size of developing particles BP/volume average particle size of developing particles WP) in a range of 1 to 10.

Into the mediums D8z to D11z was incorporated the developer having a particle size ratio of more than 10.

Into the mediums D12z and D13z was incorporated the developer having a volume average particle size ratio (=volume average particle size of black developing particles BP/volume average particle size of white developing particles WP) of less than 0.5. Into the mediums D14z to D16z was incorporated the developer having a particle size ratio of 0.5 or more and less than 10 (0.5≦ratio<10).

A photo-curing adhesive 119a (see FIG. 7(A)) was applied to a small thickness only to the top of the partition member 113 on the first substrate 111. Subsequently, a PET film of 25 μm in thickness containing carbon black as a second substrate 112 was brought close to the adhesive. Then, the adhesive was cured by UV irradiation to adhere the film.

Thereafter, the peripheries of the first and second substrates 111, 112 were heat-sealed instead of sealing with the epoxy resin adhesive 119b as shown in FIG. 7(A).

In this way, there were produced 16 kinds of mediums D1z to D16z of the type shown in FIG. 7(A) which had different ratios of volume average particle size in the white developing particles WP and black developing particles BP.

The particulars of the mediums D1z to D16z are shown in Table 15.

TABLE 15

| medium | particle size ratio | particles | | particle size μm | |
|---|---|---|---|---|---|
| | | black | white | black | white |
| D1z | 1.13 | BP2z | WP3z | 8 | 7.1 |
| D2z | 2.08 | BP3z | WP1z | 10 | 4.8 |
| D3z | 3.24 | BP4z | WP3z | 23 | 7.1 |
| D4z | 4.18 | BP4z | WP2z | 23 | 5.5 |
| D5z | 6.14 | BP6z | WP4z | 62 | 10.1 |
| D6z | 7.33 | BP7z | WP4z | 74 | 10.1 |
| D7z | 8.54 | BP5z | WP1z | 41 | 4.8 |
| D8z | 11.3 | BP6z | WP2z | 62 | 5.5 |
| D9z | 12.9 | BP6z | WP1z | 62 | 4.8 |
| D10z | 13.5 | BP7z | WP2z | 74 | 5.5 |
| D11z | 15.4 | BP7z | WP1z | 74 | 4.8 |
| D12z | 0.29 | BP1z | WP6z | 5.6 | 19.1 |
| D13z | 0.42 | BP2z | WP6z | 8 | 19.1 |
| D14z | 0.52 | BP3z | WP6z | 10 | 19.1 |
| D15z | 0.68 | BP3z | WP5z | 10 | 14.7 |
| D16z | 0.99 | BP3z | WP4z | 10 | 10.1 |

Image display was performed on each of the mediums D1z to D11z among the mediums D1z to D16z by the image forming apparatus shown in FIG. 24.

The surface of the first substrate 111 was uniformly charged by the corona charger CRH to carry a negative polarity potential (e.g., −500 V). The second substrate 112 of the charged medium was set to a ground potential. Then, positive corona ions were led to the predetermined pixel corresponding portions corresponding to the image to be displayed among a plurality of pixel corresponding portions on the surface of the first substrate 111 of the medium. The portions were charged to carry a positive polarity potential (e.g., +500 V) and to carry the same potential (e.g., 500 V) in terms of absolute value as the above negatively charged polarity potential (e.g., −500 V). For the other pixels, only a bias potential (ground potential) was applied. Thereby the positive corona ion-charged portions and the non-charged portions were charged to carry the same potential (e.g., 500 V) in terms of absolute value and to give different polarities. Thus, image display was conducted such that the positive corona ion-loaded portions were displayed in white by negatively charged white developing particles WP and the positive corona ion-unloaded portions were displayed in black by positively charged black developing particles BP.

In the image display, an oscillating magnetic field was applied to the developing particles in the medium by passing the medium over the magnet plate MG' to apply a stirring force to the particles.

In respect of images formed on the mediums D1z to D11z, a relation was investigated between a volume average particle size ratio in two kinds of developing particles (white developing particles WP and black developing particles BP) (=volume average particle size of black developing particles BP/volume average particle size of white developing particles WP) on one hand and the uniformity of image density on the other hand.

Figure 25:
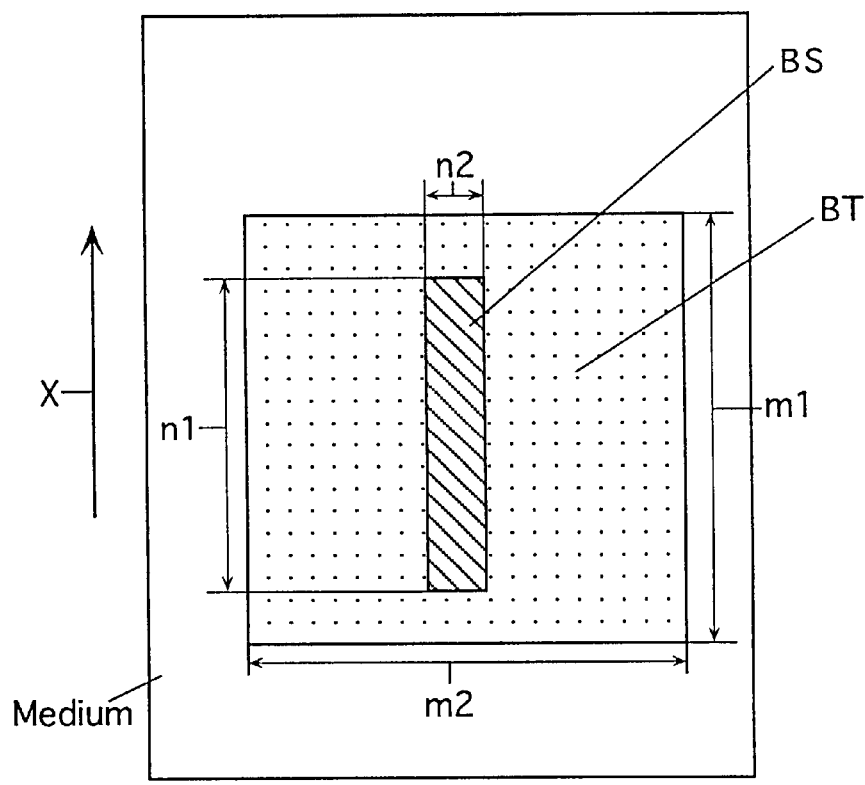
FIG. 25 is a view showing a solid image formed for evaluating the uniformity of the image density.

When image display is performed using the apparatus of FIG. 24, the medium is transported in a predetermined direction as shown in FIG. 25 (X direction in FIG. 25) to form a solid image BT on the medium (solid white image or solid black image) while suitably adjusting the surface potential so that the reflection density of central portion BS is brought to a predetermined density (about 0.35 in solid white image or about 1.3 in solid black image). Thereby the solid image BT having a size (m1×m2) of 5 cm×5 cm was formed. The image density of the image portion BS was measured using a reflection densitometer (product of X-Rite Incorporated, MODEL 310 T, aperture diameter 2 mm). The measured density was taken as an average value (ID) of reflection density.

Figure 26:
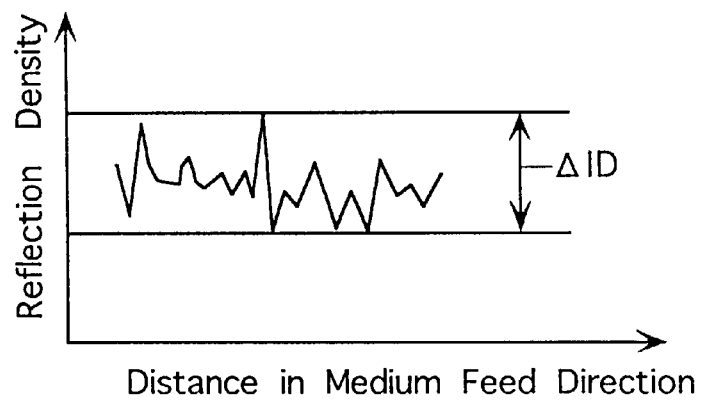
FIG. 26 is a view showing an example of the results obtained by measuring the reflection density for evaluating the uniformity of the image density and a difference (ΔID) between the maximum value and the minimum value.

Then, the reflection density of the central portion BS (n1×n2=3 cm (in medium feed direction X)×2 mm) was measured with use of a microdensitometer (Abe Sekkei Co., Ltd., Model 2405; a slit width 100 $\mu$m (medium feed direction X)×2 mm) in the medium feed direction X to give a difference ($\Delta$ID) between the maximum value and the minimum value. FIG. 26 shows an example of measured results and a difference ($\Delta$ID) between the maximum value and the minimum value.

The uniformity N of reflection density was given by dividing the obtained $\Delta$ID by ID.

$$N = \Delta ID/ID \quad \text{(formula 1')}$$

As stated above, $\Delta$ID is a difference between the maximum image density and the minimum image density as determined by the microdensitometer. ID is an image density obtained by the reflection densitometer (product of X-Rite Incorporated, 310 T, aperture diameter 2 mm).

The reflection densities were measured in respect of all images (here, solid black image or solid white image) which can be displayed in order to calculate the uniformity N of reflection density. The particles which were equal to or higher than other particles in uniformity N of reflection density were taken as particle 1 and its uniformity of reflection density was taken as $N_1$. The particles which were equal to or lower than other particles in uniformity N of reflection density were taken as particle 2 and its uniformity N of reflection density was taken as $N_2$. A ratio r was calculated as follows:

$$r = N_1(\text{particle 1})/N_2(\text{particle 2}) \quad \text{(formula 2')}$$

wherein $N_1 \geq N_2$ and therefore $r \geq 1$.

The uniformity N of reflection density is a value (formula 1') given by dividing a difference ($\Delta$ID) between the maximum value and the minimum value in the reflection densities of the solid image by the average value (ID) of reflection density. This value N is an error of ID. Accordingly, as the ID error ratio r (formula 2') in displayed images (solid white image and solid black image) is closer to 1, the difference in the uniformity of image density of displayed image is smaller and preferable.

The uniformity of image density is rated according to the following criteria:

When r is in a range of 1.0 to 1.5 ($1.0 \leq r \leq 1.5$), it is ⊙ (excellent).
When r is more than 1.5 to 2.0 ($1.5 < r \leq 2.0$), it is ○ (good).
When r is more than 2.0 to 2.1 ($2.0 < r \leq 2.1$), it is $\Delta$ (slightly poor).
When r exceeds 2.1, it is "×" (poor).

Figure 27:
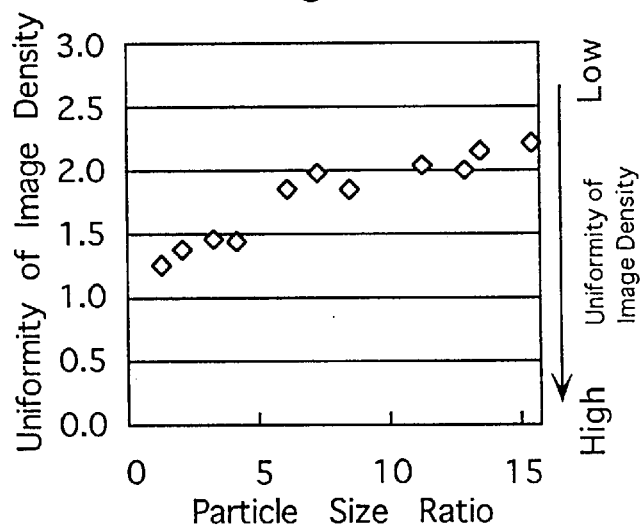
FIG. 27 is a view showing a relation between a volume average particle size ratio in two kinds of developing particles and the uniformity of the image density.

FIG. 27 shows a relation between the ratio of volume average particle size of two kinds of developing particles (=volume average particle size of developing particles BP/volume average particle size of developing particles WP) in the mediums D1z to D11z on one hand and the uniformity of image density or the other hand. Table 16 shows the results.

TABLE 16

| | particle size ratio | particles | | particle size $\mu$m | | image density | | | | uniformity of image density | | | evaluation |
| | | | | | | black | | white | | N | | | |
| medium | | black | white | black | white | ID | $\Delta$ID | ID | $\Delta$ID | black | white | ratio r | |
|---|---|---|---|---|---|---|---|---|---|---|---|---|---|
| D1z | 1.13 | BP2z | WP3z | 8 | 7.1 | 1.31 | 0.48 | 0.358 | 0.104 | 0.37 | 0.29 | 1.26 | ⊙ |
| D2z | 2.08 | BP3z | WP1z | 10 | 4.8 | 1.32 | 0.51 | 0.346 | 0.097 | 0.39 | 0.28 | 1.38 | ⊙ |
| D3z | 3.24 | BP4z | WP3z | 23 | 7.1 | 1.31 | 0.55 | 0.358 | 0.103 | 0.42 | 0.29 | 1.46 | ⊙ |
| D4z | 4.18 | BP4z | WP2z | 23 | 5.5 | 1.30 | 0.54 | 0.346 | 0.100 | 0.42 | 0.29 | 1.44 | ⊙ |
| D5z | 6.14 | BP6z | WP4z | 62 | 10.1 | 1.31 | 0.74 | 0.353 | 0.108 | 0.56 | 0.31 | 1.85 | ○ |
| D6z | 7.33 | BP7z | WP4z | 74 | 10.1 | 1.31 | 0.78 | 0.355 | 0.107 | 0.60 | 0.30 | 1.98 | ○ |
| D7z | 8.54 | BP5z | WP1z | 41 | 4.8 | 1.30 | 0.68 | 0.349 | 0.099 | 0.52 | 0.28 | 1.84 | ○ |
| D8z | 11.3 | BP6z | WP2z | 62 | 5.5 | 1.32 | 0.75 | 0.354 | 0.099 | 0.57 | 0.28 | 2.03 | $\Delta$ |
| D9z | 12.9 | BP6z | WP1z | 62 | 4.8 | 1.32 | 0.73 | 0.351 | 0.097 | 0.55 | 0.28 | 2.00 | $\Delta$ |
| D10z | 13.5 | BP7z | WP2z | 74 | 5.5 | 1.30 | 0.79 | 0.351 | 0.099 | 0.61 | 0.28 | 2.15 | X |
| D11z | 15.4 | BP7z | WP1z | 74 | 4.8 | 1.29 | 0.78 | 0.351 | 0.096 | 0.60 | 0.27 | 2.21 | X |

The same degree of uniformity of image density was attained in respect of displayed images (solid white and solid black images) on the mediums D1z to D7z which contained the particles in the range of 1 to 10 in the volume average particle size ratio. Among these mediums, the image density uniformity ratio r was less than 1.5 in respect of solid white and solid black images on the mediums D1z to D4z which contained the particles in the range of 1 to 6 in the volume average particle size ratio. Thus these mediums are especially effective. However, a great difference existed in the uniformity of image density on the mediums D8z to D11z which contained the particles exceeding 10 in the volume average particle size ratio so that the quality of displayed images was reduced.

In these examples, the uniformity of image density was evaluated in terms of density uniformity of black particles/density uniformity of white particles, but may be evaluated in terms of density uniformity of white particles/density uniformity of black particles. Further, the particles are not restricted only to white particles and black particles.

A relation was investigated in respect of images formed on the mediums D2z to D16z between the ratio of volume average particle size of two kinds of developing particles including magnetic developing particles (white non-magnetic developing particles WP and black magnetic developing particles BP) (=volume average particle size of black magnetic developing particles BP/volume average particle size of white non-magnetic developing particles WP) on one hand and the image displaying rate on the other hand.

Image display was conducted in the same manner as in the evaluation of uniformity of image density on the mediums D2z to D16z using the image forming apparatus of FIG. 24. The rubber magnet plate MG' used was an anisotropic rubber magnet plate MG01016 (Shimonishi Seisakusho Co. Ltd., 11 poles/inch, thickness 1.4 mm). The image displaying rate was evaluated as follows.

A solid image (solid white image or solid black image) having a predetermined size was formed on the medium using the image forming apparatus of FIG. 24. The image density of the central portion of the medium immediately above the magnetic poles of the rubber magnet plate MG' was measured by a reflection densitometer (product of X-Rite Inc., MODEL 310 T, aperture diameter 2 mm). Then, the number of magnetic poles in the rubber magnet plate MG' which the medium passed until the reflection density of solid image reached a predetermined density was counted. In other words, the number of magnetic poles was counted which was required for the reflection density of solid white image to reach 0.35, and for the reflection density of solid black image to reach 1.3.

The rate of displaying a white image is expressed in terms of the number of magnetic poles which the medium passes until the reflection density of sold white image reaches 0.35, and the rate of displaying a black image is expressed in terms of the number of magnetic poles which the medium passes until the reflection density reaches 1.3.

As the number of magnetic poles which the medium passes is decreased, the image displaying rate is increased and it is desirable.

The standard for evaluation of image displaying rate (number of magnetic poles passed by the medium) is as follows.

When the image displaying rate (number of magnetic poles passed by the medium) is 4 or less, it is ⊚ (excellent).

When the image displaying rate (number of magnetic poles passed by the medium) is from 5 to 6, it is ○ (good).

When the image displaying rate (number of magnetic poles passed by the medium) is 7 or more, it is × (not good).

The overall evaluation of rate of displaying the black image and the white image was performed. The evaluation standard is as follows.

When both the rate evaluation of black image and that of white image are excellent (⊚), it is ⊚ (excellent).

When one of the rate evaluation of black image and that of white image is good (○), and the other is excellent (⊚) or good (○), it is ○ (good).

When one of the rate evaluation of black image and that of white image is good (○), and the other is not good (×), it is Δ.

In the other case, it is × (not good, slow).

Figure 28:
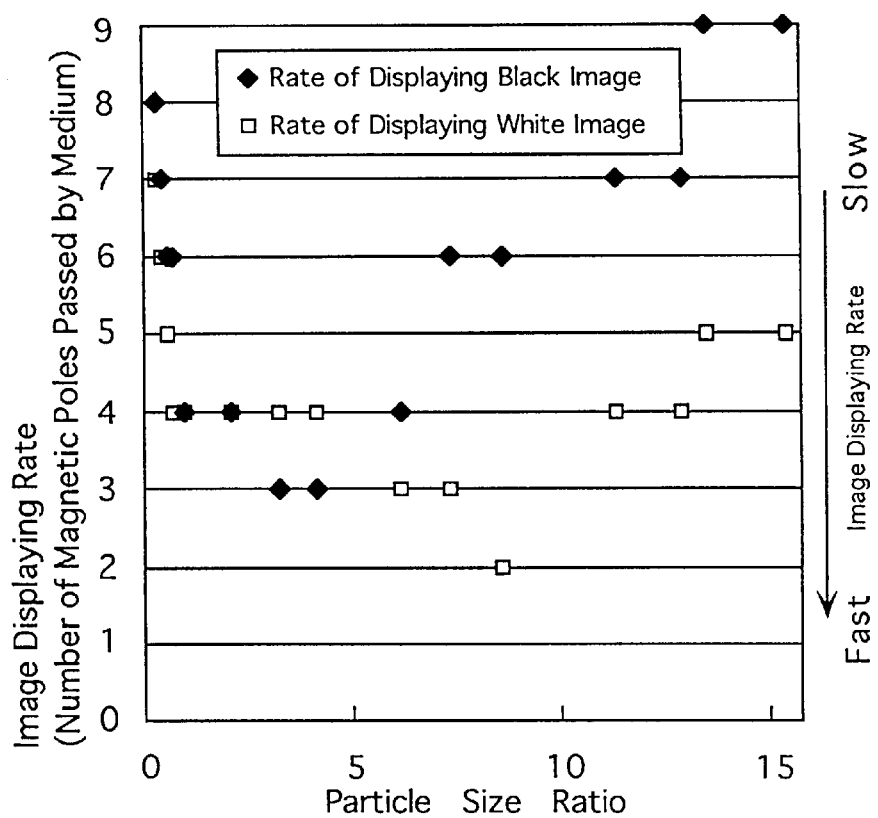
FIG. 28 is a view showing a relation between a volume average particle size ratio of two kinds of developing particles containing magnetic developing particles and the image displaying rate.

FIG. 28 shows a relation between the ratio of volume average particle size of two kinds of developing particles including magnetic developing particles (=volume average particle size of black developing particles BP/volume average particle size of white developing particles WP) in the mediums D2z to D16z and the image displaying rate. Table 17 shows the results. In table 17, the word "black" under the words "result" and "evaluation" refers to the rate of displaying the black image (number of magnetic poles passed by the medium) and its evaluation, while the word "white" under the "result" and the "evaluation" refers to the rate of displaying the white image (number of magnetic poles passed by the medium) and its evaluation.

TABLE 17

| medium | particle size ratio | particles black | particles white | particle size μm black | particle size μm white | image displaying rate result black | image displaying rate result white | image displaying rate evaluation black | image displaying rate evaluation white | overall |
|---|---|---|---|---|---|---|---|---|---|---|
| D12$_z$ | 0.29 | BP1$_z$ | WP6$_z$ | 5.6 | 19.1 | 8 | 7 | × | × | × |
| D13$_z$ | 0.42 | BP2$_z$ | WP6$_z$ | 8 | 19.1 | 7 | 6 | × |   | × |
| D14$_z$ | 0.52 | BP3$_z$ | WP6$_z$ | 10 | 19.1 | 6 | 5 | ○ | ○ | ○ |
| D15$_z$ | 0.68 | BP3$_z$ | WP5$_z$ | 10 | 14.7 | 6 | 4 | ○ | ⊚ | ○ |
| D16$_z$ | 0.99 | BP3$_z$ | WP4$_z$ | 10 | 10.1 | 4 | 4 | ⊚ | ⊚ | ⊚ |
| D2$_z$ | 2.08 | BP3$_z$ | WP1$_z$ | 10 | 4.8 | 4 | 4 | ⊚ | ⊚ | ⊚ |
| D3$_z$ | 3.24 | BP4$_z$ | WP3$_z$ | 23 | 7.1 | 3 | 4 | ⊚ | ⊚ | ⊚ |
| D4$_z$ | 4.18 | BP4$_z$ | WP2$_z$ | 23 | 5.5 | 3 | 4 | ⊚ | ⊚ | ⊚ |
| D5$_z$ | 6.14 | BP6$_z$ | WP4$_z$ | 62 | 10.1 | 4 | 3 | ⊚ | ⊚ | ⊚ |
| D6$_z$ | 7.33 | BP7$_z$ | WP4$_z$ | 74 | 10.1 | 6 | 3 | ○ | ⊚ | ○ |
| D7$_z$ | 8.54 | BP5$_z$ | WP1$_z$ | 41 | 4.8 | 6 | 2 | ○ | ⊚ | ○ |
| D8$_z$ | 11.3 | BP6$_z$ | WP2$_z$ | 62 | 5.5 | 7 | 4 | × | ⊚ | Δ |
| D9$_z$ | 12.9 | BP6$_z$ | WP1$_z$ | 62 | 4.8 | 7 | 4 | × | ⊚ | Δ |
| D10$_z$ | 13.5 | BP7$_z$ | WP2$_z$ | 74 | 5.5 | 9 | 5 | × | ○ | × |
| D11$_z$ | 15.4 | BP7$_z$ | WP1$_z$ | 74 | 4.8 | 9 | 5 | × | ○ | × |

A satisfactory image displaying rate was attained with the mediums D14z to D16z and D2z to D7z wherein the volume average particle size ratio was 0.5 to 10. In the mediums D16z, and D2z to D5z wherein the volume average particle size ratio was 1 to 6, both of the rates of displaying the white and black images were 4 or less. Thus those mediums were especially effective.

On the other hand, a satisfactory image displaying rate was not achieved in the mediums D12z and D13z wherein the volume average particle size ratio was less than 0.5. The reason is presumably that since the non-magnetic particles were larger in particle size than the magnetic particles, the stirring force of magnetic particles was insufficient.

The rate of displaying the white image was relatively high, whereas that of displaying the black image was relatively low in the mediums D8z to D11z wherein the volume average particle size ratio exceeded 10. The reason is presumably that black image was displayed by the magnetic particles (black particles in this example) which scraped the non-magnetic particles (white particles in this example) adhering to the image display surface of the substrate. But the particle size ratio (=particle size of magnetic particles/particle size of non-magnetic particles) was 10 or more so that the non-magnetic particles were not sufficiently contacted with the magnetic particles and the efficiency of scraping by the magnetic particles was low.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. A reversible image display medium comprising:
   two substrates opposed to each other with a gap therebetween;
   one or more developer accommodating cells formed between the two substrates, each having a periphery surrounded by a partition wall; and
   a dry developer contained in each of the cell(s), wherein the dry developer contains at least two kinds of frictionally chargeable dry developing particles having different chargeable polarities and different optical reflection densities, and
   wherein
   the dry developer has an average charge quantity of 1.0 $\mu$C/g to 10 $\mu$C/g as determined by an electric field separation measuring method.

2. A reversible image display medium comprising:
   two substrates opposed to each other with a gap therebetween;
   one or more developer accommodating cells formed between the two substrates, each having a periphery surrounded by a partition wall; and
   a dry developer contained in each of the cell(s), wherein the dry developer contains at least two kinds of frictionally chargeable dry developing particles having different chargeable polarities and different optical reflection densities, and
   wherein
   at least one kind, among the two kinds, of the developing particles are magnetic developing particles having a coercive force of 50 oersteds to 250 oersteds.

3. A reversible image display medium comprising:
   two substrates opposed to each other with a gap therebetween;
   one or more developer accommodating cells formed between the two substrates, each having a periphery surrounded by a partition wall; and
   a dry developer contained in each of the cell(s), wherein the dry developer contains at least two kinds of frictionally chargeable dry developing particles having different chargeable polarities and different optical reflection densities, and
   wherein
   at least one kind, among the two kinds, of the developing particles are magnetic developing particles having an optical reflection density of 1.0 or more.

4. The reversible image display medium according to claim 3, wherein the optical reflection density is measured by filling the magnetic developing particles into a cylindrical cell having a depth of 200 $\mu$m and an inner diameter of 6 mm; cutting a top portion of the developing particles filled in the cylindrical cell by rubbing to a flat level along an edge of an opening of the cylindrical cell; and determining the optical reflection density on the flat level of the magnetic developing particles.

5. A reversible image display medium comprising:
   two substrates opposed to each other with a gap therebetween;
   one or more developer accommodating cells formed between the two substrates, each having a periphery surrounded by a partition wall; and
   a dry developer contained in each of the cell(s), wherein the dry developer contains at least two kinds of frictionally chargeable dry developing particles a and b having different chargeable polarities and different optical reflection densities, and
   wherein
   conditions represented by following formula 1 and formula 2 are satisfied concerning the cell:

$$PD \leq [1/\rho_a + (1-T_c)/(T_c \times \rho_b)] \times M_a/(D \times f) \qquad \text{Formula 1}$$

$$PD \geq \{1/\rho_b + T_c/[(1-T_c) \times \rho_a]\} \times M_b/(D \times f) \qquad \text{Formula 2}$$

wherein:
   D is a cell gap (height or thickness of a space defining the cell between the two substrates);
   $\rho_a$ is a true specific gravity of the particle a, and $\rho_b$ is a true specific gravity of the particle b;
   $M_a$ is an amount of the particles a adhering to the substrate per unit area of the substrate, and a required weight of the particles a adhering to the substrate per unit area of the substrate on image observation side when a solid image display having a contemplated image density is performed by using the particles a;
   $M_b$ is an amount of the particles b adhering to the substrate per unit area of the substrate, and a required weight of the particles b adhering to the substrate per unit area of the substrate on the image observation side when a solid image display having a contemplated image density is performed by using the particles b;
   $T_c$ is a mixing ratio by weight of the particles a to all particles in the cell;
   PD is a ratio of the volume of all particles (volume of all particles in the cell) to a cell volume (volume of the space defining the cell); and
   f is (the cell volume)/(display area×D) (the display area is an effective region area $S_{dsp}$ for image display in a portion forming the cell in the substrate on the image observation side).

6. The reversible image display medium according to claim 5, wherein a condition: PD≧0.55/f is satisfied.

7. A reversible image display medium comprising:

two substrates opposed to each other with a gap therebetween;

one or more developer accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities, and wherein at least one kind of the dry developing particles are non-magnetic developing particles, and an amount of the non-magnetic developing particles having a particle size of 3 μm or less in volume particle size distribution of the non-magnetic developing particles is 0.5 wt % or less.

8. The reversible image display medium according to claim 7, wherein the dry developer contains magnetic developing particles, and an amount of the magnetic developing particles having a particle size of 4 μm or less in volume particle size distribution of the magnetic developing particles is 1 wt % or less.

9. A reversible image display medium comprising:

two substrates opposed to each other with a gap therebetween;

one or more developer accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities, and wherein at least one kind of the dry developing particles are magnetic developing particles, and an amount of the magnetic developing particles having a particle size of 4 μm or less in volume particle size distribution of the magnetic developing particles is 1 wt. % or less.

10. A reversible image display medium comprising:

two substrates opposed to each other with a gap therebetween;

one or more developer accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities, and wherein a third component is added to at least one kind of the dry developing particles, and in each of the third component-added developing particles, an addition proportion of the third component to the developing particles having a particle size of 5 μm or less in volume particle size distribution of the developing particles is different from an addition proportion of the third component to the developing particles having a particle size of more than 5 μm in the volume particle size distribution such that an adhesion of the particles of 5 μm or less in particle size can be reduced to a larger extent than when employing the same addition proportion of the third component to the developing particles of 5 μm or less in particle size as the proportion of the third component to the developing particles of more than 5 μm in particle size.

11. The reversible image display medium according to claim 10, wherein at least one kind of the dry developing particles are non-magnetic developing particles and an amount of the non-magnetic developing particles having a particle size of 3 μm or less in volume particle size distribution of the non-magnetic developing particles is 0.5 wt. % or less.

12. The reversible image display medium according to claim 10, wherein at least one kind of the dry developing particles are magnetic developing particles and an amount of the magnetic developing particles having a particle size of 4 μm or less in volume particle size distribution of the magnetic developing particles is 1 wt. % or less.

13. The reversible image display medium according to claim 10, wherein the dry developing particles include non-magnetic and magnetic developing particles; an amount of the non-magnetic developing particles having a particle size of 3 μm or less in volume particle size distribution of the non-magnetic developing particles is 0.5 wt. % or less; and an amount of the magnetic developing particles having a particle size of 4 μm or less in volume particle size distribution of the magnetic developing particles is 1 wt. % or less.

14. A reversible image display medium comprising:

two substrates opposed to each other with a gap therebetween;

one or more developer accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities, and wherein third components are added to at least one kind of the dry developing particles, and in each of the third component-added developing particles, the third component to be added to the developing particles having a particle size of 5 μm or less in volume particle size distribution of the developing particles is different from the third component to be added to the developing particles having a particle size of more than 5 μm in the volume particle size distribution such that an adhesion of the particles of 5 μm or less in particle size can be reduced to a larger extent than when adding the same third component to the developing particles of 5 μm or less in particle size as the third component to be added to the developing particles of more than 5 μm in particle size.

15. The reversible image display medium according to claim 14, wherein at least one kind of the dry developing particles are non-magnetic developing particles and an amount of the non-magnetic developing particles having a particle size of 3 μm or less in volume particle size distribution of the non-magnetic developing particles is 0.5 wt. % or less.

16. The reversible image display medium according to claim 14, wherein at least one kind of the dry developing particles are magnetic developing particles and an amount of the magnetic developing particles having a particle size of 4

μm or less in volume particle size distribution of the magnetic developing particles is 1 wt. % or less.

17. The reversible image display medium according to claim 11, wherein the dry developing particles include non-magnetic and magnetic developing particles; an amount of the non-magnetic developing particles having a particle size of 3 μm or less in volume particle size distribution of the non-magnetic developing particles is 0.5 wt. % or less; and an amount of the magnetic developing particles having a particle size of 4 μm or less in volume particle size distribution of the magnetic developing particles is 1 wt. % or less.

18. A reversible image display medium comprising:

two substrates opposed to each other with a gap therebetween;

one or more developer accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities, and wherein at least one kind, among the two kinds, of the developing particles are magnetic developing particles, and a ratio of volume average particle size in the two kinds of the dry developing particles (=volume average particle size of the magnetic developing particles/volume average particle size of the other developing particles) is in a range of 0.5 to 10.

* * * * *